(12) United States Patent
Pugh et al.

(10) Patent No.: US 10,204,373 B2
(45) Date of Patent: Feb. 12, 2019

(54) SYSTEM AND METHOD FOR IDENTIFYING CUSTOMERS WITH ORDERED ITEMS AT A RETAIL ENTERPRISE

(71) Applicant: Meijer, Inc., Grand Rapids, MI (US)

(72) Inventors: Brian Pugh, Grand Rapids, MI (US); Elmer L. Robinson, Jr., Marne, MI (US); David Scott Pallas, Hudsonville, MI (US); K. Michael Ross, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 448 days.

(21) Appl. No.: 14/965,852

(22) Filed: Dec. 10, 2015

(65) Prior Publication Data

US 2016/0171592 A1 Jun. 16, 2016

Related U.S. Application Data

(60) Provisional application No. 62/090,211, filed on Dec. 10, 2014, provisional application No. 62/190,664, filed on Jul. 9, 2015.

(51) Int. Cl.
G06Q 30/00 (2012.01)
G06Q 30/06 (2012.01)
G06F 17/30 (2006.01)

(52) U.S. Cl.
CPC ... G06Q 30/0635 (2013.01); G06F 17/30386 (2013.01)

(58) Field of Classification Search
CPC ..................................................... G06Q 30/00
See application file for complete search history.

(56) References Cited

U.S. PATENT DOCUMENTS

| 5,974,393 A * | 10/1999 | McCullough .... G06Q 10/06311 340/311.2 |
| 7,127,236 B2 * | 10/2006 | Khan ..................... G06Q 20/02 455/414.1 |
| 7,469,151 B2 * | 12/2008 | Khan ..................... G06Q 20/32 455/406 |

(Continued)

OTHER PUBLICATIONS

Henry, Alan, "How Retail Stores Track You Using Your Smartphone (and How to Stop It)" Lifehacker, dated Jul. 19, 2013. (Year: 2013).*

*Primary Examiner* — Mark A Fadok
(74) *Attorney, Agent, or Firm* — Barnes & Thornburg LLP

(57) ABSTRACT

A system and method for identifying customers with ordered items at a retail enterprise may associate in a database each of a plurality of departments within a brick-and-mortar outlet with a different identification code, and also one of a plurality of customer codes identifying a customer with an order code identifying an order placed by the customer for an item to be delivered thereto by one of the departments. In response to a wirelessly received identification code and customer code, a display monitor at one of the plurality of departments is controlled to display a notification message if the received identification code matches the identification code associated with the one of the departments and the received customer code matches the customer code associated in the database with the order code. The notification message may include information relating to at least one of the customer and the order.

9 Claims, 15 Drawing Sheets

(56) References Cited

U.S. PATENT DOCUMENTS

| | | | | |
|---|---|---|---|---|
| 8,392,262 B2* | 3/2013 | Mallick | G06Q 30/0601 | 705/26.1 |
| 8,849,705 B2* | 9/2014 | Khan | G06Q 20/12 | 705/26.1 |
| 8,989,053 B1* | 3/2015 | Skaaksrud | H04W 12/06 | 370/255 |
| 9,120,624 B1* | 9/2015 | Cassady | B65G 1/137 | |
| 9,430,786 B2* | 8/2016 | Khan | G06Q 30/06 | |
| 9,536,243 B2* | 1/2017 | Khan | G06Q 20/0457 | |
| 9,870,548 B1* | 1/2018 | Sangani | G06Q 10/0836 | |
| 2002/0038266 A1* | 3/2002 | Tuttrup | G06Q 10/08 | 705/28 |
| 2002/0128850 A1* | 9/2002 | Chen | G06Q 10/047 | 705/301 |
| 2003/0050854 A1* | 3/2003 | Showghi | G06Q 10/02 | 705/15 |
| 2004/0158499 A1* | 8/2004 | Dev | G06Q 30/02 | 705/26.1 |
| 2005/0040230 A1* | 2/2005 | Swartz | G06K 17/00 | 235/383 |
| 2005/0071040 A1* | 3/2005 | Kirila, II | G06Q 10/087 | 700/130 |
| 2005/0256781 A1* | 11/2005 | Sands | G06Q 10/087 | 705/26.8 |
| 2006/0277104 A1* | 12/2006 | Overhultz | G06Q 10/06375 | 705/14.41 |
| 2007/0030824 A1* | 2/2007 | Ribaudo | G01S 5/0018 | 370/328 |
| 2007/0205278 A1* | 9/2007 | Lovett | G06Q 30/06 | 235/383 |
| 2007/0210155 A1* | 9/2007 | Swartz | G06K 17/00 | 235/383 |
| 2008/0082424 A1* | 4/2008 | Walton | G06Q 10/047 | 705/26.1 |
| 2009/0170483 A1* | 7/2009 | Barnett | G06Q 20/32 | 455/414.2 |
| 2009/0281903 A1* | 11/2009 | Blatstein | G06Q 20/20 | 705/15 |
| 2010/0161410 A1* | 6/2010 | Tulloch | G06Q 30/02 | 705/14.45 |
| 2010/0179846 A1* | 7/2010 | Best | G06Q 30/0601 | 705/26.1 |
| 2011/0106635 A1* | 5/2011 | Khan | G06Q 20/12 | 705/14.73 |
| 2011/0173041 A1* | 7/2011 | Breitenbach | G06Q 10/06311 | 705/7.13 |
| 2011/0258058 A1* | 10/2011 | Carroll | G06Q 30/06 | 705/15 |
| 2011/0320243 A1* | 12/2011 | Khan | G06Q 20/3278 | 705/13 |
| 2011/0320293 A1* | 12/2011 | Khan | G06Q 20/0457 | 705/16 |
| 2012/0005026 A1* | 1/2012 | Khan | G06Q 30/02 | 705/14.64 |
| 2012/0029997 A1* | 2/2012 | Khan | G06Q 30/0226 | 705/14.27 |
| 2012/0041823 A1* | 2/2012 | Khan | G06Q 30/0267 | 705/14.64 |
| 2012/0059741 A1* | 3/2012 | Khan | G06Q 30/06 | 705/27.1 |
| 2012/0072311 A1* | 3/2012 | Khan | G06Q 30/06 | 705/26.81 |
| 2012/0078673 A1* | 3/2012 | Koke | G06Q 10/06 | 705/7.13 |
| 2012/0254030 A1* | 10/2012 | Khan | H04L 63/0853 | 705/41 |
| 2013/0262336 A1* | 10/2013 | Wan | G06Q 10/0836 | 705/339 |
| 2014/0025540 A1* | 1/2014 | Hendrickson | G06Q 30/02 | 705/26.81 |
| 2014/0114807 A1* | 4/2014 | Baker | G06Q 30/016 | 705/26.41 |
| 2014/0188637 A1* | 7/2014 | Balasubramaniam | G06Q 50/12 | 705/15 |
| 2014/0279269 A1* | 9/2014 | Brantley | G06Q 30/0635 | 705/26.81 |
| 2014/0279270 A1* | 9/2014 | Bertanzetti | G06Q 30/0635 | 705/26.81 |
| 2014/0330407 A1* | 11/2014 | Corder | G06Q 10/0631 | 700/90 |
| 2015/0120509 A1* | 4/2015 | Moring | G06Q 30/0635 | 705/26.81 |
| 2015/0156605 A1* | 6/2015 | Skaaksrud | H04W 12/06 | 455/456.1 |
| 2015/0189620 A1* | 7/2015 | Metral | H04L 67/26 | 709/206 |
| 2015/0349917 A1* | 12/2015 | Skaaksrud | G06Q 10/0833 | 370/328 |
| 2016/0092954 A1* | 3/2016 | Bassett | H04W 4/04 | 705/26.41 |
| 2016/0125514 A1* | 5/2016 | Plattenburg | G06Q 30/0639 | 705/26.9 |
| 2016/0155088 A1* | 6/2016 | Pylappan | G06Q 10/0836 | 705/333 |

* cited by examiner

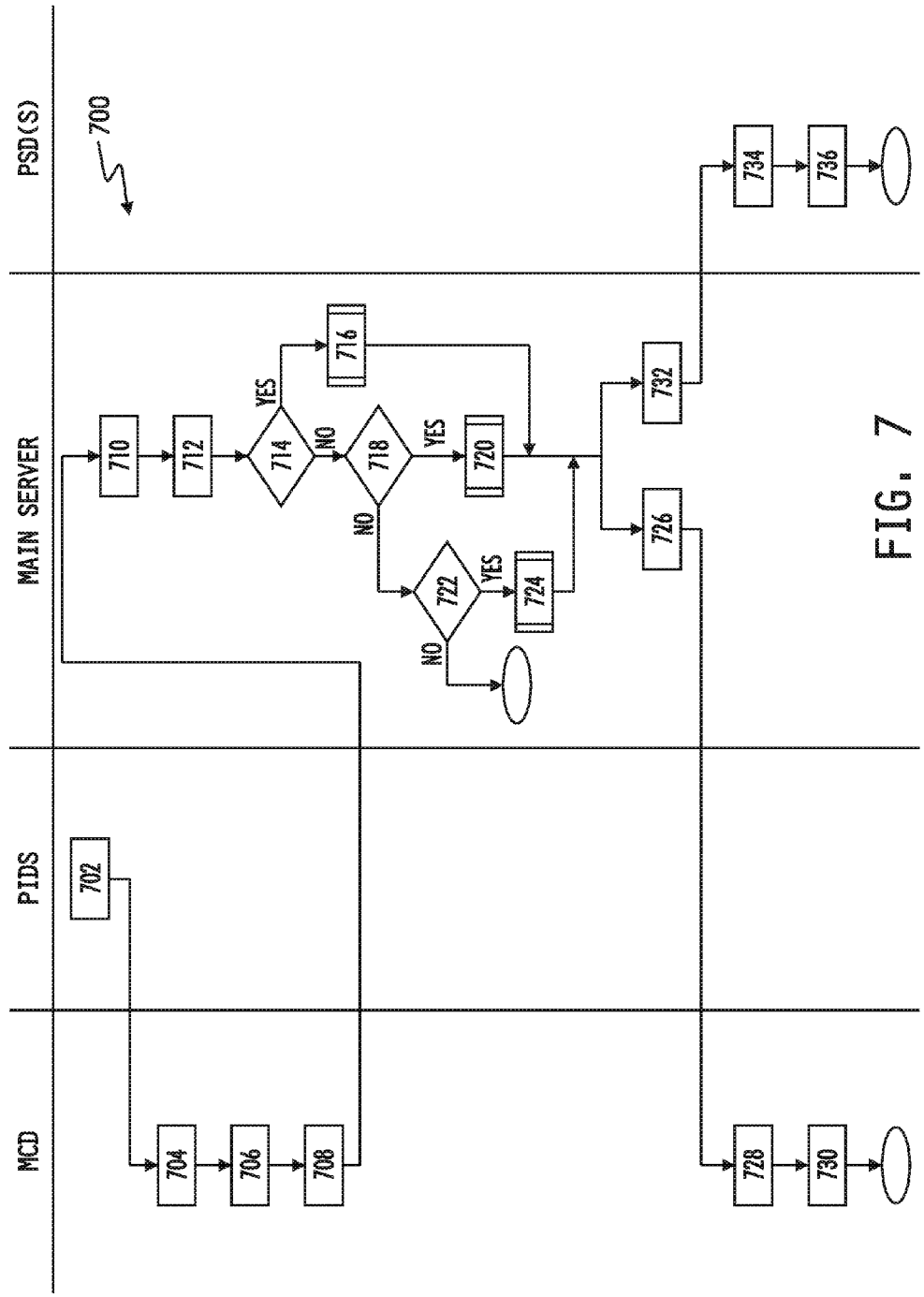

SYSTEM AND METHOD FOR IDENTIFYING CUSTOMERS WITH ORDERED ITEMS AT A RETAIL ENTERPRISE

CROSS-REFERENCE TO RELATED APPLICATIONS

This patent application claims the benefit of, and priority to, U.S. Provisional Patent Application Ser. No. 62/090,211, filed Dec. 10, 2014, and to U.S. Provisional Patent Application Ser. No. 62/190,664, filed Jul. 9, 2015, the disclosures of which are expressly incorporated herein by reference.

FIELD OF THE INVENTION

The present invention relates generally to systems and methods for automatically identifying customers at any of one or more brick-and-mortar stores of a retail enterprise, and more specifically to such systems and methods for automatically identifying customers that have one or more pending orders for one or more items to be produced by one or more product/service departments of the retail enterprise.

BACKGROUND

Retailers of goods and services typically offer such goods and services for purchase via one or more conventional brick-and-mortar retail stores. At some such brick-and-mortar stores, one or more product and/or service departments ("product/service departments") may operate to receive orders from customers for one or more specified items, and to then manufacture, build, make or process the one or more specified items for subsequent customer pick up. Such customer pick up typically requires a customer to enter a specified brick-and-mortar store, proceed within the store to the product/service department from which the one or more ordered items were ordered, engage an attendant of the product/service department attendant and communicate to the attendant at least the customer's identity and a description of the one or more ordered items, whereupon the attendant then locates the one or more items within the product/service department and delivers the one or more items to the customer.

SUMMARY

The present invention may comprise one or more of the features recited in the attached claims, and/or one or more of the following features and combinations thereof. In one aspect, a method of identifying customers with ordered items at a retail enterprise may comprise associating, with a first processor in a first database, each of a plurality of departments within a brick-and-mortar outlet of the retail enterprise with a different identification code, associating, with the first processor in the first or a second database, one of a plurality of customer codes identifying one of a plurality of customers of the retail enterprise and an order code identifying an order placed by the identified customer for an item to be delivered to the identified customer by the one of the plurality of departments, and in response to a wirelessly received identification code and customer code, controlling, at least in part with the first processor, a display monitor at one of the plurality of departments to display a notification message if the wirelessly received identification code matches the one of the plurality of identification codes associated in the first database with the one of the plurality of departments and the wirelessly received customer code matches the one of the plurality of customer codes associated in the first or second database with the order code, the notification message including information relating to at least one of the customer identified by the matching one of the plurality of customer codes and the order identified by the order code.

In another aspect, a system for identifying customers with ordered items at a retail enterprise may comprise a plurality of wireless signal broadcasting devices located in, near or adjacent to a brick-and-mortar outlet of the retail enterprise, at least one of the plurality of wireless signal broadcasting devices located at or near one of a plurality of departments in the brick-and-mortar outlet, a display monitor located in the one of the plurality of departments, at least one database having stored therein a plurality of identification codes each identifying a different one of the plurality of wireless signal broadcasting devices and each associated in the at least one database with a location within, near or adjacent to the brick-and-mortar outlet of a different one of the plurality of wireless signal broadcasting devices, and a plurality of customer codes each identifying a different one of a plurality of customers of the retail enterprise, one of the plurality of customer codes associated in the at least one database with an order code identifying an order placed by a corresponding one of the plurality of customers for an item to be delivered to the corresponding one of the plurality of customers by the one of the plurality of departments, a processor, and memory having instructions stored therein which, when executed by the processor, cause the processor to control the display monitor, in response to a wirelessly received identification code and customer code, to display a notification message if the wirelessly received identification code matches the one of the plurality of identification codes associated in the at least one database with the one of the plurality of wireless signal broadcasting devices located at or near the one of a plurality of departments, and the wirelessly received customer code matches the one of the plurality of customer codes associated in the database with the order code, the notification message including information relating to at least one of the customer identified by the matching customer code and the order identified by the order code.

In yet another aspect, a system for identifying customers with ordered items at a retail enterprise may comprise a plurality of wireless signal broadcasting devices located in, near or adjacent to a brick-and-mortar outlet of the retail enterprise, at least one of the plurality of wireless signal broadcasting devices located at or near one of a plurality of departments in the brick-and-mortar outlet, a display monitor located in the one of the plurality of departments, at least one database having stored therein a plurality of identification codes each identifying a different one of the plurality of wireless signal broadcasting devices and each associated in the at least one database with a location within, near or adjacent to the brick-and-mortar outlet of a different one of the plurality of wireless signal broadcasting devices, and a plurality of customer codes each identifying a different one of a plurality of customers of the retail enterprise, one of the plurality of customer codes associated in the at least one database with an order code identifying an order placed by a corresponding one of the plurality of customers for an item to be delivered to the corresponding one of the plurality of customers by the one of the plurality of departments, and a processor, and a server coupled to each of the plurality of wireless signal broadcasting devices and to the display monitor, the server including at one module to control the display monitor, in response to a wirelessly received identification code and customer code, to display a notification message if the wirelessly received identification code matches the one of the plurality of identification codes associated in the at least one database with the one of the plurality of wireless signal broadcasting devices located at or near the one of a plurality of departments, and the wirelessly received customer code matches the one of the plurality of customer codes associated in the database with the order code, the notification message including information relating to at least one of the customer identified by the matching customer code and the order identified by the order code.

In a further aspect, a non-transitory machine-readable medium may comprise a plurality of instructions which, when executed by at least one processor, result in the at least one processor associating in a first database each of a plurality of departments within a brick-and-mortar outlet of the retail enterprise with a different identification code, associating in the first or a second database one of a plurality of customer codes identifying one of a plurality of customers of the retail enterprise and an order code identifying an order placed by the identified customer for an item to be delivered to the identified customer by the one of the plurality of departments, and in response to a wirelessly received identification code and customer code, controlling a display monitor at one of the plurality of departments to display a notification message if the wirelessly received identification code matches the one of the plurality of identification codes associated in the first database with the one of the plurality of departments and the wirelessly received customer code matches the one of the plurality of customer codes associated in the first or second database with the order code, the notification message including information relating to at least one of the customer identified by the matching one of the plurality of customer codes and the order identified by the order code.

In yet another aspect, a method of identifying customers with ordered items at a retail enterprise may comprise associating, with a first processor in a first database, each of one or more customer entrances in a brick-and-mortar outlet of the retail enterprise with a different identification code stored in the first database, associating, with the first processor in the first or a second database, one of a plurality of customer codes stored in the first or second database and identifying one of a plurality of customers of the retail enterprise with an order code identifying an order placed by the identified customer for an item to be delivered to the identified customer by one of a plurality of departments in the brick-and-mortar outlet and also with contact information identifying a mobile communication device associated with the identified customer, comparing, with the first processor, a wirelessly received identification code with the identification codes stored in the first database, if the wirelessly received identification code matches one of the identification codes associated in the first database with one of the one or more customer entrances in the brick-and-mortar outlet, comparing, with the first processor, a wirelessly received customer code with the plurality of customer codes stored in the first or second database, and if the wirelessly received customer code matches the one of the plurality of customer codes associated in the first or second database with the order code, controlling, with the first processor, a display monitor at the one of the plurality of departments to display a first notification message and wirelessly transmitting, under control of the first processor, a second notification message to the mobile communication device identified by the contact information associated in the first or second database with the matching one of the plurality of customer codes, the first and second notification messages each including information relating to at least one of the customer identified by the matching one of the plurality of customer codes and the order identified by the order code, and the second notification message further including information relating to an identity of the one of the plurality of departments.

In still a further aspect, a system for identifying customers with ordered items at a retail enterprise may comprise a plurality of wireless signal broadcasting devices located in, near or adjacent to a brick-and-mortar outlet of the retail enterprise, at least one database having stored therein a plurality of identification codes each identifying a different one of the plurality of wireless signal broadcasting devices and each associated in the at least one database with a wireless signal broadcasting device location corresponding to a location within, near or adjacent to the brick-and-mortar outlet of a different one of the plurality of wireless signal broadcasting devices, and a plurality of customer codes each identifying a different one of a plurality of customers of the retail enterprise, one of the plurality of customer codes associated in the at least one database with an order code identifying an order placed by one of the customers identified by the one of the plurality of customer codes for an item to be delivered to the identified customer by one of a plurality of departments within the brick-and-mortar outlet and also with contact information identifying a mobile communication device associated with the identified customer, a display monitor located in the one of the plurality of departments, a processor, and memory having instructions stored therein which, when executed by the processor, cause the processor to compare a wirelessly received identification code with the plurality of identification codes stored in the at least one database, to compare a wirelessly received customer code with the plurality of customer codes stored in the database if the wirelessly received identification code matches one of the plurality of identification codes stored in the at least one database and the signal broadcasting device location associated in the at least one database with the matching one of the plurality of stored identification codes corresponds to one of one or more entrances to the brick-and-mortar outlet, and, if the wirelessly received customer code matches the one of the plurality of customer codes associated in the at least one database with the order code, to control a display monitor at the one of the plurality of departments to display a first notification message and to wirelessly transmit a second notification message to the mobile communication device identified by the contact information associated in the at least one database with the matching one of the plurality of customer codes, the first and second notification messages each including information relating to at least one of the customer identified by the matching one of the plurality of customer codes and the order identified by the order code.

In yet a further aspect, a system for identifying customers with ordered items at a retail enterprise may comprise a plurality of wireless signal broadcasting devices located in, near or adjacent to a brick-and-mortar outlet of the retail enterprise, at least one database having stored therein a plurality of identification codes each identifying a different one of the plurality of wireless signal broadcasting devices and each associated in the at least one database with a wireless signal broadcasting device location corresponding to a location within, near or adjacent to the brick-and-mortar outlet of a different one of the plurality of wireless signal broadcasting devices, and a plurality of customer codes each identifying a different one of a plurality of customers of the retail enterprise, one of the plurality of customer codes associated in the at least one database with an order code identifying an order placed by one of the customers identified by the one of the plurality of customer codes for an item to be delivered to the identified customer by one of a plurality of departments within the brick-and-mortar outlet and also with contact information identifying a mobile communication device associated with the identified customer, a display monitor located in the one of the plurality of departments, and a server coupled to each of the plurality of wireless signal broadcasting devices and to the display monitor, the server including at one module to compare a wirelessly received identification code with the plurality of identification codes stored in the at least one database, to compare a wirelessly received customer code with the plurality of customer codes stored in the database if the wirelessly received identification code matches one of the plurality of identification codes stored in the at least one database and the signal broadcasting device location associated in the at least one database with the matching one of the plurality of stored identification codes corresponds to one of one or more entrances to the brick-and-mortar outlet, and, if the wirelessly received customer code matches the one of the plurality of customer codes associated in the at least one database with the order code, to control a display monitor at the one of the plurality of departments to display a first notification message and to wirelessly transmit a second notification message to the mobile communication device identified by the contact information associated in the at least one database with the matching one of the plurality of customer codes, the first and second notification messages each including information relating to at least one of the customer identified by the matching one of the plurality of customer codes and the order identified by the order code.

In still another aspect, a non-transitory machine-readable medium may comprise a plurality of instructions which, when executed by at least one processor, result in the at least one processor associating in a first database each of one or more customer entrances in a brick-and-mortar outlet of the retail enterprise with a different identification code stored in the first database, associating in the first or a second database one of a plurality of customer codes stored in the first or second database and identifying one of a plurality of customers of the retail enterprise with an order code identifying an order placed by the identified customer for an item to be delivered to the identified customer by one of a plurality of departments in the brick-and-mortar outlet and also with contact information identifying a mobile communication device associated with the identified customer, comparing a wirelessly received identification code with the identification codes stored in the first database, if the wirelessly received identification code matches one of the identification codes associated in the first database with one of the one or more customer entrances in the brick-and-mortar outlet, comparing a wirelessly received customer code with the plurality of customer codes stored in the first or second database, and if the wirelessly received customer code matches the one of the plurality of customer codes associated in the first or second database with the order code, controlling a display monitor at the one of the plurality of departments to display a first notification message and wirelessly transmitting, under control of the first processor, a second notification message to the mobile communication device identified by the contact information associated in the first or second database with the matching one of the plurality of customer codes, the first and second notification messages each including information relating to at least one of the customer identified by the matching one of the plurality of customer codes and the order identified by the order code, and the second notification message further including information relating to an identity of the one of the plurality of departments.

In yet another aspect, a method of identifying customers with ordered items at a retail enterprise may comprise associating, with a first processor in a first database, each of a plurality of wireless signal broadcasting devices within, near or adjacent to a brick-and-mortar outlet of the retail enterprise with a different identification code, associating, with the first processor in the first or a second database, one of a plurality of customer codes identifying one of a plurality of customers of the retail enterprise and an order code identifying an order placed by the identified customer for an item to be delivered to the identified customer by one of a plurality of departments within the brick-and-mortar outlet, and in response to a wirelessly received identification code and customer code, controlling, at least in part with the first processor, a display monitor at one of the plurality of departments to display a notification message if the wirelessly received identification code matches the one of the plurality of identification codes associated in the first database with one of the plurality of wireless signal broadcasting devices located at or near at least one of an entrance to the brick-and-mortar outlet, the one of the plurality of departments within the brick-and-mortar outlet and a curb-side, item delivery location near or adjacent to the brick-and-mortar outlet, and the wirelessly received customer code matches the one of the plurality of customer codes associated in the first or second database with the order code, the notification message including information relating to at least one of the customer identified by the matching one of the plurality of customer codes and the order identified by the order code.

In still another aspect, a system for identifying customers with ordered items at a retail enterprise may comprise a plurality of signal broadcasting devices located in, near or adjacent to a brick-and-mortar outlet of the retail enterprise, a display monitor located in one of the plurality of departments, at least one database having stored therein a plurality of identification codes each identifying a different one of the plurality of wireless signal broadcasting devices and each associated in the at least one database with a wireless signal broadcasting device location corresponding to a location within, near or adjacent to the brick-and-mortar outlet of a different one of the plurality of wireless signal broadcasting devices, and a plurality of customer codes each identifying a different one of a plurality of customers of the retail enterprise, one of the plurality of customer codes associated in the at least one database with an order code identifying an order placed by a corresponding one of the plurality of customers for an item to be delivered to the corresponding one of the plurality of customers by the one of the plurality of departments, a processor, and memory having instructions stored therein which, when executed by the processor, cause the processor to control the display monitor, in response to a wirelessly received identification code and customer code, to display a notification message if the wirelessly received identification code matches one of the plurality of identification codes stored in the at least one database and the signal broadcasting device location associated in the at least one database with the matching one of the plurality of stored identification codes corresponds to an entrance to the brick-and-mortar outlet, the one of the plurality of departments or a curb-side, item delivery location near or adjacent to the brick-and-mortar outlet, and the wirelessly received customer code matches the one of the plurality of customer codes associated in the at least one database with the order code, the notification message including information relating to at least one of the customer identified by the matching customer code and the order identified by the order code.

In a further aspect, a system for identifying customers with ordered items at a retail enterprise may comprise a plurality of signal broadcasting devices located in, near or adjacent to a brick-and-mortar outlet of the retail enterprise, a display monitor located in one of the plurality of departments, at least one database having stored therein a plurality of identification codes each identifying a different one of the plurality of wireless signal broadcasting devices and each associated in the at least one database with a wireless signal broadcasting device location corresponding to a location within, near or adjacent to the brick-and-mortar outlet of a different one of the plurality of wireless signal broadcasting devices, and a plurality of customer codes each identifying a different one of a plurality of customers of the retail enterprise, one of the plurality of customer codes associated in the at least one database with an order code identifying an order placed by a corresponding one of the plurality of customers for an item to be delivered to the corresponding one of the plurality of customers by the one of the plurality of departments, and a server coupled to each of the plurality of wireless signal broadcasting devices and to the display monitor, the server including at least one module to control the display monitor, in response to a wirelessly received identification code and customer code, to display a notification message if the wirelessly received identification code matches one of the plurality of identification codes stored in the at least one database and the signal broadcasting device location associated in the at least one database with the matching one of the plurality of stored identification codes corresponds to an entrance to the brick-and-mortar outlet, the one of the plurality of departments or a curb-side, item delivery location near or adjacent to the brick-and-mortar outlet, and the wirelessly received customer code matches the one of the plurality of customer codes associated in the at least one database with the order code, the notification message including information relating to at least one of the customer identified by the matching customer code and the order identified by the order code.

In yet another aspect, a non-transitory machine-readable medium may comprise a plurality of instructions which, when executed by at least one processor, result in the at least one processor associating in a first database each of a plurality of wireless signal broadcasting devices within a brick-and-mortar outlet of the retail enterprise with a different identification code, associating in the first or a second database one of a plurality of customer codes identifying one of a plurality of customers of the retail enterprise and an order code identifying an order placed by the identified customer for an item to be delivered to the identified customer by one of a plurality of departments within the brick-and-mortar outlet, and in response to a wirelessly received identification code and customer code, controlling a display monitor at one of the plurality of departments to display a notification message if the wirelessly received identification code matches the one of the plurality of identification codes associated in the first database with one of the plurality of wireless signal broadcasting devices located at or near at least one of an entrance to the brick-and-mortar outlet, the one of the plurality of departments and a curb-side, item delivery location near or adjacent to the brick-and-mortar outlet, and the wirelessly received customer code matches the one of the plurality of customer codes associated in the first or second database with the order code, the notification message including information relating to at least one of the customer identified by the matching one of the plurality of customer codes and the order identified by the order code.

In still another aspect, a method of identifying customers with ordered items at a retail enterprise may comprise, with communication circuitry of a mobile communication device located within a broadcast range of a wireless signal broadcasting device located at or proximate to one of a plurality of departments in a brick-and-mortar outlet of the retail enterprise, detecting at least one of one or more wireless identification signals broadcast by the wireless signal broadcasting device, the one or more wireless identification signals each carrying an identification code that uniquely identifies the wireless signal broadcasting device and distinguishes the wireless signal broadcasting device from one or more other wireless signal broadcasting devices in the brick-and-mortar outlet, under control of a first processor carried by the mobile communication device, and in response to detection of the at least one of the one or more wireless signals broadcast by the wireless signal broadcasting device, automatically transmitting to at least one of a server of the retail enterprise and a point-of-sale system associated with the one of the plurality of departments a wireless communication signal carrying at least the identification code carried by the detected at least one of the one or more wireless identification signals, as part of the wireless communication signal or separately from the wireless communication signal, wireless transmitting, under control of the first processor, a customer code stored in a memory of the mobile communication device, with at least a second processor associated with the at least one of the server and the point-of-sale system associated with the one of the plurality of departments, comparing the identification code carried by the wireless communication signal with a plurality of identification codes stored in at least one database, each one of the plurality of stored identification codes identifying a different wireless signal broadcasting device located in the brick-and-mortar outlet, to identify the one of the plurality of departments associated in the at least one database with a corresponding one of the plurality of stored identification codes that matches the identification code carried by the at least one wireless communication signal, with the at least a second processor, comparing the customer code wirelessly transmitted by the mobile communication device with a plurality of customer codes stored in at least one database, each of the plurality of stored customer codes associated in the at least one database with a different one of a plurality of customers of the retail enterprise, to identify the one of the plurality of stored customer codes that matches the customer code wirelessly transmitted by the mobile communication device, with the at least a second processor, locating an order code stored in at least one database and associated in the at least one database with the matching one of the plurality of stored customer codes, the located order code identifying an order placed by the customer identified by the matching one of the plurality of stored customer codes for an item to be delivered to the identified customer by the identified one of the plurality of departments, and controlling, with the at least a second processor, a display monitor at the identified one of the plurality of departments to display a notification message including information relating to at least one of the customer identified by the matching one of the plurality of stored customer codes and the order identified by the located order code.

In still a further aspect, a system for identifying customers with ordered items at a retail enterprise may comprise a server associated with the retail enterprise, a plurality of departments each located within one of one or more brick-and-mortar outlets of the retail enterprise, a plurality of wireless signal broadcasting devices each located at or near a different one of the plurality of departments, each of the plurality of wireless signal broadcasting devices to broadcast wireless identification signals each carrying an identification code that uniquely identifies the corresponding wireless signal broadcasting device and distinguishes the corresponding wireless signal broadcasting device from others of the plurality of wireless signal broadcasting devices, at least one database having stored therein a plurality of identification codes each associated with a different one of the plurality of wireless signal broadcasting devices and each also associated with a corresponding one of the plurality of departments at or near which the associated wireless signal broadcasting device is located, a mobile communication device located within a broadcast range of one of the plurality of wireless signal broadcasting devices, the mobile communication device including first communication circuitry to detect at least one of the wireless identification signals broadcast by the one of the plurality of wireless signal broadcasting devices, the mobile communication device including a first processor and a first memory having instructions stored therein which, when executed by the first processor, cause the first processor to automatically control the first communication circuitry to wirelessly transmit a wireless communication signal in response to detection of the at least one of the one or more wireless identification signals broadcast by the one of the plurality of wireless signal broadcasting devices, the wireless communication signal carrying the identification code carried by the detected at least one of the one or more wireless identification signals, at least a second communication circuitry to receive the wireless communication signal transmitted by the first communication circuitry of the mobile communication device, at least a second processor and a second memory having instructions stored therein which, when executed by the at least a second processor, cause the at least a second processor to compare the identification code carried by the wireless communication signal with the plurality of identification codes stored in the at least one database to identify one of the plurality of stored identification codes that matches the identification code carried by the wireless communication signal and to identify the one of the plurality of departments associated in the at least one database with the identified one of the plurality of stored identification codes, and a display monitor located in the one of the plurality of departments, the at least a second processor, the second memory and the at least a second communication circuitry associated with at least one of the server and a point-of-sale system associated with the identified one of the plurality of departments, the at least one database further having stored therein a plurality of customer codes each associated with a different one of a plurality of customers of the retail enterprise, one or more of the customer codes in the plurality of customer codes also associated in the at least one database with at least one order code, the at least one order code associated with each of the one or more customer codes in the plurality of customer codes identifying at least one order placed by a corresponding one of the plurality of customers for at least one item to be delivered to the corresponding one of the plurality of customers by the identified one of the plurality of departments, the instructions stored in the first memory of the mobile communication device further including instructions which, when executed by the first processor, cause the first processor to control the first communication circuitry to wirelessly transmit, as part of the wireless communication signal or separately from the wireless communication signal, a customer code stored in the first memory or in another memory of the mobile communication device, the instructions stored in the second memory further including instructions which, when executed by the at least a second processor, cause the at least a second processor to compare the customer code wirelessly transmitted by the first communication circuitry and received by the at least a second communication circuitry with the plurality of customer codes stored in the at least one database to identify one of the plurality of stored customer codes that matches the customer code wirelessly transmitted by the first communication circuitry, and to control the display monitor to display a notification message if the identified one of the plurality of customer codes is one of the one or more of the customer codes in the plurality of customer codes associated in the at least one database with at least one order code, the notification message including information relating to at least one of the customer associated with the identified one of the plurality of stored customer codes and the at least one order identified by the at least one order code associated in the at least one database with the identified one of the plurality of stored customer codes.

In yet a further aspect, a method of identifying customers with ordered items at a retail enterprise may comprise associating, with a first processor in a first database, each of one or more curb-side, item delivery locations in a drive-through, ordered item delivery area adjacent to a brick-and-mortar outlet of the retail enterprise with a different identification code stored in the first database, associating, with the first processor in the first or a second database, one of a plurality of customer codes stored in the first or second database and identifying one of a plurality of customers of the retail enterprise with an order code identifying an order placed by the identified customer for an item to be delivered to the identified customer at the drive-through, ordered item delivery area adjacent to the brick-and-mortar outlet by an employee of a curb-side delivery service department in the brick-and-mortar outlet and also with contact information identifying a mobile communication device associated with the identified customer, comparing, with the first processor, a wirelessly received identification code with the identification codes stored in the first database, if the wirelessly received identification code matches one of the identification codes associated in the first database with one of the one or more curb-side, item delivery locations adjacent to the brick-and-mortar outlet, comparing, with the first processor, a wirelessly received customer code with the plurality of customer codes stored in the first or second database, and if the wirelessly received customer code matches the one of the plurality of customer codes associated in the first or second database with the order code, controlling, with the first processor, a display monitor at the curb-side delivery service department to display a first notification message, the first notification message including information identifying the order identified by the order code and the customer that is associated with the matching one of the plurality of customer codes and that is presently located at the matching one of the one or more curb-side, item delivery locations.

In still another aspect, a system for identifying customers with ordered items at a retail enterprise may comprise at least one wireless signal broadcasting devices located at or near a curb-side, item delivery location in a drive-through, ordered item delivery area adjacent to a brick-and-mortar outlet of the retail enterprise, at least one database having stored therein at least one identification code identifying the at least one wireless signal broadcasting device and associated in the at least one database with the curb-side, item delivery location, and a plurality of customer codes each identifying a different one of a plurality of customers of the retail enterprise, one of the plurality of customer codes associated in the at least one database with an order code identifying an order placed by one of the customers identified by the one of the plurality of customer codes for at least one item to be delivered to the identified customer at the drive-through, ordered item delivery area adjacent to the brick-and-mortar outlet by an employee of a curb-side delivery service department in the brick-and-mortar outlet within the brick-and-mortar outlet and also with contact information identifying a mobile communication device associated with the identified customer, a display monitor located in the curb-side delivery service department, a processor, and memory having instructions stored therein which, when executed by the processor, cause the processor to compare a wirelessly received identification code with the at least one identification code stored in the at least one database, to compare a wirelessly received customer code with the plurality of customer codes stored in the database if the wirelessly received identification code matches the at least one identification code stored in the at least one database, and, if the wirelessly received customer code matches the one of the plurality of customer codes associated in the at least one database with the order code, to control a display monitor at the curb-side delivery service department to display a first notification message, the first notification message including information identifying the order identified by the order code associated in the at least one database with the one of the plurality of customer codes, and information identifying the customer that is associated with the one of the plurality of customer codes and that is presently located at the curb-side, item delivery location associated in the at least one database with the at least one identification code.

In yet a further aspect, a non-transitory machine-readable medium may comprise a plurality of instructions which, when executed by at least one processor, result in the at least one processor associating in a first database each of one or more curb-side, item delivery locations in a drive-through, ordered item delivery area adjacent to a brick-and-mortar outlet of the retail enterprise with a different identification code stored in the first database, associating in the first or a second database, one of a plurality of customer codes stored in the first or second database and identifying one of a plurality of customers of the retail enterprise with an order code identifying an order placed by the identified customer for an item to be delivered to the identified customer at the drive-through, ordered item delivery area adjacent to the brick-and-mortar outlet by an employee of a curb-side delivery service department in the brick-and-mortar outlet and also with contact information identifying a mobile communication device associated with the identified customer, comparing a wirelessly received identification code with the identification codes stored in the first database, if the wirelessly received identification code matches one of the identification codes associated in the first database with one of the one or more curb-side, item delivery locations adjacent to the brick-and-mortar outlet, comparing a wirelessly received customer code with the plurality of customer codes stored in the first or second database, and if the wirelessly received customer code matches the one of the plurality of customer codes associated in the first or second database with the order code, controlling a display monitor at the curb-side delivery service department to display a first notification message, the first notification message including information identifying the order identified by the order code and the customer that is associated with the matching one of the plurality of customer codes and that is presently located at the matching one of the one or more curb-side, item delivery locations.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

FIG. 7 is a simplified flow diagram of an embodiment of a process for identifying customers at brick-and-mortar stores of the retail enterprise that have one or more pending orders for one or more items.

DETAILED DESCRIPTION OF THE DRAWINGS

Figure 1:
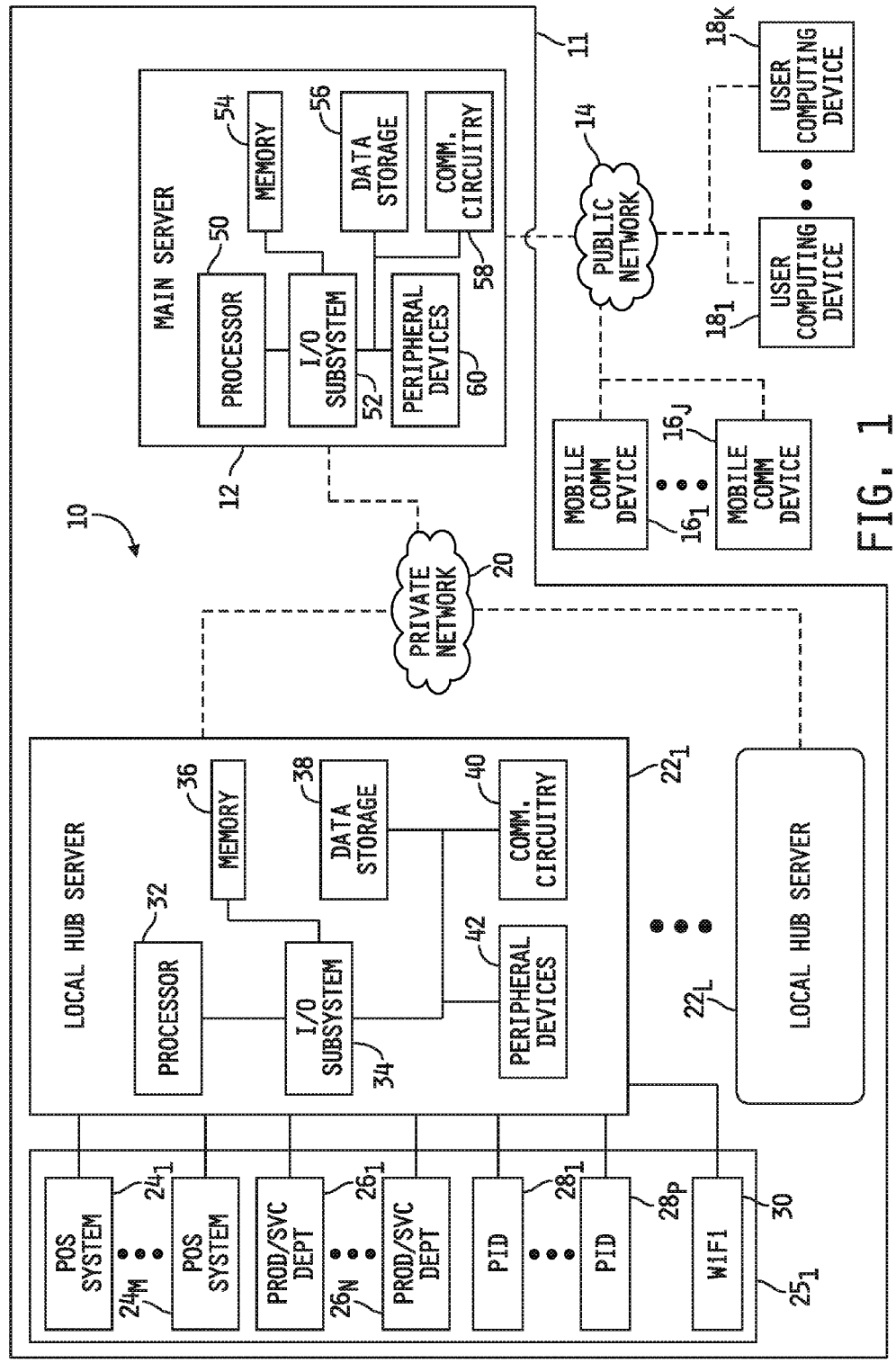
FIG. 1 is a simplified block diagram of an embodiment of a system for identifying customers with ordered items at a retail enterprise.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium may be embodied as any device or physical structure for storing or transmitting information in a form readable by a machine (e.g., a computing device). For example, a machine-readable medium may be embodied as any one or combination of read only memory (ROM); random access memory (RAM); magnetic disk storage media; optical storage media; flash memory devices; and others.

Referring now to FIG. 1, a system 10 is shown for identifying customers with ordered items at a retail enterprise. The system 10 includes a retail enterprise 11 having a main server 12 configured to communicate with shoppers via a public network 14, e.g., the Internet, and shoppers may access the public network 14 using any conventional public network accessible electronic device and/or system. In the illustrated embodiment, for example a number, J, of mobile communication devices $16_1$-$16_J$, and a number, K, of user computing devices $18_1$-$18_K$, are shown. Each is configured to communicatively connect to the public network 14, and J and K may each be any positive integer. The retail enterprise 11 may include any number of brick-and-mortar retail outlets each having one or more point-of-sale systems $24_1$-$24_M$, $24_1$-$24_N$ operating therein. The main server 12 is configured to communicate with each such point-of-sale (POS) system $24_1$-$24_M$, $24_1$-$24_N$, each of which operate in a conventional manner to process items to be purchased by shoppers during purchase transactions.

Each of the brick-and-mortar stores 25 may further include at least one conventional WiFi Access Point 30 which may be coupled to the corresponding local hub server 22, or directly to the main server 12 in any one or more of the brick-and-mortar stores 25 not having an associated local hub server 22. Each such WiFi Access Point 30 is illustratively controlled by the main server 12 (or corresponding local hub server 22) in a conventional manner to establish at least one corresponding Internet hotspot within the brick-and-mortar store 25 via which customers (and employees) can access the public network 14, e.g., to access the Internet, using any conventional public network accessible electronic device and/or system, e.g., such as with any of the plurality of mobile communication devices $16_1$-$16_K$.

In some embodiments, the main server 12 illustratively hosts an enterprise member or membership services (EMS) program which includes or otherwise has access to a virtual coupon bank and a customer purchase history database containing purchase histories of one or more customers of the retail enterprise 11. As used herein, the terms "enterprise member services program," "EMS program" and "customer membership service" are interchangeable and refer to a shopper or customer service which a retail enterprise 11 may offer to customer members in the form of one or more services such as making available to customers one or more virtual discount coupons that may be redeemable by the retail enterprise against the purchase of from the retail enterprise of various goods and/or services and/or tracking and maintaining customer purchase histories in a customer purchase history database accessible by the main server 12. In this regard, the terms "customer membership account" and "EMS account" are likewise interchangeable and refer to a mechanism by which the retail enterprise 11 may make available to customers one or more virtual discount coupons and/or by which a customer's purchase history and information about the customer can be maintained by the main server 12 in a database separately from purchase histories of and information about other customers. Further in this regard, the term "EMS identification code" or EMSID illustratively refers to at least one collection of letters, symbols and/or numbers that is different for, and therefore unique to, each customer member of the enterprise membership services program, and which is used to uniquely identify a customer's EMS account within the enterprise membership services program. In one embodiment, for example, the EMSID for each customer may include a unique, several-digit access code and a separate and unique, several-digit password, although in other embodiments the EMSID may include more, fewer and/or different codes and/or passwords.

The main server 12 illustratively includes an EMS module that manages and controls a customer-member interface, e.g., a web-based interface, to the EMS program via which customers can access and manage their individual EMS accounts. Illustratively, each customer may access their individual (and private from other customer-members) EMS account, i.e., their individual EMS page(s) within the web-based EMS interface, which may be referred to hereinafter as an "EMS website," by entering that customer's EMSID into a graphic user interface element of the web-based EMS interface. Therein, the customer may access, establish, modify and otherwise manage the customer's EMS account information including, for example, but not limited to, name, address, email address, mobile telephone number and the like.

In the embodiment illustrated in FIG. 1, the main server 12 is coupled via a private network 20 to a plurality of local hub servers $22_1$-$22_L$, where L may be any positive integer, and each local hub server $22_1$-$22_L$ is coupled to one or more conventional point-of-sale systems, e.g., $24_1$-$24_M$. Each of the point-of-sale systems $24_1$-$24_M$ is located in a different one of one or more brick-and-mortar stores of the retail enterprise 11, and is configured to process items selected by customers for purchase at a corresponding brick-and-mortar store. While only one such brick-and-mortar store $25_1$ is shown in FIG. 1, it will be understood that each of the local hub servers $22_1$-$22_L$ may be coupled to a different brick-and-mortar store, each as illustrated with respect to the brick-and-mortar store $25_1$, such that the retail enterprise 11 may include any number, L, of brick-and-mortar stores $25_1$-$25_L$. Some retail enterprises 11 may include a single brick and mortar store, and other larger enterprises may include two or more physically remote brick and mortar stores. In the latter case, the retail enterprise 11 may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the main server 12 in the system 10 shown in FIG. 1 will typically be located at a main business location of the retail enterprise, and will be coupled via the network 20 to two or more local hub servers $22_1$-$22_L$, each of which will typically be located at a different one of the two or more hub locations.

Each hub location may include any number of point-of-sale systems coupled to a corresponding local hub server, and in the embodiment illustrated in FIG. 1, for example, the local hub server $22_1$ is communicatively coupled to "M" such point-of-sale systems $24_1$-$24_M$, where M may be any positive integer. Communicative coupling between the local hub server $22_1$ and the one or more point-of-sale systems $24_1$-$24_M$ may be accomplished using any known communication coupling, and communications over any such hardwire and/or wireless coupling may be accomplished using any known communication protocol.

In some alternative embodiments of such a large retail enterprise, one or more of the local hub servers $22_1$-$22_L$ may be omitted, and the main server 12 may be coupled directly, via the network 20, to one or more point-of-sale systems $24_1$-$24_M$ or the main server 12 may be omitted and at least one of the local hub servers $22_1$-$22_L$ may be configured to act as a so-called master server with the remaining local hub servers $22_1$-$22_L$ configured to act as so-called slave servers. In other alternative embodiments in which the retail enterprise includes only a single brick and mortar store, the local hub servers $22_1$-$22_L$ may be or include the main server 12 or vice versa. For purposes of the following description, any process disclosed as being controlled by the main server 12 may, in some embodiments, instead be controlled, in whole or in part, by one or more local hub servers $22_1$-$22_L$ and vice versa, and/or may be controlled, in whole or in part, by one of the point-of-sale systems $24_1$-$24_M$ and vice versa.

The local hub server $22_1$ may be embodied as any type of server or similar computing device capable of performing the functions described herein. In the illustrative embodiment of FIG. 1, the local hub server $22_1$ includes a processor 32, an I/O subsystem 34, a memory 36, a data storage 38, a communication circuitry 40, and one or more peripheral devices 42. It should be appreciated that the local hub server $22_1$ may include other components, sub-components, and devices commonly found in a server and/or computing device, which are not illustrated in FIG. 1 for clarity of the description.

The processor 32 of the local hub server $22_1$ may be embodied as any type of processor capable of executing software/firmware, such as a microprocessor, digital signal processor, microcontroller, or the like. The processor 32 may be a single processor or include multiple processors. The I/O subsystem 32 of the local hub server $22_1$ may be embodied as circuitry and/or components to facilitate input/output operations with the processor 32 and/or other components of the local hub server $22_1$. The processor 32 is communicatively coupled to the I/O subsystem 34.

The memory 36 of the user local hub server 104 may be embodied as or otherwise include one or more conventional volatile and/or non-volatile memory devices. The memory 36 is communicatively coupled to the I/O subsystem 34 via a number of signal paths. Although only a single memory device 34 is illustrated in FIG. 1, the local hub server $22_1$ may include additional memory devices in other embodiments. Various data and software may be stored in the memory 36 The data storage 38 is also communicatively coupled to the I/O subsystem 34 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 40 of the local hub server $22_1$ may include any number of devices and circuitry for enabling communications between the local hub sever $22_1$ and the main server 12 and between the local hub server $22_1$ and the one or more point-of-sale systems $24_1$-$24_M$. In the illustrated embodiment, for example, communication between the local hub server $22_1$ and the main server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server $22_1$ and the main server 12 may be a non-private network and/or may be, in whole or in part, a wired connection. Generally, the communication circuitry 40 may be configured to use any one or more, or combination, of conventional secure and/or unsecure communication protocols to communicate with the main server 12. As such, the network 20 may include any number of additional devices, such as additional computers, routers, and switches, to facilitate communications between the local hub server $22_1$ and the main server 12. Communication between the local hub server $22_1$ and the one or more point-of-sale systems $24_1$-

$24_M$ may take place via one or more such wireless communication interfaces and/or via one or more conventional wired interfaces.

In some embodiments, the local hub server $22_1$ may also include one or more peripheral devices 42. Such peripheral devices 40 may include any number of additional input/output devices, interface devices, and/or other peripheral devices. For example, the peripheral devices 42 may include a display, a keyboard, a mouse, audio processing circuitry, and/or other input/output devices.

The local hub server $22_L$ may be substantially similar to the local hub server $22_1$ and include similar components. As such, the description provided above of the components of the local hub server $22_1$ may be equally applicable to such similar components of the local hub server $22_L$ and are not repeated herein so as not to obscure the present disclosure. Of course, it should be appreciated that in some embodiments one or more of the local hub servers $22_1$-$22_L$ and may be dissimilar to others of the local hub servers $22_1$-$22_L$.

An embodiment of the main server 12 is also illustrated in FIG. 1, and generally includes the same components as the local hub server $22_1$. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server $22_1$ described above, and a detailed explanation of such components will not be repeated here for brevity. In other embodiments, the main server 12 may be configured differently than the local hub server $22_1$ described above. In any case, the communication circuitry 38 of each of the local hub servers $22_1$-$22_L$ facilitates communication with the communication circuitry 58 of the main server 12 and vice versa so that information can be shared between the main server 12 and each of the one or more local hub servers $22_1$-$22_L$ via the network 20. Although only one such main server 12 is shown in FIG. 1, it should be appreciated that, in other embodiments, the system 10 may include any number of shopper main servers, and in still other embodiments the main server 12 may be communicatively coupled to one or more remote servers of the retail enterprise. In such embodiments, the one or more remote servers may include any structure or feature illustrated and described herein with respect to the main server 12, and may be configured to execute any one or more functions described with respect to the main server 12 either alternatively to the main server 12 or in addition to the main server 12. In any case, the main server 12 may be embodied as any type of server or similar computing device capable of performing the functions described herein.

The mobile communication devices $16_1$-$16_J$ illustrated in FIG. 1 are intended to depict mobile communication devices that are each separately owned and/or operated by a different shopper. No limit on the total number of such mobile communication devices $16_1$-$16_J$ that may be owned and operated by any one shopper, or on the total number of such mobile communication devices $16_1$-$16_J$ that may communicate with the main server 12, is intended or should be inferred. The mobile communication devices $16_1$-$16_J$ may be or include any mobile electronic device capable of executing one or more software application programs as described herein and of communicating with the main server 12 via the public network 14. Examples of the mobile communication devices $16_1$-$16_J$ include, but should not be limited to, mobile telephones, smart phones, tablet computers, personal data assistants (PDAs), and the like.

The user computing devices $18_1$-$18_L$ illustrated in FIG. 1 are intended to include any of privately owned and accessed computers, such as those residing in customer's residences, to include semi-privately owned and accessed computers, such as those residing at multiple-employee business enterprises, and publicly accessible computers, such as those available at internet cafés and kiosks. The user computing devices $18_1$-$18_L$ may be or include any computer capable of executing one or more software programs and of communicating with the main server 12 via the public network 14 for various purposes including, for example, accessing by customers of their EMS web page(s). Examples of the user computing devices $18_1$-$18_L$ include, but should not be limited to, personal computers (PCs), laptop computers, notebook computers and the like, whether or not networked with one or more other computing devices.

Figure 4:
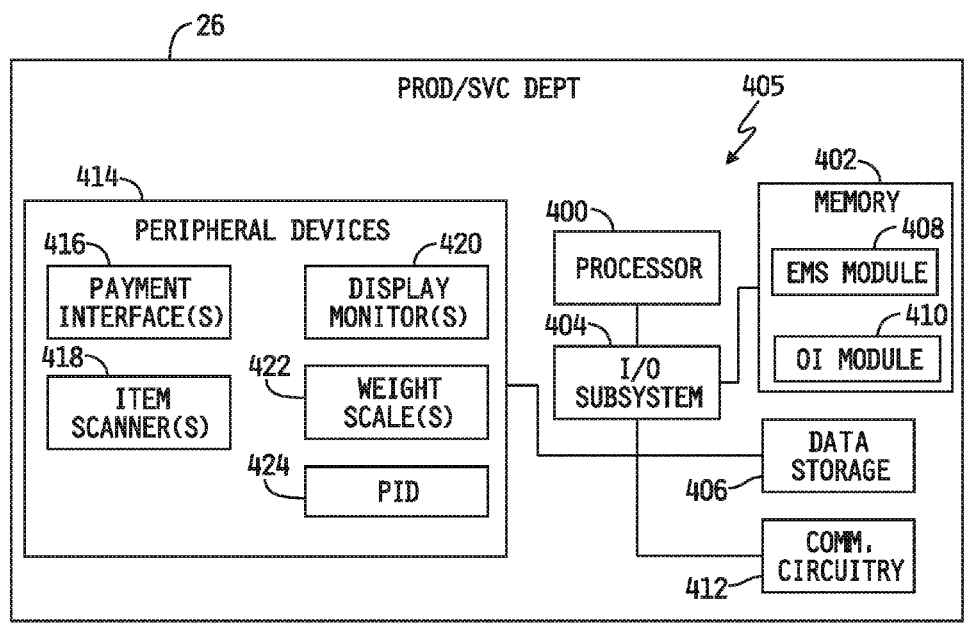
FIG. 4 is a simplified block diagram of an embodiment of one of the product/service departments illustrated in FIG. 1.

Also depicted in FIG. 1 are a number of product/service departments $26_1$-$26_N$ each illustratively coupled to the local hub server 22 in a different one of the brick-and-mortar enterprise locations $25_1$-$25_L$ such that each brick-and-mortar enterprise location includes a one or more such product/service departments $26_1$-$26_N$. In alternate embodiments, one or more or all of the product/service departments $26_1$-$26_N$ may not be coupled to the local hub server 22 but may instead be coupled directly, e.g., via the private network 20, to the main server 12. The product/service departments $26_1$-$26_N$ each illustratively comprise a separate department within each brick-and-mortar store, and each such product/service department illustratively offers a particular product or service, or a particular set of products or services, typically not offered by any other department within the same brick-and-mortar store. Examples of such product/service departments include, but are not limited to, a bakery, a pharmacy, a meat department, seafood department, a dairy department, a produce department, a beverage department, a frozen food department, a photograph developing service department, an electronics department, a sporting goods department, a nursery, a seasonal goods department, a clothing department, a shoe department, a pet food and/or accessory department, an automotive goods department, and kitchenware department, a hardware department, and the like. One or more of the product/service departments $26_1$-$26_N$ illustratively include an electronic system or device located therein or otherwise associated therewith. An embodiment of such an electronic system or device located in, at, near or otherwise associated with any of the product/service departments is illustrated in FIG. 4 and will be described in detail hereinafter. Each product/service department $26_1$-$26_N$ prepares, procures, purchases, stocks or otherwise makes available to and delivers to customers one or more products and/or services that is/are typically unique to that product/service department.

Also depicted in FIG. 1 are a number of conventional position identification devices (PIDs) $28_1$-$28_P$ each illustratively coupled to the local hub server 22 in a different one of the brick-and-mortar enterprise locations 25 such that each brick-and-mortar enterprise location includes a plurality of such position identification devices $28_1$-$28_P$. In alternate embodiments, one or more or all of the PIDs $28_1$-$28_P$ may not be coupled to the local hub server 22. In one embodiment, the position identification devices $28_1$-$28_P$ are provided in the form of conventional electronic wireless signal broadcasting devices 224, e.g., conventional radio frequency broadcasting beacons, for the purpose of broadcasting radio signals carrying information corresponding to the location and/or identity thereof, and will be described in the remainder of this document as such. It will be understood, however, that this disclosure contemplates other embodiments in which one or more of the position identification devices $28_1$-$28_P$ is/are provided in another form. Examples of such other forms will be described at the end of this document.

Illustratively, the PIDs $28_1$-$28_P$ in each of the plurality of brick-and-mortar stores $25_1$-$25_L$ may be positioned at various locations within the brick-and-mortar store. At least one of the wireless signal broadcasting devices $28_1$-$28_P$ is illustratively located at, near, or adjacent to at least one customer entrance to the brick-and-mortar store, e.g., such that each such wireless signal broadcasting device $28_1$-$28_P$ is associated with, and therefore identifies, a corresponding customer entrance to the brick-and-mortar store. In any case, each such wireless signal broadcasting device $28_1$-$28_P$ is illustratively configured to periodically broadcast one or more unique wireless identification signals, i.e., one or more identification signals that distinguish the particular wireless signal broadcasting device 28 from other wireless signal broadcasting devices $28_1$-$28_P$.

In some embodiments, the wireless signal broadcasting devices $28_1$-$28_P$ are each configured to periodically broadcast wireless identification signals in the radio frequency (RF) range, although any of the one or more wireless signal broadcasting devices $28_1$-$28_P$ may be configured to alternatively broadcast wireless identification signals in one or more other frequency ranges. In any case, the wireless signal broadcasting devices $28_1$-$28_P$ are further each illustratively configured to broadcast wireless identification signals with a predefined broadcast range and/or orientation (i.e., direction) as will be described in greater detail hereinafter. Illustratively, the unique wireless identification signals broadcast by each wireless signal broadcasting devices $28_1$-$28_P$ carry decodable information in the form of a unique identification code (UID). Generally, the UID of each wireless signal broadcasting device $28_1$-$28_P$ uniquely identifies that wireless signal broadcasting device and distinguishes that wireless signal broadcasting device from all other wireless signal broadcasting devices within the retail enterprise 11 or at least those located in any one brick-and-mortar store 25. Those skilled in the art will recognize additional and/or alternative information that may be included within or appended to the UID, and/or carried by the unique wireless identification signals broadcast by the wireless signal broadcasting devices $28_1$-$28_P$, and it will be understood that any such additional and/or alternative information is contemplated by this disclosure.

Figure 2:
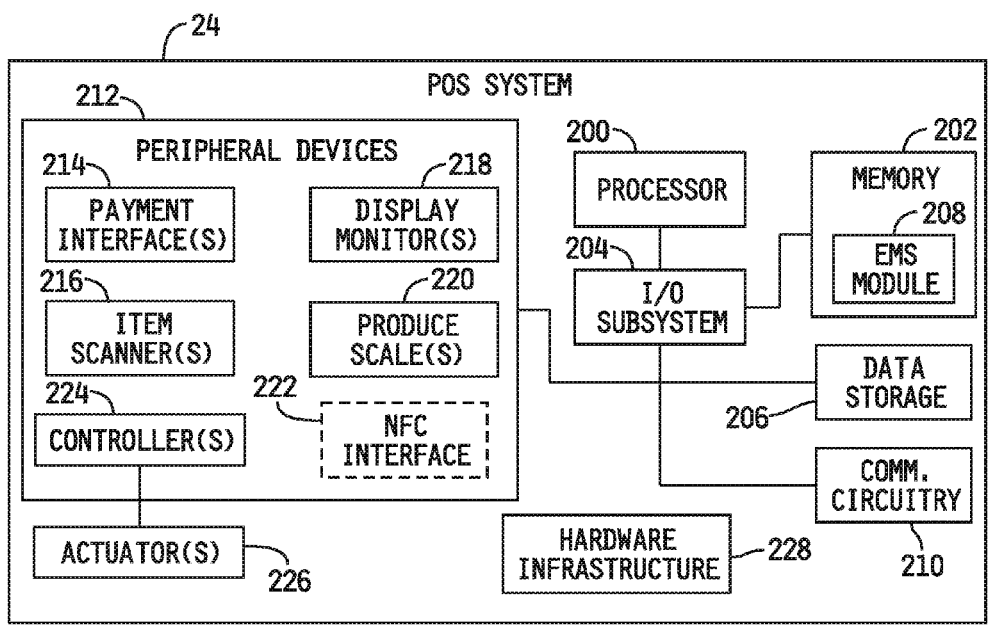
FIG. 2 is a simplified block diagram of an embodiment of one of the point-of-sale systems illustrated in FIG. 1.

Referring now to FIG. 2, an embodiment 24 of one of the one or more point-of-sale systems, $24_1$-$24_M$ is shown which includes components similar to the main server 12 and also to the one or more local hub servers $22_1$-$22_L$, such as a processor 200, an I/O subsystem 204, a memory 202, a data storage device 206, communication circuitry 210 and a number of peripheral devices 212. In some embodiments, each of the foregoing components may be identical to corresponding components of the local hub server $22_1$ described above, and a detailed explanation of such components will not be repeated here for brevity. In other embodiments, any of the one or more point-of-sale systems $24_1$-$24_M$ may be configured differently than the local hub server $22_1$ described above. In the illustrated embodiment, the memory 202 illustratively includes an EMS module 208 in the form of, e.g., instructions executable by the processor 200, to communicate customer-member information relating to the customer's EMS account to and from the main server 12, and to control one or more local peripheral devices to facilitate communications between customer-members of the enterprise membership service (EMS) program and the main server 12 and to facilitate manual customer input of customer-identifying information, e.g., an EMS identifying number and/or code (EMSID).

Additionally, the illustrated point-of-sale system 24 includes one or more actuators 226 and hardware infrastructure 228, examples of which will be described below. It will be appreciated that the point-of-sale system 24 may include other components, sub-components, and devices commonly found in a computer and/or computing device. In any case, the communication circuitry 210 is configured to facilitate communication with a corresponding one of the local hub servers $22_1$-$22_L$ and the point-of-sale system 24 may use any suitable communication protocol to communicate with the corresponding local hub server $22_1$-$22_L$.

In addition to, or alternatively to, the number of peripheral devices 40 of the local hub server $22_1$ described above, the number of peripheral devices 212 of the point-of-sale system 24 may include any number of other peripheral or interface devices. Examples of some of the peripheral devices 212 illustrated in FIG. 2 include, but should not be limited to, one or more conventional payment interfaces 214, one or more conventional item price scanners 216, one or more conventional display monitors 218, one or more conventional produce scales 220, and one or more conventional controllers 224 for controlling one or more conventional actuators 226 associated with the operation of the point-of-sale system 24. The one or more payment interfaces 214 are provided, e.g., to facilitate physical receipt of credit/debit card and/or other form of payment from customers (shoppers), and each such interface 214 may illustratively include one or more of a display, a touch screen, a keyboard, a mouse, external speakers, and/or other peripheral devices. One or more of the payment interfaces 214 may further include a produce scale 220, and one or more produce scales 220 may alternatively be coupled to the point-of-sale system 24 separately from the one or more customer payment interfaces 214. The one or more item scanner(s) 216 is/are configured to scan price code labels or other such indicators for items being purchased by customers and to also scan print media coupons.

The one or more display monitor(s) 218 provide item and/or pricing information to customers and/or enterprise employees, and may further provide additional information regarding cost and/or discounts for one or more items being purchased as well as information regarding discounts realized by customers through the use of print media and/or virtual coupons. The display monitor(s) 218 may additionally provide an interface, e.g., touchscreen or a co-located keypad, via which customers may input information such as their EMSID into the system 10.

The peripheral devices 212 of the point-of-sale system 24 may further optionally include a near-field communication interface 222, as illustrated in dashed-line configuration in FIG. 2, which may be included in embodiments in which one or more of the mobile communication devices $16_1$-$16_J$ also has such a near-field communication device such that customer information, e.g., customer identification information such as EMSIDs, user names, passwords, or the like, and/or customer payment information, e.g., credit/debit card information or the like, can be transferred from such one or more of the mobile communication devices $16_1$-$16_J$ to the point-of-sale system 24 by tapping the two near-field communication devices together or by passing the near-field communication device of a so-equipped mobile communication device $16_1$-$16_J$ sufficiently close to the near-field communication device 222 to effectuate such communication. Illustratively, customers may additionally transfer customer identification information to the point-of-sale system 24 via the payment interface 214, item scanner 216 or other peripheral device(s).

The point-of-sale system 24 further includes hardware infrastructure 228 which forms the structural backbone of the point-of-sale system 24. Examples of structural components that may be included in the hardware infrastructure 228 include, but should not be limited to, one or more purchased item transport units, e.g., one or more purchased item conveyance units or systems, one or more conventional purchased item bagging areas, e.g., one or more conventional item bagging carousals, one or more purchased item support units, and the like. The one or more actuators 226 may be or include any actuator that is controllable by at least one of the one or more conventional controllers 224, and which may facilitate operation and/or control of the hardware infrastructure of the point-of-sale system 24. Examples of such one or more actuators may include, but should not be limited to, one or more linear and/or rotational drive motors, one or more electronically controlled switches, and the like.

Figure 3A:
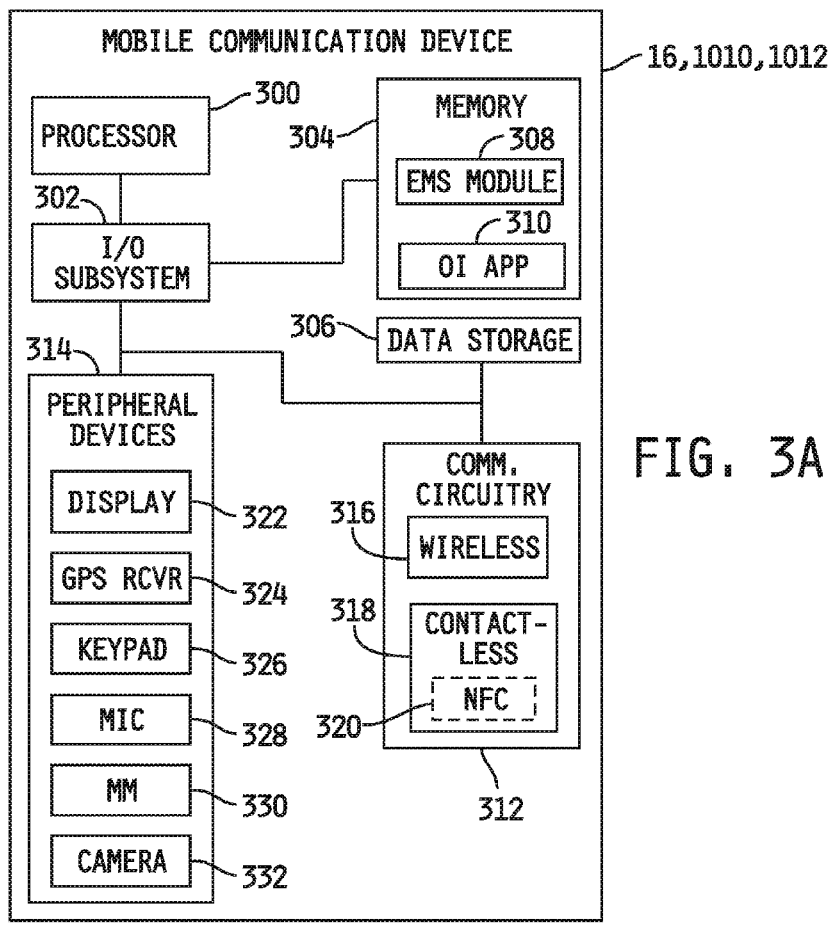
FIG. 3A is a simplified block diagram of an embodiment of one of the mobile communication devices illustrated in FIG. 1.
Figure 10:
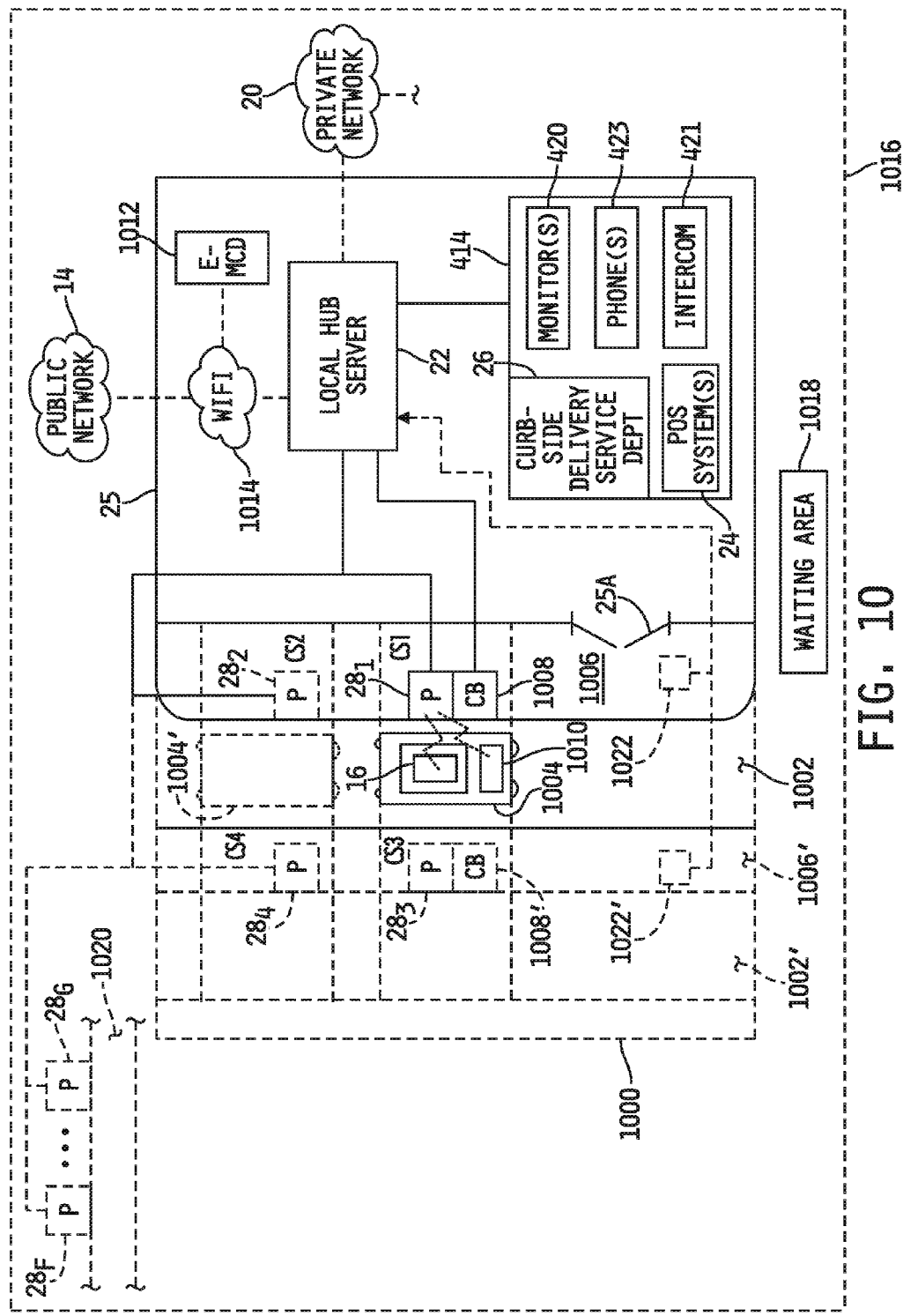
FIG. 10 is a simplified block diagram of the system of FIG. 1 implemented in the form of a curb-side delivery service at one or more of the brick-and-mortar stores of a retail enterprise.

Referring now to FIG. 3A, an embodiment of one of the mobile communication devices 16 illustrated in FIG. 1 (and/or of one of the mobile communication devices 1010 and/or 1012 illustrated in FIG. 10) is shown, which includes components similar to the main server 12 and also to the one or more local hub servers $22_1$-$22_L$ and the one or more POS systems $24_1$-$24_M$ such as a processor 300, an I/O subsystem 302, a memory 304 including an EMS module 308, a data storage device 306, communication circuitry 312 and a number of peripheral devices 314. In some embodiments, each of the foregoing components may be identical to corresponding components of the local hub server $22_1$ and/or POS system 24 described above, and a detailed explanation of such components will not be repeated here for brevity. In other embodiments, any of the one or more mobile communication devices $16_1$-$16_J$ may be configured differently than the local hub server $22_1$ described above. It will be appreciated that the mobile communication device 16 may include other components, sub-components, and devices commonly found in a computer and/or computing device.

The memory 304 illustratively includes an EMS module 308 in the form of, e.g., instructions executable by the processor 300 to communicate customer-member information to and from the main server 12, and to control one or more local peripheral devices to facilitate communications between customer-members of the enterprise membership service (EMS) program and the main server 12 and to facilitate customer input of customer-identifying information, e.g., an EMS identifying number and/or code (EMSID). The memory 304 further illustratively includes an ordered item (OI) application 310 in the form of, e.g., instructions executable by the processor 300 to facilitate identification by the processor 50 of the main server 12 of customer mobile devices $16_1$-$16_J$ and store entrances and/or product/service departments at the one or more brick-and-mortar stores $25_1$-$25_L$. An example embodiment of the OI application 310 will be described in greater detail hereinafter with respect to FIG. 7.

The communication circuitry 312 illustratively includes conventional wireless communication circuitry 312. In some embodiments, the wireless communication circuitry 312 is configured to conduct and facilitate cellular telephone communications with other cellular and land-based communication devices. In some embodiments, the wireless communication circuitry 312 is configured to conduct and facilitate communication with the main server 12 via the network 14. In some embodiments, the wireless communication circuitry 312 is configured to access the network 14 via at least one hotspot established in any of the brick-and-mortar stores $25_1$-$25_L$ by a corresponding at least one WiFi Access Point 30. In some embodiments, the wireless communication circuitry 312 may further be configured to conduct and facilitate communication with one or more of the position identification devices $28_1$-$28_P$ in any of the brick-and-mortar stores $25_1$-$25_L$. The wireless communication circuitry 312 may illustratively include conventional communication circuitry for conducting and facilitating any such communication, and examples of such conventional communication circuitry include, but are not limited to, one or more conventional radio frequency (RF) transceivers configured to receive and transmit signals at multiple radio frequencies, one or more conventional modem or other communication circuits configured to access and conduct communications via the Internet, and the like. The mobile communication device 16 may illustratively use any suitable communication protocol via the network 14 or other network to communicate with the main server 12, with other cellular and land-based communication devices and/or with one or more of the position identification devices $28_1$-$28_P$ in any of the brick-and-mortar stores $25_1$-$25_L$.

The communication circuitry 312 of the mobile communication device 16 may further optionally include conventional contact-less communication circuitry 318, which may include a conventional near-field communication device 320, as illustrated by dashed-line representation in FIG. 3A. The near-field communication device 320 may be included, for example, in embodiments in which one or more of the point-of-sale systems $24_1$-$24_M$ also has/have a near-field communication interface 222 such that customer information, e.g., customer identification information in the form of one or more identification codes (e.g., EMSID), user names, passwords, or the like, and/or customer payment information, e.g., credit/debit card information or the like, can be transferred from the mobile communication device 16 to such one or more point-of-sale systems $24_1$-$24_M$ by tapping the two near-field communication devices together or by passing the near-field communication device 320 of the mobile communication device 16 sufficiently close to the near-field communication interface 222 to effectuate such communication. In addition to, or alternatively to, the number of peripheral devices 40 of the local hub server $22_1$ described above, the number of peripheral devices 314 of the mobile communication device 16 may include any number of other or additional peripheral or interface devices. Examples of such additional peripheral devices illustrated in FIG. 3A include, but should not be limited to, a conventional visual display unit or screen 322, a conventional global positioning system (GPS) receiver 324, a conventional camera 332, a conventional keypad 326, a conventional microphone 328 and a conventional magnetometer 330. The display 322 is configured, in a conventional manner, to be responsive to instructions produced by the processor 300 to display information thereon. The GPS receiver 324 is configured, in a conventional manner, to receive radio-frequency signals transmitted by earth-orbiting satellites and to produce corresponding signals from which geographical coordinates of the receiver 324 are or can be determined. The camera 332 is configured, in a conventional manner, to capture images and/or video and to display the same on the display 322. The keypad 326 is configured, in a conventional manner, to provide signals corresponding to manual selection and activation thereof to the processor 300, and the microphone 328 is configured, in a conventional manner, to capture sound waves and to provide signals corresponding thereto to the processor 300. The magnetometer 330 is configured, in a conventional manner, to detect local geomagnetic fields, to produce magnetic signature signals based thereon and to provide such signals to the processor 300.

Figure 3B:
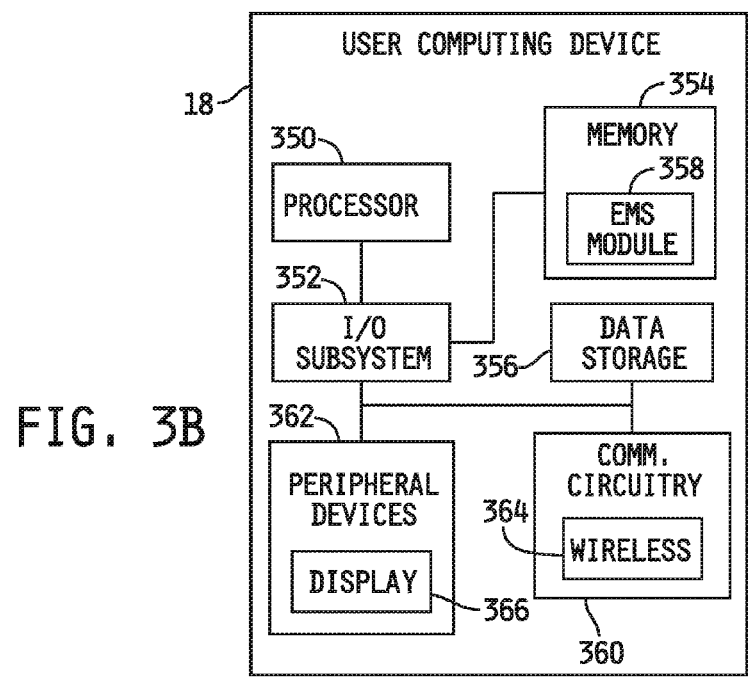
FIG. 3B is a simplified block diagram of an embodiment of one of the user computing devices illustrated in FIG. 1.

Referring now to FIG. 3B, an embodiment of one of the user computing devices 18 illustrated in FIG. 1 is shown, which includes components similar to the main server 12 and also to the one or more local hub servers $22_1$-$22_L$ and the one or more POS systems $24_1$-$24_M$ such as a processor 350, an I/O subsystem 352, a memory 354 including an EMS module 358, a data storage device 356, communication circuitry 360 and a number of peripheral devices 366. In some embodiments, each of the foregoing components may be identical to corresponding components of the local hub server $22_1$ and/or POS system 24 described above, and a detailed explanation of such components will not be repeated here for brevity. In other embodiments, any of the one or more user computing devices $18_1$-$18_K$ may be configured differently than the local hub server $22_1$ described above. It will be appreciated that the user computing device 18 may include other components, sub-components, and devices commonly found in a computer and/or computing device. In any case, the communication circuitry 360 illustratively includes conventional wireless communication circuitry 364 configured to facilitate communication with the main server 12 via the network 14, and the user computing device 18 may use any suitable communication protocol to communicate with the corresponding main server 12. In addition to, or alternatively to, the number of peripheral devices 40 of the local hub server $22_1$ described above, the number of peripheral devices 366 of the user computing device 18 may include any number of other or additional peripheral or interface devices. One example of such an additional peripheral device illustrated in FIG. 3B includes, but should not be limited to, a conventional visual display unit 366.

Referring now to FIG. 4, a simplified block diagram is shown of an embodiment of a product/service department 26 in, at or near which an electronic device or system 405 is located otherwise associated with product/service department 26. The electronic system or device 405 illustratively includes many of the features of the point-of-sale system 24 illustrated in FIG. 2 and described above, and therefore includes components similar to the main server 12 and also to the one or more local hub servers $22_1$-$22_L$, such as a processor 400, an I/O subsystem 404, a memory 402, a data storage device 406, communication circuitry 412 and a number of peripheral devices 414. The communication circuitry 412 is configured to facilitate communication with a corresponding one of the local hub servers $22_1$-$22_L$ and the electronic system or device 405 may use any suitable communication protocol to communicate with the corresponding local hub server $22_1$-$22_L$. In some embodiments, each of the foregoing components may be identical to corresponding components of the local hub server $22_1$ described above, and a detailed explanation of such components will not be repeated here for brevity. In other embodiments, any of the one or more electronic system and/or devices 405 may be configured differently than the local hub server $22_1$ described above. It will be appreciated that the electronic system or device 405 may include other components, sub-components, and devices commonly found in a computer and/or computing device.

In the illustrated embodiment, the memory 402 illustratively includes an EMS module 408 in the form of, e.g., instructions executable by the processor 400, to communicate customer-member information relating to the customer's EMS account to and from the main server 12, and to control one or more local peripheral devices to facilitate communications between customer-members of the enterprise membership service (EMS) program and the main server 12 and to facilitate manual customer input of customer-identifying information, e.g., an EMS identifying number and/or code (EMSID). The memory 402 further illustratively includes an ordered item (OI) module 410 which illustratively contains instructions executable by the processor 400 to receive and process information from the main server 12 relating to one or more items ordered by one or more customers of the retail enterprise 11. An example embodiment of such instructions stored in the OI module 410 will be described in greater detail hereinafter with respect to FIG. 7.

In addition to, or alternatively to, the number of peripheral devices 40 of the local hub server $22_1$ described above, the number of peripheral devices 414 of the electronic device or system 405 may include any number of other peripheral or interface devices. Examples of some of the peripheral devices 414 illustrated in FIG. 4 include, but should not be limited to, one or more conventional payment interfaces 416, one or more conventional item price scanners 418, one or more conventional display monitors 420, one or more conventional weight scales 422, all as described above with respect to FIG. 2. The peripheral devices 414 of the electronic system or device 405 further include at least one wireless signal broadcasting device 424. The at least one wireless signal broadcasting device 424 is illustratively positioned in, at, near or adjacent to the product/service department 26, and is illustratively configured to broadcast one or more unique wireless identification signals, i.e., one or more identification signals that distinguish the particular wireless signal broadcasting device 424 from wireless signal broadcasting devices 424 associated with others of the product/service departments $26_1$-$26_N$ within the retail enterprise 11 as described above with respect to the wireless signal broadcasting devices $28_1$-$28_P$. In some embodiments, the wireless signal broadcasting device 424 is identical in structure and operation to the wireless signal broadcasting devices $28_1$-$28_P$ illustrated and described above. In some alternate embodiments, the one or more wireless signal broadcasting devices 424 located at, in or near any product/service department 26 may be different in structure and/or in one or more operational aspects than those of the wireless signal broadcasting devices $28_1$-$28_P$. In any case, however, the one or more wireless signal broadcasting devices 424 associated with any product/service department 26 is/are operable to broadcast unique wireless identification signals carrying decodable information in the form of a unique identification code (UID) as described above.

The wireless signal broadcasting devices $28_1$-$28_P$, 424 illustrated in FIGS. 1 and 4 and just described above represent only one example of a wireless signal broadcasting device that may be included in the system 10 for the purpose of broadcasting one or more unique wireless identification signals. Those skilled in the art will recognize other wireless signal broadcasting devices that may be substituted for one or more of the wireless signal broadcasting devices $28_1$-$28_P$, 424, and it will be understood that any such other wireless signal broadcasting devices are contemplated by this disclosure. Any one or more such alternate wireless signal broadcasting device may be operable to broadcast one or more unique wireless identification signals periodically or non-periodically in any frequency range with any orientation or direction and/or having any broadcast range, and decodable information carried by such one or more unique wireless identification signals may illustratively include, in addition to a unique identification code, UID, any information that may be included within or appended to the UID.

Figure 5:
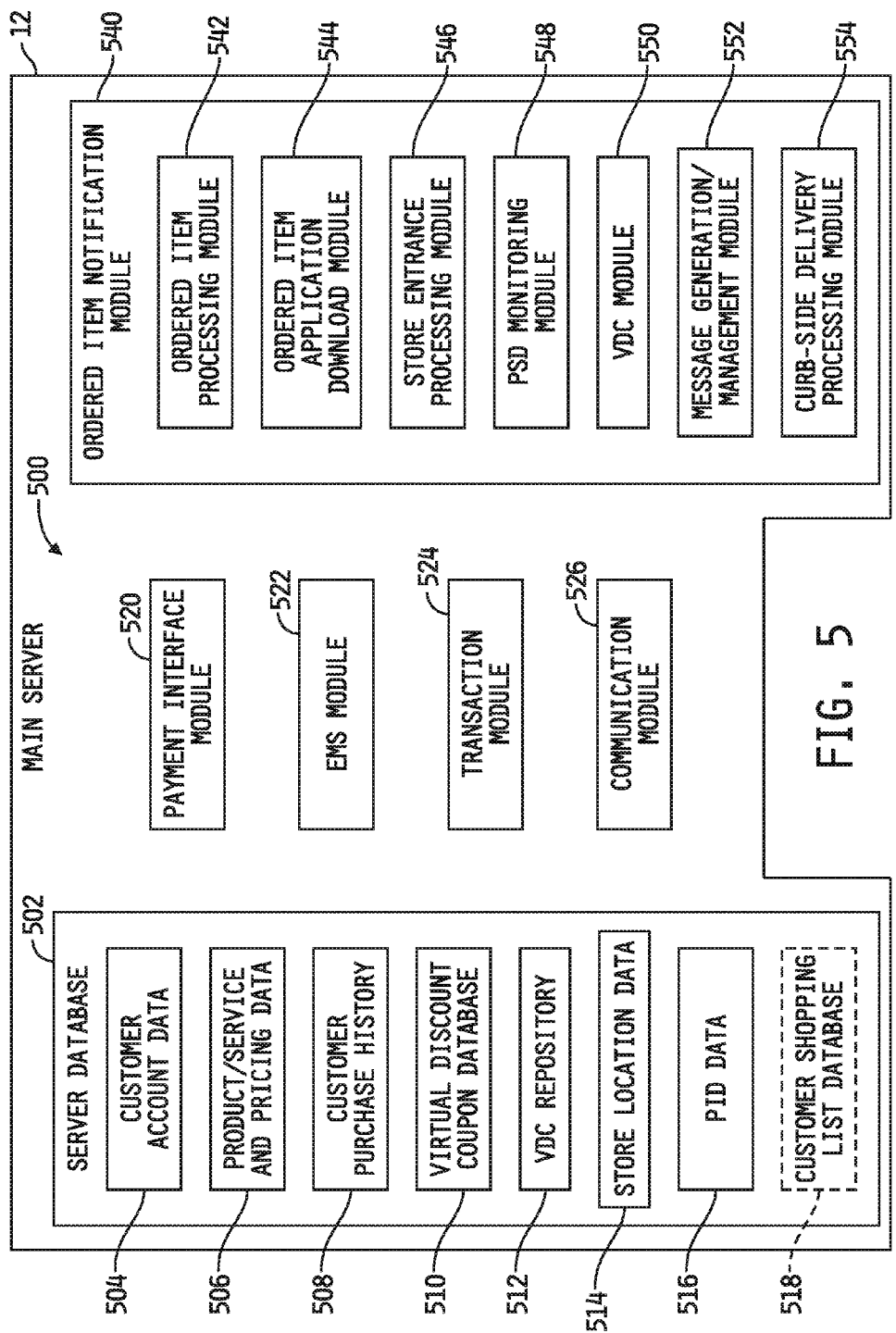
FIG. 5 is a simplified block diagram of an embodiment of a software environment of the main server of FIG. 1.

Referring now to FIG. 5, a simplified block diagram is shown of an embodiment of an environment 500 of the main server 12 illustrated in FIG. 1. In the embodiment shown in FIG. 5, the environment 500 includes a server database 502 which illustratively includes customer account data 504, product/service and pricing data 506, a customer purchase history 508, a virtual discount coupon database 510, a virtual coupon repository 512, a store location database 514, PID data 516 and, in some embodiments, a customer shopping list database 518.

Customers may elect to participate in an enterprise membership services (EMS) program offered, managed and maintained by the retail enterprise 11, by establishing a user account (which may be referred to herein as an "EMS account" or "customer account") within the server 12, which user account may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "shopper," "member," "customer member," "customer" and "household," and variants thereof, are used interchangeably in the following description, and such terms should be understood to refer interchangeably to an individual customer or shopper or a predefined group of individual shoppers (referred to herein as a "household") who shop at and purchase items from a retail enterprise, and who are members of an enterprise membership service (EMS) of the type described herein and provided and managed by the retail enterprise 11.

Illustratively, a software application program is available for download from the main server 12 via the public network 14 for customers electing to access the EMS program via their user computing device, e.g., one of the user computing devices $18_1$-$18_K$, and/or via their mobile communication device, e.g., one of the mobile communication devices $16_1$-$16_J$ (and/or 1010). Once downloaded and activated, customers can access and manage their EMS account and program features via the software application program executed by their user computing device $18_1$-$18_K$ and/or mobile communication device $16_1$-$16_J$ (and/or 1010). Illustratively, the main server 12 additionally hosts and controls an EMS website accessible via the public network 14, and in such embodiments shoppers can access and manage their EMS accounts and program features by accessing their EMS page(s) of the EMS website hosted by the main server 12 via a computing device $18_1$-$18_L$ and/or via their mobile communication device $16_1$-$16_J$ (and/or 1010) if the latter is equipped with a web browser.

In the illustrated embodiment, the customer account data 504 of the server database 502 has stored therein information relating to user accounts and profile data for each of the members of the EMS program. As shoppers join the EMS program, the server 12 establishes an EMS account within the customer account data 504 that is unique to the customer, and assigns to the shopper, and/or the shopper selects, a unique, corresponding enterprise membership services identification code, EMSID, as briefly described hereinabove. The EMSID associated with each customer is entered into the server 12 is stored along with the customer's profile data in the customer account data 504, and can be used thereafter to access the customer's EMS account.

In some embodiments, the EMSID may be provided on or as part of one or more of a shopper's ID card, an ID associated with an RFID tag, which RFID tag may be part of the NFC communication circuitry of the mobile communication device $16_1$, a shopper's incentive card, or the like. In other embodiments, the EMSID may not be provided in or as part of any tangible form, and may instead be or include one or more easily remembered sequences of numbers, letters, symbols or other characters. In any case, customer members of the EMS program described herein may scan or otherwise communicate or enter via a keypad or touchscreen their EMSID at one of the point-of-sale terminals $24_1$-$24_M$, and it is through the customer's EMSID that the main server 12 makes virtual discount offers available to the customer and/or associates purchases made by the customer with the customer's purchase history to thereby monitor and track purchases made by the customer from the retail enterprise 11 during purchase transactions. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to shopper members, and/or which tracks items purchased by shopper members during item purchase transactions at point-of-sale systems or terminals may be alternatively be used.

When a member shopper manually enters the member shopper's EMSID into one of the point-of-sale system $24_1$-$24_M$ as part of a purchase transaction (e.g., during the purchase transaction or as part of the process of commencing the purchase transaction), the processor 200 of the point-of-sale system $24_1$-$24_M$ communicates the EMSID to the main server 12 which identifies the shopper via the EMSID and associates that shopper with the current purchase transaction being carried out at the corresponding point-of-sale system $24_1$-$24_M$. All such purchase transaction data relating to items purchased by such an identified customer during a purchase transaction carried out via one of the point-of-sale system $24_1$-$24_M$ of the retail enterprise 11 is illustratively stored in the customer purchase history database 508 where it is associated with the identified customer via the customer's EMSID. Illustratively, the purchase transaction data stored in the customer purchase history database 508 may include, but is not limited to, product/service identification information, product/service pricing, product purchase date and time, total quantity of products purchased, total quantity of identical products purchased, total transaction price, and the like.

The product/service and pricing data 506 contains information relating to the retail products and services sold by the retail enterprise 11 which the main server 12 serves. Illustratively such information may include, but is not limited to, product/service description information including product/service manufacturer, product/service family or brand, primary product type (e.g., canned tomatoes), secondary product type (e.g., canned diced tomatoes), tertiary product type (e.g., canned diced tomatoes Italian style), etc., product container size (e.g., 12 oz. can, 32 oz. can, 16 oz. package, etc.), product/service pricing information, product/service unit pricing information, current product inventory, ordered product data, product sales history, product/service location within the corresponding retail outlet, and the like. Illustratively, product/service pricing information is linked to product/service identification information via scan codes, e.g., scannable bar codes such as Universal Product Codes (UPC) or the like, such that when items are scanned for purchase, the scan code of each item will identify a particular item at a particular price in the product/service and pricing database 506.

In some embodiments, the main server 12 illustratively provides, as part of the EMS program described herein, discount offers to member shoppers for one or more items purchasable from the business enterprise, e.g., in the form of one or more corresponding virtual discount coupons. In this regard, each member shopper is provided by the main server 12 with access to dedicated portion of a customer virtual coupon repository database in which virtual discount coupons specific to the member shopper or customer are stored and via which the member shopper may access and redeem one or more virtual discount coupons. In one embodiment, the server database 502 includes a plurality of customer virtual coupon repositories; one for each of the plurality of member shoppers. Alternatively, the server database 502 may include a single repository, and each member shopper of the EMS program is provided with access to a dedicated portion of the repository; i.e., which can be accessed by one shopper to the exclusion of all other shopper members. The server database 502 further illustratively includes a clipped virtual coupon repository 512 in which virtual discount coupons "clipped" by shopper members, i.e., selected for redemption, are stored. The server database 502 may include a single such repository 512, and each member shopper of the EMS program may be provided with access to a dedicated portion of the repository 512; i.e., which can be accessed by one shopper to the exclusion of all other shopper members, or a separate repository 512 for each member shopper. The virtual discount coupon database 510 illustratively has stored therein virtual discount coupons that are received from an external source and from which the customer virtual coupon repositories may be populated, e.g., periodically, aperiodically and/or on an ad hoc basis.

The environment 500 of the main server 12 further includes a payment interface module 520, an EMS module 522, a transaction module 524 and a communication module 526. In one embodiment, the payment interface module 520 is configured, in a conventional manner, to process tangible forms of electronic payment systems (EPS), e.g., tangible electronic funds transfer instruments such as credit cards, debit cards, etc., used at the point-of-sale systems $24_1$-$24_M$. In an example of such embodiments, the payment interface module 520 illustratively is or includes a conventional magnetic strip reading device configured to read payment information stored in magnetic form on a strip affixed to a conventional credit or debit card. Alternatively or additionally, the payment interface module 520 may be or include the NFC interface 222, and in such embodiments the NFC interface 222 is configured to access, via contact or near-contact with a portable electronic device having a like-configured NFC device 320, electronically readable customer payment system (EPS) information stored on or accessible by the portable electronic device.

The EMS module 522 is configured to control and manage EMS-related activity of shopper members of the EMS program. The communication module 526 is configured, in a conventional manner, to control and manage all communications between the main server 12 and the local hub servers $22_1$-$22_L$ in embodiments that include the local hub servers $22_1$-$22_L$, and to control and manage all communications between the main server 12 and all point-of-sale systems $24_1$-$24_M$ in embodiments that do not include a local hub server $22_1$-$22_L$.

The transaction module 524 is configured to monitor purchases of products and services made by shopper members of the EMS program using any of the point-of-sale systems $24_1$-$24_M$ and to store purchase transaction data associated with such purchases in the customer purchase history database 508. Illustratively, the customer purchase history database 508 is partitioned or otherwise configured to store such purchase transaction data in a manner that provides for the separate tracking and identification of some or all of the shopper purchase history of each shopper (or household) member.

The communication module 526 is configured, in a conventional manner, to control and manage all communications between the main server 12 and the local hub servers $22_1$-$22_L$ via the network 20 (an to thereby control and manage all communications between the main server 12 and the point-of-sale systems $24_1$-$24_M$ to control and manage all communications between the main server 12 and the mobile communication devices $16_1$-$16_J$ (and/or 1010 and/or 1012) via the network 14 and to also control and manage all communications between the main server 12 and the user computing devices $18_1$-$18_K$ via the network 14.

The environment 500 of the main server 12 further illustratively includes an ordered item notification module 540 which illustratively includes an ordered item processing module 542, an ordered item application download module 544, a store entrance processing module 546, a product/service department (PSD) monitoring module 548, a virtual discount coupon (VDC) module 550, a message generation/management module 552 and a curb-side delivery processing module 554. It will be understood that some embodiments may include each of the store entrance processing module 546, the PSD monitoring module 548 and the curb-side delivery processing module 554, while other embodiments may include only one or a sub-combination of the modules 546, 548 and 554. In any case, the ordered item processing module 542 illustratively contains information about each wireless signal broadcasting device $28_1$-$28_P$, 424 in the retail enterprise 11. The ordered item processing module 542 is further operable in some embodiments to manage and control identification of customer mobile communication devices $16_1$-$16_J$, and of identification of store entrances relative to the wireless signal broadcasting devices $28_1$-$28_P$. The ordered item processing module 542 is alternatively or additionally operable in some embodiments to manage and control identification of customer mobile communication devices $16_1$-$16_J$, 1010 and of identification of curb-side delivery locations relative to the wireless signal broadcasting devices $28_1$-$28_4$ (see, e.g., FIG. 10). The ordered item processing module 542 is alternatively or additionally still operable in some embodiments to manage and control identification of customer mobile communication devices $16_1$-$16_J$ and of product/service departments $26_1$-$26_N$ relative to the wireless signal broadcasting devices 424. An example embodiment of a process executed by the ordered item processing module 542 is illustrated in FIG. 7, and such a process will be described in detail hereinafter.

Figure 11:
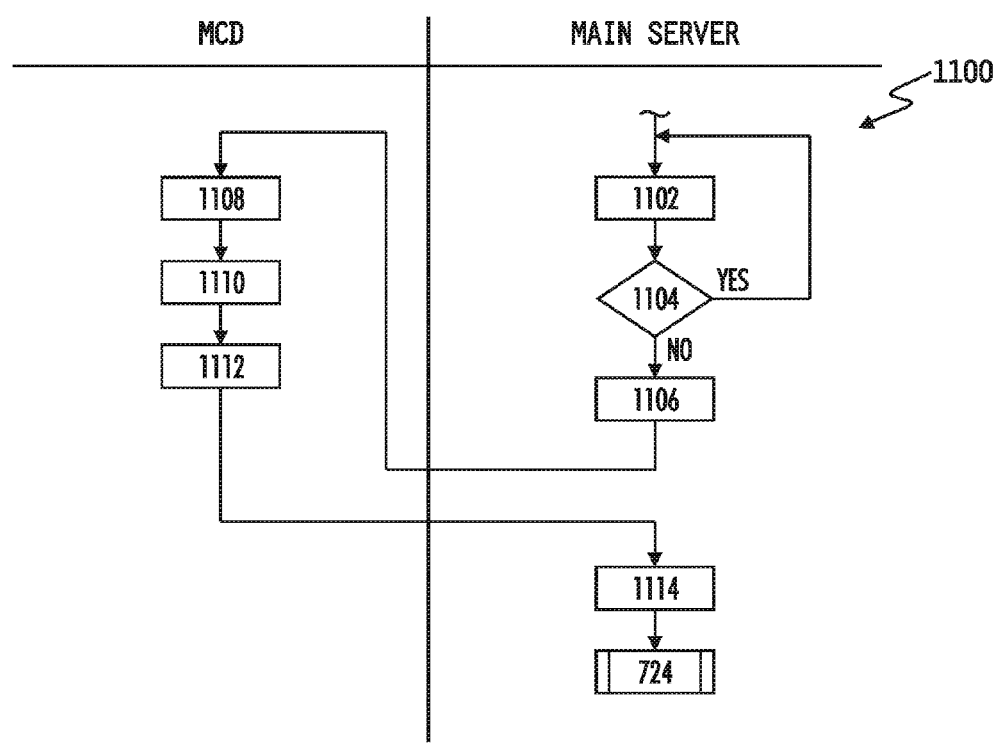
FIG. 11 is a simplified flow diagram of another embodiment of a process for identifying customers at brick-and-mortar stores of the retail enterprise that have one or more pending orders for one or more items.

In some embodiments, e.g., in embodiments which include the store entrance processing module 546 and/or the curb-side delivery processing module 554, the ordered item processing module 542 may be operable to manage and control identification of customer mobile devices $16_1$-$16_J$ and/or 1010 and of identification of locations of any such devices relative to the geographic location of any of the brick-and-mortar stores $25_1$-$25_L$ of the retail enterprise 11. An example embodiment of such a process executed by the ordered item processing module 542 is illustrated in FIG. 11, and such a process will be described in detail hereinafter.

The ordered item application download module 544 illustratively contains the ordered item (OI) application 310, and customers may downloaded the ordered item application 310 from the ordered item application download module 544 to the memory 304 their mobile communication devices $16_1$-$16_J$, 1010 in a conventional manner.

The store entrance processing module 546 is illustratively operable to manage and control a customer and product/service department notification process when a customer has been detected entering a brick-and-mortar store in which the customer may have pending one or more orders for one or more items from one or more product/service departments thereof. An example embodiment of a process executed by the store entrance processing module 546 is illustrated in FIG. 8, and such a process will be described in detail hereinafter.

The PSD monitoring module 548 is illustratively operable to manage and control a customer and product/service department notification process when a customer has been detected at a product/service department at which the customer may have pending one or more orders for one or more items. An example embodiment of a process executed by the PSD monitoring module 548 is illustrated in FIG. 9, and such a process will be described in detail hereinafter.

Figure 8:
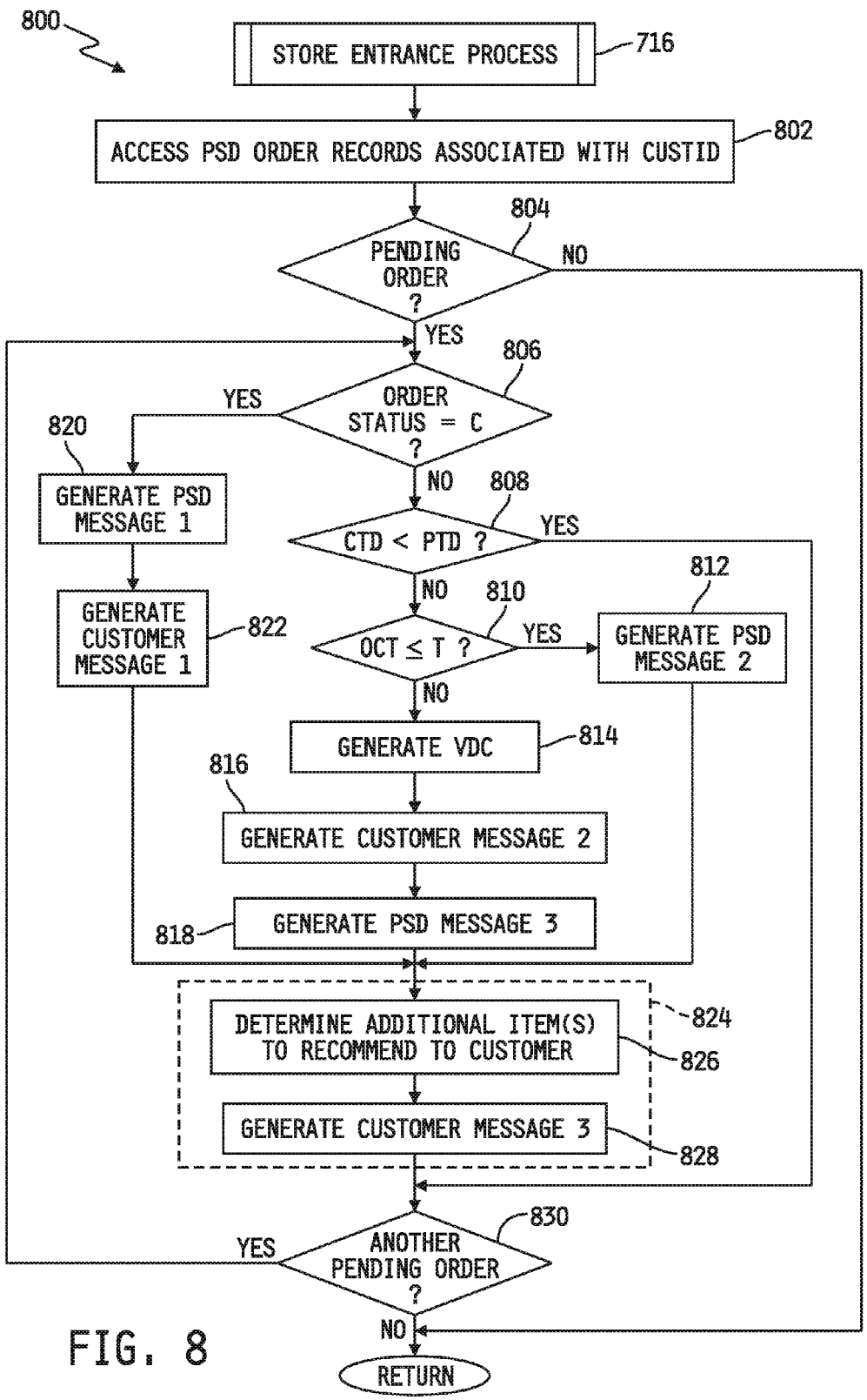
FIG. 8 is a simplified flow diagram of an embodiment of the store entrance process executed as part of the process illustrated in the flow diagram of FIG. 7.
Figure 9:
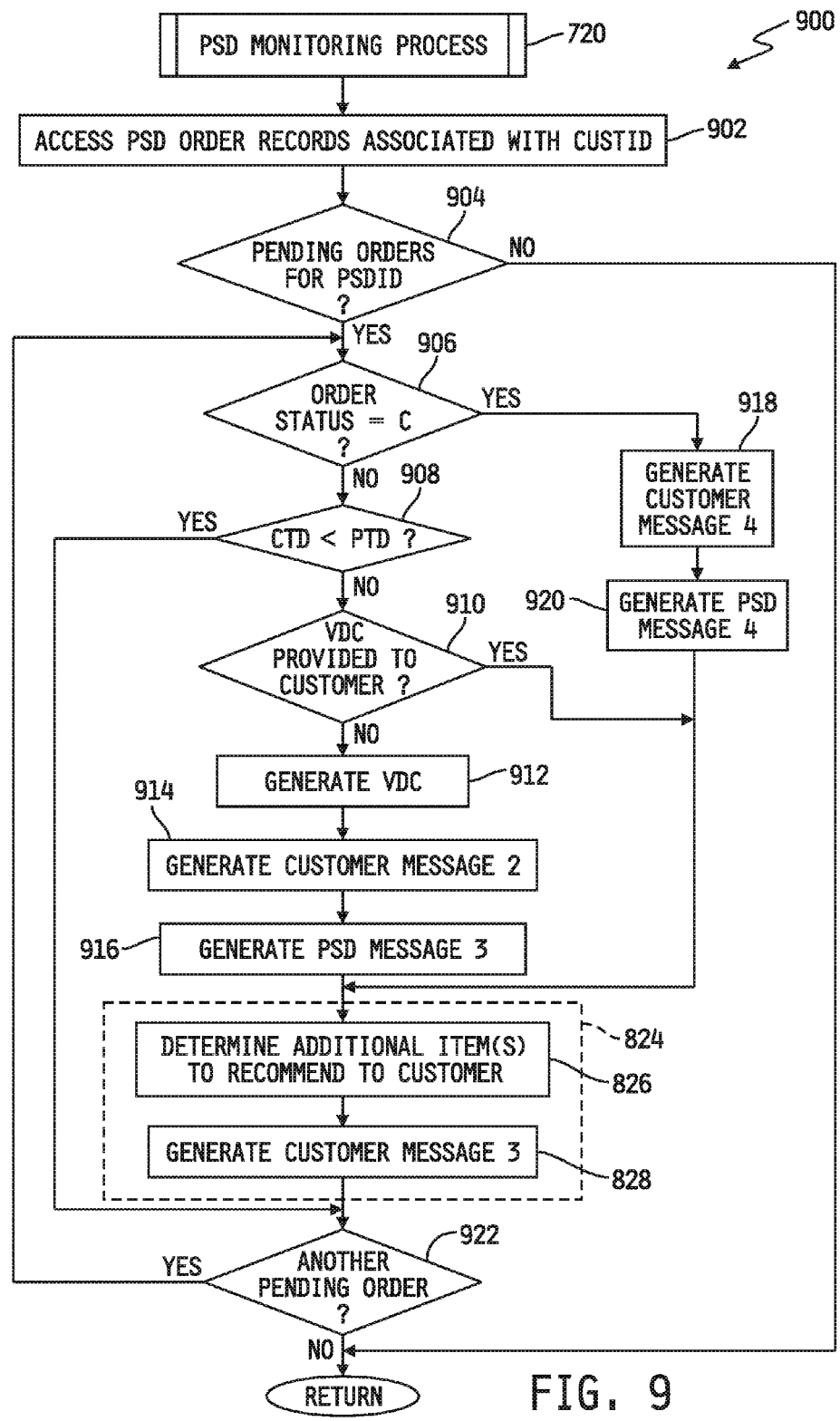
FIG. 9 is a simplified flow diagram of an embodiment of the product/service department monitoring process executed as part of the process illustrated in the flow diagram of FIG. 7.

The virtual discount coupon (VDC) module 550 is illustratively operable to generate and/or retrieve from the virtual discount coupon database 510 one or more virtual discount coupons during the store entrance and/or PSD monitoring processes illustrated in FIGS. 8 and 9 respectively.

Figure 12:
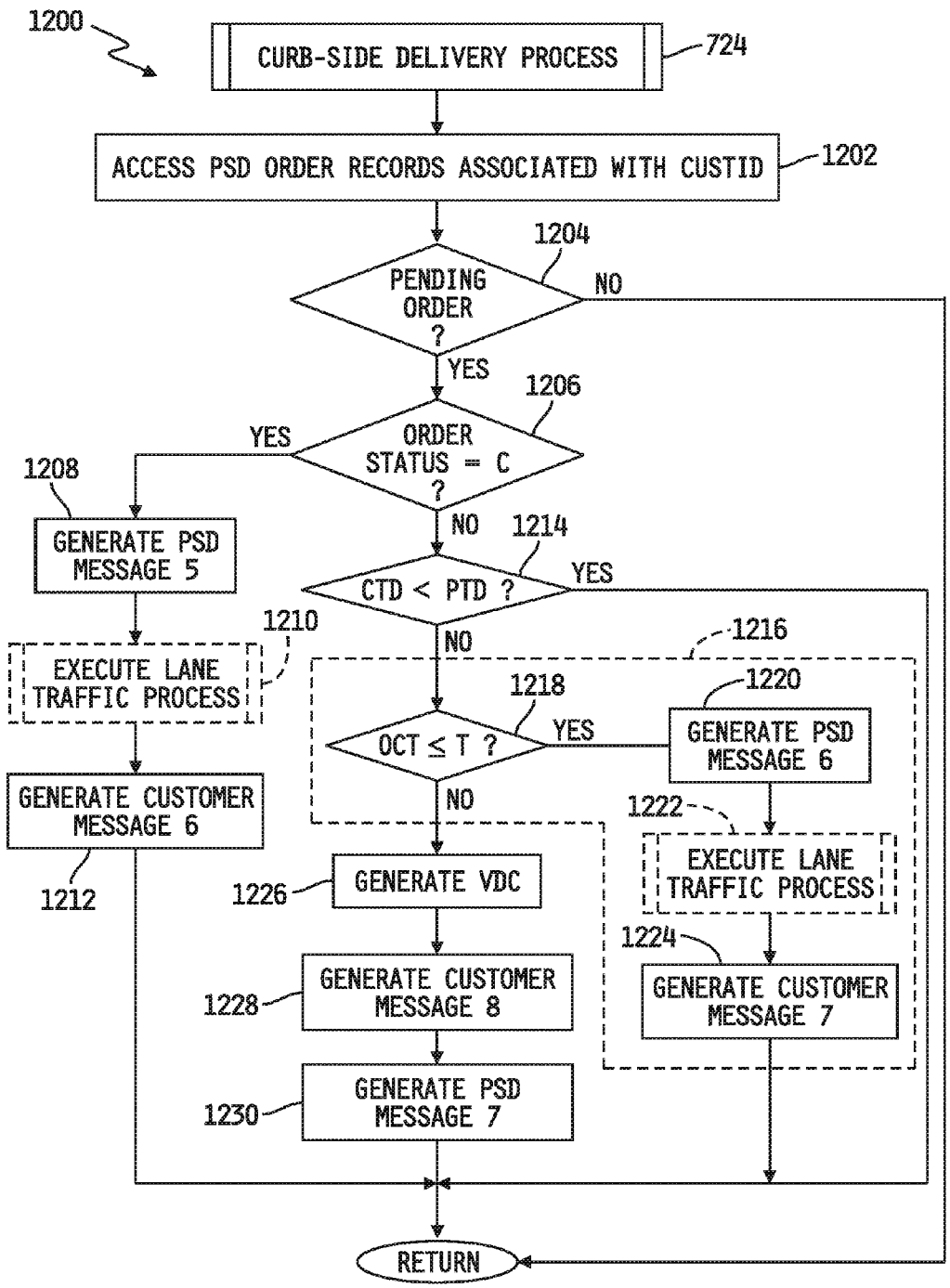
FIG. 12 is a simplified flow diagram of an embodiment of the curb-side delivery executed as part of the process illustrated in the flow diagram of FIG. 7.

The message generation/management module 552 is illustratively operable to generate and/or retrieve one or more messages to transmit to a product/service department and/or to a customer's mobile communication device $16_1$-$16_J$, 1010 during the store entrance, PSD monitoring and/or curb-side delivery processes illustrated in FIGS. 8, 9 and 12 respectively.

The curb-side delivery processing module 554 is illustratively operable to manage and control a curb-side delivery notification process when a customer has been detected entering a curb-side delivery area or lane adjacent to a brick-and-mortar store and/or when a customer has been detected as entering or crossing a specified geographic boundary, e.g., a geofence, defined at least partially about a brick-and-mortar store, in which the customer may have pending one or more orders for one or more items from a curb-side delivery department thereof. An example embodiment of a process executed by the curb-side delivery processing module 554 is illustrated in FIG. 12, and such a process will be described in detail hereinafter.

Figure 6:
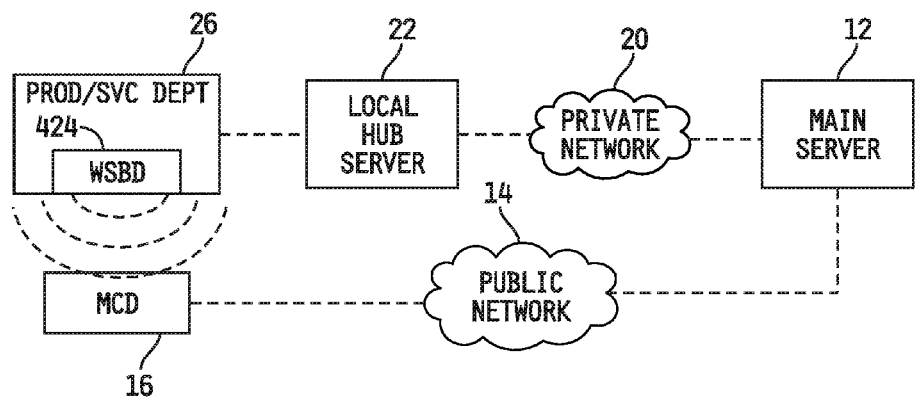
FIG. 6 is a simplified diagram illustrating an embodiment of a communications framework for detecting by a mobile communication device of wireless signals produced by one or more wireless signal broadcasting devices within a brick-and-mortar store and for conducting wireless communications relating thereto between the mobile communication device and the main server of the retail enterprise.

Referring now to FIG. 6, a simplified block diagram is shown of an illustrative example of a portion of the system 10 of FIG. 1 implemented in one of the brick-and-mortar stores, e.g., the brick-and-mortar store $25_1$, of the retail enterprise 11. The example depicted in FIG. 6 illustrates a communications framework for detecting by customer mobile communication devices $16_1$-$16_J$ of wireless identification signals broadcast by a wireless signal broadcasting device 424 associated with, i.e., located at, in, near or along a boundary of, one of the product/service departments 26 and for conducting wireless communications relating thereto between the customer mobile communication devices $16_1$-$16_J$ and the main server 12 of the retail enterprise 11. It will be understood that the communication framework depicted in FIG. 6 and the following description thereof also each apply equally to the detection by customer mobile communication devices $16_1$-$16_J$ of wireless identification signals broadcast by any of the wireless signal broadcasting devices $28_1$-$28_P$ associated with and located in, at or near any of the brick-and-mortar stores, e.g., the brick-and-mortar store $25_1$ illustrated in FIG. 1, and for conducting wireless communications relating thereto between the customer mobile communication devices $16_1$-$16_J$ (and/or 1010) and the main server 12 of the retail enterprise 11.

In the illustrated embodiment, the product/service department 26 is shown coupled to the local hub server 22, and the local hub server 22 is coupled to the main server 12 via the private network 20 as illustrated and described with respect to FIG. 1. In some alternate embodiments, the product/service department 26 may alternatively or additionally be coupled to one or more of the plurality of point-of-sale systems $24_1$-$24_M$ illustrated in FIG. 1. Associated with the product/service department 26, as illustrated in FIG. 6, is at least one wireless signal broadcasting devices 424 which may be located anywhere within, along, above or adjacent to the product/service department 26. In the embodiment illustrated in FIG. 6, for example, the wireless signal broadcasting device 26 is illustratively positioned at or near a customer service counter or other customer service area of the product/service department 26, although it will be understood that such an arrangement is provided only by way of example and should not be considered to be limiting in any way. As the communication framework depicted in FIG. 6 relates to one or more of the wireless signal broadcasting devices $28_1$-$28_P$, such wireless signal broadcasting devices 28 may illustratively be positioned anywhere within, near or adjacent to the corresponding brick-and-mortar store, such as the brick-and-mortar store $25_1$ depicted in FIG. 1 and/or the brick-and-mortar store 25 depicted in FIG. 10. In one illustrative example, as illustrated in FIG. 1, one or more such wireless signal broadcasting devices 28 may be positioned at or near one or more entrances to the brick-and-mortar store as will be discussed hereinafter with respect to FIGS. 7 and 8. In another illustrative example, as illustrated in FIG. 10, one or more such wireless signal broadcasting devices 28 may be positioned near one of the brick-and-mortar stores, e.g., in or at a curb-side pickup area located outside of a brick-and-mortar store 25 adjacent to a curb-side delivery service department 26 of the store 25, as will be described in greater detail hereinafter with respect to FIGS. 10-12.

As described hereinabove with respect to FIG. 1, each wireless signal broadcasting devices $28_1$-$28_P$, 424 is operable to broadcast wireless identification signals. Such signals may be broadcast continuously, continually or on demand, and may be periodic or non-periodic. In some embodiments, as illustrated by example in FIG. 6, each wireless signal broadcasting device 424 (and each one or more of the wireless signal broadcasting devices $28_1$-$28_P$) is communicatively coupled directly to the local hub server 22, although in other embodiments one or more of the wireless signal broadcasting devices $28_1$-$28_P$, 424 may be communicatively coupled to one or more of the point-of-sale systems $24_1$-$24_M$, and in still other embodiments one or more of the wireless signal broadcasting devices $28_1$-$28_P$, 424 may not communicatively coupled to the local hub server 22 or to any point-of-sale system $24_1$-$24_M$, or may be coupled to the local hub server 22 or to one or more of the point-of-sale systems $24_1$-$24_M$ only for purposes of diagnostic monitoring thereof.

Each wireless signal broadcasting devices $28_1$-$28_P$, 424 is illustratively configured to broadcast wireless identification signals with a predefined orientation (i.e., direction) and broadcast range. In the embodiment illustrated in FIG. 6, for example, the wireless signal broadcasting device 424 is illustratively operable to broadcast wireless identification signals away from the product/service department 26 and toward the customer area of the brick-and-mortar store as indicated in FIG. 6 by the dashed-line ring emanating from the wireless signal broadcasting device 424, and the wireless signal broadcasting devices 424 is further illustratively configured to broadcast a wireless identification signal with a predefined broadcast range. Generally, the broadcast range of any wireless signal broadcasting device $28_1$-$28_P$, 424 illustrated and described herein should be understood to be defined by an area relative to that wireless signal broadcasting device $28_1$-$28_P$, 424 within which the signal strength of wireless signals broadcast thereby is sufficient to be detected by the communication circuitry 316 of the customer mobile communication devices $16_1$-$16_J$, and outside of which the signal strength of wireless signals broadcast thereby is undetectable by the communication circuitry 316 carried by the customer mobile communication devices $16_1$-$16_J$. As used in the previous sentence, the term "undetectable" should be understood to mean any of indistinguishable by the communication circuitry 316 of the customer mobile communication devices $16_1$-$16_J$ from background electromagnetic noise, distinguishable by the communication circuitry 316 of the customer mobile communication devices $16_1$-$16_J$ from background electromagnetic noise but not decodable by the communication circuitry 316 of the customer mobile communication devices $16_1$-$16_J$ or distinguishable by the communication circuitry 316 of the customer mobile communication devices $16_1$-$16_J$ from background electromagnetic noise but not decodable by communication circuitry of any electronic device or system to which the communication circuitry 316 of the customer mobile communication devices $16_1$-$16_J$ may transmit or otherwise relay the wireless broadcast signal(s).

As described hereinabove with respect to FIG. 1, each of the wireless signal broadcasting device $28_1$-$28_P$, 424 is illustratively operable to broadcast one or more unique wireless identification signals which distinguish each particular wireless signal broadcasting devices $28_1$-$28_P$, 424 from others of the wireless signal broadcasting devices $28_1$-$28_P$, 424 located at the same brick-and-mortar store, and in other embodiments also from all others of the wireless signal broadcasting devices $28_1$-$28_P$, 424 within the retail enterprise 11. At some point, while the wireless signal broadcasting devices $28_1$-$28_P$, 424 are broadcasting one or more unique wireless identification signals, a customer carrying the customer's the mobile communication device 16 may approach a location at which a wireless signal broadcasting device $28_1$-$28_P$, 424 is positioned. This scenario is illustrated in FIG. 6 in which the customer's mobile communication device 16 is shown adjacent to the wireless signal broadcasting device 424. The customer's mobile electronic device 16 and the main server 12 are each illustratively configured to communicate wirelessly with each other via the public network 14 as also shown in FIG. 6, and in some embodiments the brick-and-mortar store, e.g., the store $25_1$, may illustratively implement one or more local or wide area networks for the purpose of providing or enhancing wireless communication access by customer mobile communication devices $16_1$-$16_J$ to the public network 14. In any case, as the mobile communication device 16 carried by the customer approaches the wireless signal broadcasting devices 424, the customer's mobile communication device 16 enters a space that is within the broadcast range of the wireless signal broadcasting devices 424 as illustrated in FIG. 6, and when within the broadcast range of the wireless signal broadcasting devices 424 the customer's mobile communication device 16 is able to detect the unique identification signals being broadcast thereby. Illustratively, the broadcast range of the wireless signal broadcasting device 424 is sufficiently large, wide and/or oriented so as to be detectable by customers' mobile communication devices $16_1$-$16_J$ during typical entry of customers carrying their mobile communication devices $16_1$-$16_J$ into a corresponding one of the product/service department $26_1$-$26_N$, and/or during typical approach by such a customer to a customer service counter or customer service area of the product/service department $26_1$-$26_N$ and/or at one or more typical locations relative to the product/service department $26_1$-$26_N$ at which customers await service, are served and/or are delivered ordered items by an attendant of the product/service department $26_1$-$26_N$. Further illustratively, the broadcast range of the wireless signal broadcasting device 424 is, at the same time, sufficiently small, narrow and/or oriented so as to provide a desired amount or degree of resolution in determining the location of a customer's mobile communication device 16 relative to the wireless signal broadcasting devices 424 and/or relative to the product/service department $26_1$-$26_N$. Similarly with respect to the wireless signal broadcasting device $28_1$-$28_P$, the broadcast range of each such wireless signal broadcasting device is sufficiently large, wide and/or oriented so as to be detectable by customers' mobile communication devices $16_1$-$16_J$ during typical entry of customers carrying their mobile communication devices $16_1$-$16_J$ into one of the entrances of the brick-and-mortar store and/or during typical passage of such customers by one or more locations and/or structures within the store, while at the same time sufficiently small, narrow and/or oriented so as to provide a desired amount or degree of resolution in determining the location of a customer's mobile communication device 16 relative to any such wireless signal broadcasting device 28 and/or relative to one or more structures and/or locations within or relative to the brick-and-mortar store. The general communication framework illustrated in FIG. 6 is used in the process 700 illustrated and described below with reference to FIG. 7 for detecting by customer mobile communication devices $16_1$-$16_J$ of wireless identification signals broadcast by at least one wireless signal broadcasting device 424 associated with at least one of the product/service departments $26_1$-$26_N$ and/or for detecting by customer mobile communication devices $16_1$-$16_J$ (and/or 1010) of wireless identification signals broadcast by at least one of the wireless signal broadcasting device $28_1$-$28_P$ associated with at least one entrance to (and/or other location within, near or adjacent to, e.g., outside of) a brick-and-mortar store of the retail enterprise 11, and in either case also for conducting wireless communications between such customer mobile communication devices $16_1$-$16_J$ (and/or 1010) and the main server 12 of the retail enterprise 11.

Referring now to FIG. 7, a simplified flow diagram is shown depicting an embodiment of a process 700 for identifying customers at brick-and-mortar stores of the retail enterprise 11 that have one or more pending orders for one or more items. As indicated by the framework of the process 700 illustrated in FIG. 6, a portion of the process 700, i.e., the portion to the left of the left-most vertical line and centered under the heading "MCD," illustratively represents one or more software applications executed by the processor 300 of a customer's mobile communication device 16 (or 1010), i.e., one of the mobile communication devices $16_1$-$16_J$ (or 1010) associated with a customer which has one or more pending orders for one or more items in one or more of the product/service departments $26_1$-$26_N$ of one of the brick-and-mortar stores $25_1$-$25_L$ of the retail enterprise. In one embodiment, this portion of the process 700 is or includes the ordered item (OI) application module 310 stored in the memory 304 (and/or data storage 306) of the customer's mobile communication device 16, 1010 (see FIG. 3A) in the form of instructions executable by the processor 300 of the customer's mobile communication device 16, 1010. The process steps of this portion of the process 700 will be described below for purposes of this disclosure as being executed by the processor 300 of the customer's mobile communication device 16 1010.

Another portion of the process 700, i.e., the portion between the left-most vertical line and the center vertical line in FIG. 7, and centered under the heading "wireless signal broadcasting device(s)," does not necessarily represent a portion of the process 700 that is stored in a memory of any system or server in the form of instructions executable by a processor, but rather represents operation of the various wireless signal broadcasting devices $28_1$-$28_P$ and/or 424 illustrated and described with respect to FIGS. 1 and 6 as such operation relates to the broadcast of wireless identification signals as described hereinabove.

Yet another portion of the process 700, i.e., the portion between the center vertical line and the right-most vertical in FIG. 7, and centered under the heading "Main Server," illustratively represents one or more software applications executed by the processor 50 of the main server 12. In one embodiment, this portion of the process 700 is or includes one or more of the modules stored in the Ordered Item Notification Module 540 (see FIG. 5) in the form of instructions executable by the processor 50 of the main server 12. The process steps of this portion of the process 700 will be described below for purposes of this disclosure as being executed by the processor 50 of the main server 12. In some alternate embodiments, e.g., that may or may not include a main server 12, this portion of the process 700 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$ within one or more of the brick-and-mortar enterprise stores or outlets in the form of instructions executable by a processor 200 associated with any such point-of-sale system $24_1$-$24_M$ and/or stored in a memory and executable by a processor of another system external to or supplemental to the system 10 illustrated FIG. 1.

Still another portion of the process 700, i.e., the portion to the right of the right-most vertical line in FIG. 7, and centered under the heading "PSD(s)," illustratively represents one or more software applications executed by a processor 400 of an electronic device or system 405 associated with any of the product/service departments $26_1$-$26_N$. In one embodiment, this portion of the process 700 is or includes the ordered item (OI) application module 410 stored in the memory 402 (and/or data storage 406) of the product/service department's electronic device or system 405 (see FIG. 4) in the form of instructions executable by the processor 400 of the electronic device or system 405. The process steps of this portion of the process 700 will be described below for purposes of this disclosure as being executed by the processor 400 of the product/service department electronic device or system 405.

It will further be understood that portions of the process 700 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the process 700 illustrated in FIG. 7, item 702 illustratively identifies action taken by one or more of the plurality of wireless signal broadcasting devices $28_1$-$28_P$, e.g., positioned at or adjacent to one or more of the entrances to one of the brick-and-mortar stores of the retail enterprise 11, at or adjacent to a curb-side delivery area of one of the brick-and-mortar stores and/or at one or more other locations within, near or adjacent to one of the brick-and-mortar stores, and/or action taken by at least one wireless signal broadcasting device 424 associated with one of the plurality of product/service departments $26_1$-$26_N$ at which a customer has one or more pending orders for one or more items. In some embodiments, each such one or more wireless signal broadcasting devices $28_1$-$28_P$ and/or 424 operate to continuously or continually broadcast wireless identification signals, each of which carry decodable information in the form of a unique identification code (UID) as described hereinabove with respect to FIG. 1. In some embodiments, such signals may be periodically or non-periodically broadcast by the one or more wireless signal broadcasting devices $28_1$-$28_P$, 424 and in other embodiments some such wireless signal broadcasting devices may periodically broadcast wireless signals and others of the wireless signal broadcasting devices may broadcast wireless signals non-periodically. In still other embodiments, one or more such wireless signal broadcasting devices may sometimes periodically broadcast wireless signals and at other times broadcast wireless signals non-periodically. In any case in embodiments in which such wireless signal broadcasting devices continuously or continually broadcast wireless signals, the process advances to step 704 where the wireless communication circuitry 316 of the customer's mobile communication device 16 (or 1010) is illustratively operable to detect any such broadcast wireless identification signals within the broadcast range of which the MCD 16 (or 1010) is located as described above with respect to FIG. 6.

In some alternative embodiments, one or more wireless signal broadcasting devices $28_1$-$28_P$ and/or 424 may be selectively operable to periodically or non-periodically broadcast wireless identification signals. In such embodiments, one or more such wireless signal broadcasting devices may, for example, be responsive to one or more control signals produced by the processor 50 of the main server, the processor 30 of one of the local hub servers $22_1$-$22_L$, a processor 200 associated with one or more of the point-of-sale systems $24_1$-$24_M$ located in the brick-and-mortar store and/or other processor(s) associated with the one or more devices 405, to selectively wake up or otherwise activate and begin broadcasting wireless identification signals, and to selectively deactivate and cease broadcasting wireless signals. In some embodiments, the brick-and-mortar store may include a plurality of conventional proximity or motion-detecting sensors, e.g., one or more such sensors at or near one or more of the wireless signal broadcasting devices $28_1$-$28_P$ and/or 424 and production of such control signals may be triggered by proximity or motion signals produced by such sensors. In other embodiments, production of such control signals may, for example, be triggered by the processor 50, e.g., in response to certain operating hours of one or more of the brick-and-mortar stores or outlets of the retail enterprise 11. Those skilled in the art will recognize that any modifications required to implement and integrate one or more steps of any such alternate embodiment into the process 700 would be a mechanical step for a skilled programmer, and that such alternate embodiments therefore fall within the scope of this disclosure.

As used hereinafter, the term "in-range" will be understood to refer to one or more of the wireless signal broadcasting devices $28_1$-$28_P$ and/or 424 within the broadcast range of which a customer's mobile communication device 16 (or 1010) is presently located. Thus, in the example illustrated in FIG. 6 the customer carrying the mobile communication device 16 is within the broadcast range of the wireless signal broadcasting devices 424 as illustrated by the dashed-line wireless identification signals in contact with the device 16, and in this example the wireless signal broadcasting device 424 is an in-range wireless signal broadcasting device relative to the customer mobile communication device 16.

Referring again to FIG. 7, the processor 300 of the customer's mobile communication device 16 (or 1010) is responsive at step 704 to detect the unique identification signals wirelessly broadcast by any in-range ones of the plurality of wireless signal broadcasting devices $28_1$-$28_P$ and/or 424 at the time of execution of step 704. Following step 704, the process 700 advances to step 706 where the processor 300 of the customer's mobile communication device 16 is responsive to detection of wireless identification signals broadcast by any in-range wireless signal broadcasting devices $28_1$-$28_P$ and/or 424 to wake up and activate the OI application 310 stored in the memory 304 or data storage 306 of the mobile communication device 16 (or 1010). Thereafter at step 708, the processor 300 is operable to transmit one or more wireless signals to the main server 12, e.g., to control the communication circuitry 316 in the device 16 (or 1010) to wirelessly transmit one or more signals to the main server 12 via the public network 14. The one or more wireless signals illustratively contain(s) the unique identification (UID) of each in-range wireless signal broadcasting devices $28_1$-$28_P$, and/or 424, and also illustratively contain(s) an identification of the customer's mobile communication device 16 (or 1010). The identification of the customer's mobile communication device 16 (or 1010) may be, for example, the communication information (CI), e.g., cellular telephone number and/or other communication identifier, which identifies the customer's mobile communication device 16 (or 1010) to the main server 12 for the purpose of communicating information from the main server 12 back to the customer's mobile communication device 16 (or 1010).

In one embodiment, the processor 300 of the customer's mobile communication device 16 (or 1010) is operable at step 706 to process the wireless broadcast signal broadcast by one or more in-range wireless signal broadcasting devices $28_1$-$28_P$ and/or 424 to determine therefrom the UID of each such in-range wireless signal broadcasting device, and to include each such UID in the one or more wireless signals transmitted by the customer's mobile communication device 16 (or 1010) to the main server 12 at step 708. In other embodiments, the processor 300 may be operable at step 706 to process one or more of the wireless broadcast signals broadcast by in-range ones of the wireless signal broadcasting devices $28_1$-$28_P$ and/or 424 and detected by the customer's mobile communication device 16 (or 1010), and to include in the one or more wireless signals transmitted by the customer's mobile communication device 16 (or 1010) to the main server 12 at step 708 only the raw signal content of one or more detected wireless identification signals. In such embodiments, the processor 50 of the main server 12 may be operable to thereafter process the raw signal content transmitted thereto by the customer's mobile communication device 16 (or 1010) to determine therefrom the UID of each corresponding in-range wireless signal broadcasting devices $28_1$-$28_P$ and/or 424.

Following step 708, the main server 12 is operable at step 710 to receive the one or more wireless signals transmitted by the customer's mobile communication device 16 (or 1010) at step 608, and the processor 50 of the main server 12 is thereafter operable at step 712 to process the UID(s) contained therein to determine the identities of each of the one or more in-range ones of the wireless signal broadcasting devices $28_1$-$28_P$ and/or 424 whose wirelessly broadcast identification signals were detected by the customer's mobile communication device 16 (or 1010) at step 704, and to process the resulting wireless signal broadcasting device identity data to determine one or more of the location or identity of the brick-and-mortar store or outlet in which the detected wireless signal broadcasting device(s) $28_1$-$28_P$ and/or 424 is/are located, the type of wireless signal broadcasting device(s) detected, and, in some embodiments, the location of the customer's mobile communication device 16 (or 1010) relative to a structure or location within the identified brick-and-mortar store.

As described briefly above with respect to FIG. 5, the ordered item processing module 542 illustratively has stored therein wireless signal broadcasting device identity information for each wireless signal broadcasting device $28_1$-$28_P$ and 424 in the retail enterprise 11 as well as additional information from which the processor 50 can determine, for each wireless signal broadcasting device $28_1$-$28_P$ and 424, the identity of the brick-and-mortar store at which each such wireless signal broadcasting device $28_1$-$28_P$ and 424 is located as well as the relative location or position of that wireless signal broadcasting device within or about the identified brick-and-mortar store. In one embodiment, for example, the wireless signal broadcasting device identity information stored in the ordered item processing module 542 includes the UIDs for each of the wireless signal broadcasting devices $28_1$-$28_P$ and 424 in the retail enterprise 11, and each such UID includes or is associated with, e.g., linked to, mapped to, or otherwise identified in the ordered item processing module 540 with, a brick-and-mortar store identifier (BMID), e.g., in the form of a designation number or code, which identifies the corresponding one of the brick-and-mortar stores of the retail enterprise in which the corresponding wireless signal broadcasting devices is located. In some embodiments, the brick-and-mortar location identifiers, BMID, are illustratively stored in the form of store numbers or codes, such as store 10 or store JS-3. In other embodiments, the brick-and-mortar location identifiers may include additional information such as city, state or country identifier or the like.

In some embodiments, each UID is further associated in the ordered item processing module 542 with, e.g., linked to, mapped to or otherwise identified with, a wireless signal broadcasting device type identifier (BT), e.g., in the form of a designation code or other identifier which identifies the type of the corresponding wireless signal broadcasting device. The wireless signal broadcasting device type identifiers, BT, in embodiments which include wireless signal broadcasting device type identifiers, are illustratively stored in the form of wireless signal broadcasting device type codes, each of which illustratively identify the wireless signal broadcasting device type by a particular use or location of a wireless signal broadcasting device. Examples of wireless signal broadcasting device type codes may include, for example, "POS" which illustratively identifies wireless signal broadcasting devices used with and located at one or more of the point-of-sale systems $24_1$-$24_M$, "SE" which illustratively identifies wireless signal broadcasting devices $28_1$-$28_P$ used at and located in or at customer entry areas to brick-and-mortar stores of the retail enterprise, "PSD" which illustratively identifies wireless signal broadcasting device 424 used at and located in, at or near one or more of the product/service departments $26_1$-$26_N$, "CSD" which illustratively identifies wireless signal broadcasting devices $28_1$-$28_P$ used and located at or near one or more curb-side delivery areas outside of and adjacent to brick-and-mortar stores, and the like. Those skilled in the art will recognize other uses and/or locations where one or more wireless signal broadcasting devices may be positioned and other corresponding codes that may be used to identify such wireless signal broadcasting devices types, and it will be understood that any such other wireless signal broadcasting devices uses/locations and associated wireless signal broadcasting device type codes are contemplated by this disclosure.

In some embodiments, each UID is additionally or alternatively associated in the ordered item processing module 542 or other database with, e.g., linked to, mapped to or otherwise identified with, a wireless signal broadcasting device location identifier (BID), e.g., in the form of a designation code or other identifier which identifies the location of the corresponding wireless signal broadcasting device within the brick-and-mortar enterprise store identified by BMID. In some embodiments, the wireless signal broadcasting device location identifiers, BID, are illustratively stored in the form of location coordinates relative to a base or reference set of coordinates. In some alternate embodiments, the wireless signal broadcasting device location identifiers, BID, may be stored in the form of one or more location codes identifying one or more of an aisle, shelf, section, merchandise area, product/service department, customer entry area, curb-side pickup area, specific pickup location or location identifier within a curb-side pickup area, point-of-sale system and/or other identifier which identifies a particular location within, near or adjacent to a corresponding one of the plurality of brick-and-mortar stores. As one specific example of a wireless signal broadcasting device location identifier, BID, which identifies one of the product/service departments $26_1$-$26_N$, a particular BID may be or include a location code BAK which identifies the location of a corresponding wireless signal broadcasting device 424 to be positioned at or near a bakery located in the brick-and-mortar store. As another example, another particular BID may be or include a location code ENT1 which identifies the location of a corresponding one of the wireless signal broadcasting device $28_1$-$28_P$ to be positioned at or near entrance number 1 of the brick-and-mortar store. As still another example, a particular BID may be or include a location code CSP3 which identifies the location of a corresponding one of the wireless signal broadcasting device $28_1$-$28_P$ to be positioned at or near curb-side pickup location 3 located in or at a curb-side pickup area outside of and adjacent to the brick-and-mortar store. Other techniques for storing and/or processing wireless signal broadcasting devices identity information to determine the relative or precise location of any of the wireless signal broadcasting devices $28_1$-$28_P$ and/or 424 within, outside of or relative to any of the brick-and-mortar enterprise stores will occur to those skilled in the art, and it will be understood that any such other techniques are contemplated by this disclosure.

In any of the foregoing embodiments, the processor 50 is illustratively operable at step 712 to process each of the one or more received UID(s) by searching for a corresponding UID stored in the ordered item processing module 542 or other database that matches the wirelessly received UID and determining from the BMID associated therewith in the ordered item processing module 542 the identity of the corresponding one of the brick-and-mortar stores of the retail enterprise 11 at which the corresponding wireless signal broadcasting devices is located. In some embodiments, the processor 50 is further illustratively operable at step 712 to identify the wireless signal broadcasting device type, BT, associated in the ordered item processing module 542 with the matched UID and determining from the identified BT the type of the detected wireless signal broadcasting device. In some embodiments, the processor 50 is alternatively or additionally operable at step 712 to identify the wireless signal broadcasting device identity, BID, associated in the ordered item processing module 542 or other database with the matched UID and determining from the identified BID the location of the corresponding wireless signal broadcasting device within or relative to the one of the brick-and-mortar stores of the retail enterprise 11 identified by BMID.

The processor 50 is further illustratively operable at step 712 to process the identified brick-and-mortar store or outlet and the wireless signal broadcasting device type and/or location information for each UID received at step 708 from the customer's mobile communication device 16 to determine or estimate the location of the customer's mobile communication device 16 relative to one or more reference locations within or relative to the identified brick-and-mortar store. The identity of the brick-and-mortar store or outlet is determined from the BMID values associated with each received UID, and the types and locations of each wireless signal broadcasting device $28_1$-$28_P$ and/or 424 from which a UID was received are determined from the BT and/or BID values respectively associated with each received UID, and the customer's location can therefore be determined or estimated within or relative to the identified brick-and-mortar store based on the types and/or locations of the various wireless signal broadcasting devices $28_1$-$28_P$ and/or 424 from which a UID was received. Thus, in the example illustrated in FIG. 6, a UID would be wirelessly received by the customer's mobile communication device 16 from the wireless signal broadcasting device 424, and the processor 50 is illustratively operable at step 712 to determine from the BMID associated in the ordered item processing module 542 or other database with the UID stored therein that matches the wirelessly received UID that the wireless signal broadcasting device 424 is located in the brick-and-mortar store $25_1$. In embodiments in which a wireless signal broadcasting device type identifier, BT, is also associated in the ordered item processing module 542 with the matching UID stored therein, the processor 50 may be further operable at step 712 to determine from the BT associated with the matching UID that the wireless signal broadcasting device 424 is a product/service department (PSD) wireless signal broadcasting device. In embodiments in which a wireless signal broadcasting device location identifier, BID, is alternatively or additionally associated in the ordered item processing module 542 with the matching UID stored therein, the processor 50 may be further operable at step 712 to determine from the BID associated with the matching UID that the wireless signal broadcasting device 424 is located at or near the pharmacy department of the identified brick-and-mortar store 26 of the retail enterprise 11.

As another example in which a UID is received by the customer's mobile communication device 16 from a wireless signal broadcasting device 28, e.g., one of the wireless signal broadcasting devices $28_1$-$28_P$, that is located at an entrance, e.g., entrance 1, to a brick-and-mortar store, e.g., store $25_1$, the processor 50 is illustratively operable at step 712 to determine from the BMID associated in the ordered item processing module 542 or other database with the UID stored therein that matches the wirelessly received UID that the wireless signal broadcasting device 28 is located at the brick-and-mortar store $25_1$. In embodiments in which a wireless signal broadcasting device type identifier, BT, is also associated in the ordered item processing module 542 with the matching UID stored therein, the processor 50 may be further operable at step 712 to determine from the BT associated with the matching UID that the wireless signal broadcasting device 28 is a store entrance (SE) wireless signal broadcasting device. In embodiments in which a wireless signal broadcasting device location identifier, BID, is alternatively or additionally associated in the ordered item processing module 542 with the matching UID stored therein, the processor 50 may be further operable at step 712 to determine from the BID associated with the matching UID that the wireless signal broadcasting device 28 is located at entrance 1 of the brick-and-mortar store $25_1$.

As yet another example in which a UID is received by the customer's mobile communication device 16 and/or 1010 from a wireless signal broadcasting device 28, e.g., one of the wireless signal broadcasting devices $28_1$-$28_P$, that is located at one of the curb-side pickup locations, e.g., curb-side pickup location CS2 of the curb-side pickup area 1006 (see FIG. 10), to a brick-and-mortar store, e.g., store $25_1$, the processor 50 is illustratively operable at step 712 to determine from the BMID associated in the ordered item processing module 542 or other database with the UID stored therein that matches the wirelessly received UID that the corresponding wireless signal broadcasting device $28_2$ is located at the brick-and-mortar store $25_1$. In embodiments in which a wireless signal broadcasting device type identifier, BT, is also associated in the ordered item processing module 542 with the matching UID stored therein, the processor 50 may be further operable at step 712 to determine from the BT associated with the matching UID that the wireless signal broadcasting device $28_2$ is a curb-side pickup (CSP) wireless signal broadcasting device. In embodiments in which a wireless signal broadcasting device location identifier, BID, is alternatively or additionally associated in the ordered item processing module 542 with the matching UID stored therein, the processor 50 may be further operable at step 712 to determine from the BID associated with the matching UID that the wireless signal broadcasting device $28_2$ is located at the curb-side pickup location CS2 of the curb-side pickup area 1006 of the brick-and-mortar store $25_1$.

It will be understood that while some embodiments may include BT and/or BID in the data associated in the ordered item processing module 542 with a corresponding UID, other embodiments may exclude either or both of BT and BID. In some cases, for example, it may be enough to determine that the UID detected by the customer's mobile communication device 16 (or 1010) is located at a particular brick-and-mortar store of the retail enterprise 11, while in other cases it may be necessary or beneficial to determine a type and/or location of the corresponding wireless signal broadcasting device.

At step 708, the processor 300 is further illustratively operable to wirelessly transmit to the main server information relating to the identity of the transmitting mobile communication device 16 (or 1010) and/or the customer associated therewith. The main server 12 receives such customer/device identity information at step 710, and thereafter at step 712 to processor 50 is illustratively operable to process the received customer/device identity information to determine the identity of the customer associated with the mobile communication device 16 (or 1010) which wirelessly transmitted the UID(s) at step 708. In one embodiment, the memory 304 or data storage 306 of the mobile communication device 16 (or 1010) has stored therein communication information (CI) which identifies the mobile communication device 16 (or 1010) for purposes of wirelessly communicating therewith, e.g., a mobile telephone number, vehicle identification number and/or other communication code. In such embodiments, the processor 300 is illustratively operable at step 708 to wirelessly transmit the CI, and at step 712 the processor 50 of the main server 12 is illustratively operable to process the communication information (CI) by searching the customer account data 404 for a matching CI and determining a customer identifier associated in the customer account data 404 with CI stored therein that matches the wirelessly received CI. In some embodiments in which items ordered by customers from one or more product/service departments are associated with and tracked by the processor 50 in accordance with the EMS program described above, the customer identifier may be the EMSID associated therewith in the customer account data 404. In other embodiments in which items ordered by customers from one or more product/service departments are not associated with and tracked by the processor 50 in accordance with the EMS program described above, but are instead associated with and tracked by the processor in accordance with ordered item data stored in the customer account data 404 or other database, the customer identifier may be the name or other identifier of the customer that ordered the one or more items. In either case, the customer identifier stored in the customer account data 504 or other database which identifies the customer will be referred to hereinafter as CUSTID.

In some alternate embodiments, the memory 304 or data storage 306 of the customer's mobile communication device 16 (or 1010) may have stored therein the customer identifier, CUSTID, which identifies the customer that placed an order for one or more items from one or more product/service departments $26_1$-$26_N$. In such embodiments, the processor 300 is illustratively operable at step 708 to wirelessly transmit CUSTID and at step 712 the processor 50 of the main server 12 is illustratively operable to process CUSTID by searching the customer account data 404 for a matching CUSTID to identify the associated customer. In some embodiments in which items ordered by customers from one or more product/service departments are associated with and tracked by the processor 50 in accordance with the EMS program described above, CUSTID may be the EMSID stored in the customer account data 404. In other embodiments in which items ordered by customers from one or more product/service departments are not associated with and tracked by the processor 50 in accordance with the EMS program described above, but are instead associated with and tracked by the processor in accordance with ordered item data stored in the customer account data 404 or other database, CUSTID may be the name or other identifier of the customer that ordered the one or more items.

In any case, following execution of step 712 of the process 700 illustrated in FIG. 7, the processor 50 has identified the customer associated with the mobile communication device 16 (or 1010) which transmitted the one or more wireless signals at step 708, i.e., CUSTID, and has also identified the brick-and-mortar store (BMID) at which the wireless signal broadcasting device detected by the customer's mobile communication device 16 at step 704 is located as well as the wireless signal broadcasting device type (BT) and/or location (BID) of the wireless signal broadcasting device relative to the identified brick-and-mortar location. Some embodiments of the process 700 illustratively include steps 714 and 716 to which the process 700 advances following execution of step 712, and in such embodiments the processor 50 is illustratively operable at step 714 to determine whether the type of wireless signal broadcasting device, BT, detected by the customer's mobile communication device 16 at step 704 is a store entrance (SE) wireless signal broadcasting device, and if so, to advance to step 716 where the processor 50 is operable to execute a store entrance process. In some such embodiments, the process 700 further illustratively includes steps 718 and 720, and the process 700 advances to step 718 to determine whether the type of wireless signal broadcasting device, BT, detected by the customer's mobile communication device 16 at step 704 is a product/service department (PSD) wireless signal broadcasting device if the processor 50 has determined at step 714 that the wireless signal broadcasting device detected by the customer's mobile communication device 16 at step 708 is not a store entrance (SE) wireless signal broadcasting device. If, at step 718, the processor 50 determines that the type of wireless signal broadcasting device, BT, detected by the customer's mobile communication device 16 at step 704 is a product/service department (PSD) wireless signal broadcasting device, the process 700 advances to step 720 where the processor 50 is operable to execute a product/service department (PSD) monitoring process. Further in some such embodiments, the process 700 illustratively includes steps 722 and 724, and the process 700 advances to step 722 to determine whether the type of wireless signal broadcasting device, BT, detected by the customer's mobile communication device 16 at step 704 is a curb-side delivery (CSD) wireless signal broadcasting device if the processor 50 has determined at step 718 that the wireless signal broadcasting device detected by the customer's mobile communication device 16 (or 1010) at step 708 is not a product/service department (PSD) wireless signal broadcasting device. If, at step 722, the processor 50 determines that the type of wireless signal broadcasting devices, BT, detected by the customer's mobile communication device 16 (or 1010) at step 704 is a curb-side delivery (CSD) wireless signal broadcasting device, the process 700 advances to step 724 where the processor 50 is operable to execute a curb-side delivery (CSD) process, and otherwise the process 700 terminates or loops back to step 710.

In some alternative embodiments, the process 700 may omit steps 714, 716 and steps 722, 724 while retaining steps 718 and 720, in which case the processor 50 is operable to act only on a determination of whether the type of wireless signal broadcasting devices, BT, detected by the customer's mobile communication device 16 at step 704 is a PSD wireless signal broadcasting device. In other alternative embodiments the process 700 may omit steps 718, 720 and steps 722, 724 while retaining steps 714 and 716, in which case the processor 50 is operable to act only on a determination of whether the type of wireless signal broadcasting device, BT, detected by the customer's mobile communication device 16 at step 704 is PSD wireless signal broadcasting devices. In still other alternative embodiments the process 700 may omit steps 714, 716 and steps 718, 720 while retaining steps 722 and 724, in which case the processor 50 is operable to act only on a determination of whether the type of wireless signal broadcasting device, BT, detected by the customer's mobile communication device 16 at step 704 is CSD wireless signal broadcasting device. In yet other embodiments, the process 700 may omit only one of the sets of steps 714, 716 or steps 718, 720 or steps 722, 724 while retaining the other two sets of steps. In any case, the process 700 advances from step 716, in embodiments which include steps 714 and 716, or from step 718, in embodiments which may include steps 718 and 720, or from step 724, in embodiments which may include steps 722, 724, to steps 726 and 732.

At step 726, the processor 50 is illustratively operable to control the communication circuitry 58 of the main server 12 to wirelessly transmit to the mobile communication device 16, 1010 associated with the identified customer one or more messages generated during execution the process 800 (described below) in embodiments of the process 700 which include steps 714 and 716 and/or one or more messages generated at during execution of the process 900 (described below) in embodiments of the process 700 which include steps 718 and 720 and/or the one or more messages generated during execution of the process 1200 (described below) in embodiments of the process 700 which include steps 722 and 724. Thereafter at step 728, the processor 300 of the identified customer's mobile communication device 16 is operable to receive, via the communication circuitry 312, the one or more messages wirelessly transmitted by the main server 12 at step 726, and thereafter at step 730 the processor 300 is operable to control the display 322 of the identified customer's mobile communication device 16, 1010 to display the one or more wirelessly received messages. In embodiments in which the one or more received messages include one or more virtual discount coupons, VDC, the processor 300 may further be responsive at step 730 to manual selection of the displayed one or more virtual discount coupons, e.g., via manual keypad or touch-screen selection, to store the one or more virtual discount coupons in the memory 304 or data storage 306 of the mobile communication device 16, 1010 or in the customer's clipped VDC repository 512 of the server database 502.

At step 732, the processor 50 is illustratively operable to control the communication circuitry 58 of the main server 12 to transmit to the electronic system or device 405 associated with, e.g., located at or within, the identified product/service department 26 the one or more messages generated during execution of the process 800 in embodiments of the process 700 which include steps 714 and 716 and/or the one or more messages generated during execution of the process 900 in embodiments of the process 700 which include steps 718 and 720 and/or the one or more messages generated during execution of the process 1200 in embodiments of the process 700 which include steps 722 and 724. Thereafter at step 734, the processor 400 of the electronic system or device 405 associated with the identified product/service department 26 is operable to receive, via the communication circuitry 412, the one or more messages transmitted thereto by the main server 12 at step 732, and thereafter at step 736 the processor 400 is operable to control one or more display monitors 420 of the electronic system or device 405 associated with the identified product/service department 26 to display the one or more wirelessly received messages.

Store Entrance Process

Referring now to FIG. 8, a simplified flow diagram is shown of an embodiment 800 of the store entrance process executed by the processor 50 of the main server 12 at step 716 of the process 700 (in embodiments of the process 700 that include step 716). In one embodiment, the process 800 is illustratively stored in the store entrance processing module 546 of the ordered item processing module 542 in the form of instructions executable by the processor 50 of the main server 12, and the steps of the process 800 will be described below for purposes of this disclosure as being executed by the processor 50 of the main server. In some alternate embodiments, e.g., that may or may not include a main server 12, the process 800 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$ within one or more of the brick-and-mortar enterprise stores in the form of instructions executable by a processor 200 associated with any such point-of-sale system $24_1$-$24_M$, stored in the memory 402 (and/or data storage 406) of an electronic system or device 405 associated with one or more product/service departments $26_1$-$26_N$ in the form of instructions executable by a processor 400 associated with any such electronic systems or devices 405, and/or stored in a memory and executable by a processor of another system external to or supplemental to the system 10 illustrated FIG. 1. It will further be understood that the process 800 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 800 begins at step 802 where the processor 50 is illustratively operable to search product/service department (PSD) order records stored in the database 502 or other database to access any of one or more PSD order records associated in the database 502 or other database with the customer identifier CUSTID, i.e., to locate PSD records associated with the identified customer. Illustratively, the PSD order records include information which associates the identified customer with one or more items ordered by the identified customer from the retail enterprise 11 and also with additional information relating to the ordered item(s) and product/service department(s) from which it/they were ordered. In one embodiment, each PSD order record may include, for example, CUSTID, an item identifier, ITEMID, which is a code or other identifier identifying the item(s) ordered by the identified customer, and additional information which may include, but is not limited to, any one or combination of an order number or other identifier, OID, which identifies a number or code associated with or assigned to a particular order, a brick-and-mortar store identifier, BMID, which identifies the brick-and-mortar store of the retail enterprise 11 from which the customer ordered the one or more items, a product/service department identifier, PSDID, which identifies the product/service department from which the customer ordered the one or more items, a quantity, Q, which identifies the number of the items ordered by the customer from the product/service department, a date, OD, which identifies the calendar data (and, optionally, time of day) on which the customer ordered the one or more items, a pick up time and date, PTD, which identifies the calendar date, and in some embodiments also a time of day, at which the customer has designated or the product/service department has assigned, for in-store pick up by the customer of the one or more ordered items, order status, OS, which identifies a current status of the order, e.g., Complete, Incomplete, Picked Up, an order completion time, OCT, which identifies an estimated or average time for the product/service department to complete the order, and any special instructions, SP. Illustratively, OCT may be used to set the pickup time/date, PTD, upon receipt of a customer order for one or more items.

In any case, a customer may have ordered one or more items from one or more product/service departments $26_1$-$26_N$ in one or more brick-and-mortar stores of the retail enterprise 11, and at step 802 the processor 50 is operable in one embodiment to access any of the PSD order records associated in the database 502 or other database with CUSTID. In other embodiments, the processor 50 may be operable at step 802 to access only those PSD order records associated with CUSTID that have not been previously fulfilled by one of the product/service departments and picked up by the customer. In either case, following step 802, the processor 50 is illustratively operable at step 804 to determine whether the identified customer has any pending orders. In one embodiment, the processor 50 is illustratively operable to execute step 804 by first determining whether the identified customer has any orders that the customer has not already picked up, e.g., by checking the order status, OS, field of each accessed PSD record associated with CUSTID. If the processor 50 determines at step 804 that the customer has at least one order pending that the customer has not already picked up, e.g., if order status field, OS, of at least one record is Incomplete or Complete (but not yet picked up), this indicates that the identified customer has at least one pending order at one of the brick-and-mortar stores $26_1$-$26_N$ of the retail enterprise 11. Otherwise the process 800 follows the "NO" branch of step 804 and terminates.

If the processor 50 determines at step 804 that the identified customer has at least one pending order at one of the brick-and-mortar stores $26_1$-$26_N$ of the retail enterprise 11, the processor 50 is further illustratively operable at step 804 to determine whether the identified customer has at least one pending order at the brick-and-mortar store of the retail enterprise identified at step 712 of the process 700. In one embodiment, the processor 50 is illustratively operable to make this determination by comparing the BMID, determined at step 712 from the wirelessly received signal(s) transmitted by the customer's mobile communication device 16 at step 708, with the BMID(s) stored in the one or more accessed PSD order records associated with the identified customer, CUSTID. In such embodiments, if the BMID determined at step 712 matches any BMID stored in one or more of the accessed PSD order records associated with the identified customer, then the processor 50 has determined that the identified customer has at least one pending order at the brick-and-mortar store at which the identified customer is currently located and through a store entrance of which the identified customer has just passed. If the BMID determined at step 712 otherwise does not match any BMID stored in any of the accessed PSD order records associated with the identified customer, the process 800 follows the "NO" branch of step 804 and terminates. In some alternative embodiments, the processor 50 may be operable at step 804 to determine whether the identified customer has at least one pending order at the brick-and-mortar store identified at step 712 of the process 700 by first comparing the BMID determined at step 712 with one or more maps stored in the ordered item processor module 542 or other database which map(s) each BMID to corresponding product/service department identifiers, PSDID, identifying one or more product/service departments $26_1$-$26_N$ located at that BMID, for the purpose of identifying a list of such product/service departments $26_1$-$26_N$ located at the BMID determined at step 712. Thereafter, the processor 50 may be further operable at step 804 to determine whether the identified customer has at least one pending order at the brick-and-mortar store identified at step 712 of the process by comparing the list of one or more PSDIDs associated with the identified brick-and-mortar store with the PSDID(s) stored in the one or more accessed PSD order records associated with the identified customer, CUSTID. In such embodiments, if a PSDID in the list of one or more PSDIDs matches any PSDID stored in one or more of the accessed PSD order records associated with the identified customer, then the processor 50 has determined that the identified customer has at least one pending order at the identified brick-and-mortar store. Those skilled in the art will recognize other techniques for determining at step 804 whether a customer has a pending order at any of one or more product/service departments $26_1$-$26_N$ in a particular brick-and-mortar store in which an identified customer has been identified as just having entered (e.g., as described with respect to the process 700 illustrated in FIG. 7) using more, fewer and/or different ones of any one or combination of the different data components of the PSD order records described above by example, or additionally or alternatively using one or more other data components not described above by example but which may relate to the identified customer, the identified brick-and-mortar store, one or more product/service departments within the identified brick-and-mortar store and/or one or more details relating to the item(s) ordered, and which therefore be included in one or more PSD order records, and it will be understood that any such other techniques using any such additional, alternative or other data components are contemplated by this disclosure.

Following a determination by the processor 50 at step 804 that the identified customer has at least one pending order at the identified brick-and-mortar store which the identified customer has just entered, the process 800 advances to step 806 where the processor 50 is illustratively operable to determine whether one or more of the customer's pending orders at one or more of the product/service departments $26_1$-$26_N$ within the identified brick-and-mortar store is Complete. In the example described above, the PSD order records may illustratively include an order status (OS) field which reflects the current status of a particular order. When an order for one or more items is placed, for example, the OS field may be populated, in some embodiments automatically, with an indicator that the ordered item has been received from the customer but has not yet been produced by the corresponding product/service department 26, e.g., Incomplete. When the item is thereafter manufactured, prepared, processed, made or otherwise produced by the product/service department 26, an employee in the product/service department 26 may illustratively access the electronic system or device 405 located in or otherwise associated with the product/service department 26 and change the OS field to indicate that the item has been produced, e.g., Complete. Illustratively, the OS field, in embodiments which include an OS field, may further include one or more additional or alternative status indicators which may be selectively automatically entered into the OS field, examples of which include, but are not limited to, a "Picked Up" status which indicates that a completed order has been picked up by the customer, a "Cancelled" status which indicates that the item order was cancelled by the customer or by an employee of the product/service department 26 or the like. In any case, the processor 50 is illustratively operable at step 806 to determine whether one or more of the customer's pending orders at one or more of the product/service departments $26_1$-$26_N$ within the identified brick-and-mortar store is Complete by comparing the status indicator in the OS field with a list of possible status indicators, e.g., Complete (but not yet picked up) and Incomplete.

If the processor 50 determines, at step 806, that the item order identified at step 804 is Complete, the process 800 advances to step 820 where the processor 50 is illustratively operable to generate or retrieve from the message generation/management module 552 or other message database one or more messages, e.g., PSD message 1, to be transmitted to the electronic system or device 405 located in or associated with the product/service department which produced the identified item. In the example described above, the PSD order records may illustratively include a product/service department identifier (PSDID) field which has stored therein the identity of the one of the plurality of product/service departments $26_1$-$26_N$ from which the item identified at step 804 was ordered and by which the identified item was produced. As part of step 820, or as part of any one or more of steps 712, 804 or 806, the processor 50 is illustratively operable to identify the one of the plurality of product/service departments $26_1$-$26_N$ from which the item identified at step 804 was ordered and by which the identified item was, or is to be, produced by comparing the code or other information stored in the PSDID field of the PSD order record with a list of the possible product/service departments $26_1$-$26_N$ located at the identified brick-and-mortar store. The PSD message 1 generated or retrieved from a message database at step 820 by the processor 50 illustratively identifies, in one embodiment, the product/service department $26_1$-$26_N$ identified by the PSDID field of the PSD order record. In any case, the message "PSD message 1" illustratively includes information notifying the identified product/service department 26 that the identified customer, i.e., CUSTID, has just entered the store and has a completed order ready for pick up. Upon subsequent transmission of PSD message 1 to the electronic system or device 405 located in or otherwise associated with the identified product/service department 26, one or more attendants or other employee(s) working in the identified product/service department are thereby notified in advance, e.g., from a few seconds to several minutes or more, of the identified customer's arrival at the identified product/service department 26. In some implementations, this advance notification may, for example, provide sufficient time for one or more attendants or other employees of the identified product/service department 26 to perform one or more operations in preparation for the ordered item(s) for pickup.

Following step 820, the processor 50 is illustratively operable at step 822 to generate or retrieve from the message generation/management module 552 or other message database or more messages, e.g., Customer message 1, to be transmitted to the mobile communication device 16 of the identified customer. The message "customer message 1" illustratively includes information notifying the identified customer of a completed order that is ready for pickup at the identified product/service department 26. Upon subsequent transmission of customer message 1 to the customer's mobile communication device 16, the customer is thus notified, and perhaps reminded, upon entry into the brick-and-mortar stored of the one or more pending ordered items.

If, at step 806, the processor 50 determines that the item order identified at step 804 is not Complete, the process 800 advances, in some embodiments in which not Complete means Incomplete, to step 808. In the example described above, the PSD order records may illustratively include a pickup time and/or date identifier (PTD) field which has stored therein a scheduled calendar date, and in some embodiments also a time of day, at which the identified customer is to pick up the ordered item(s) and/or at or after which the ordered item(s) are to be available for customer pick up. In some such embodiments, the customer may specify the PTD identifier and in other embodiments an attendant or other employee of a product/service department 26 (or other employee of the retail enterprise 11) may do so. In still other embodiments, the processor 50 may automatically populate the PTD field based on a typical, average or other predefined time required by the product/service department 26 to produce the ordered item(s) from the time of the order, e.g., the OCT time described above. In any case, in some such embodiments in which the PSD order records include the PTD field, the process 800 illustratively includes step 808, and the processor 50 is operable at step 808 to compare the current time and date, CTD, with the PTD identifier stored in the PTD field of the PSD order record. If the CTD is less than PTD, then the scheduled date and/or time of customer pick up, or scheduled data and/or time beyond which the customer may pick up, the ordered item(s) has not yet arrived, and the process 800 follows the "YES" branch of step 808 and advances to step 30. Otherwise, the process 800 advances, in some embodiments, to step 810.

In the example described above, the PSD order records may illustratively include an order completion time (OCT) field which has stored therein a typical, average or other predefined time required by the product/service department 26 to produce the ordered item(s) from the time of the order. In some such embodiments, the OCT field may be populated by an attendant or other employee of the product/service department 26 (or other employee of the retail enterprise 11), and in other embodiments the OCT field may be automatically populated by the processor 50 based on stored OCT times for various items produced by one or more of the product/service departments $26_1$-$26_N$. In any case, in some such embodiments in which the PSD order records include the OCT field, the process 800 illustratively includes step 810, and the processor 50 is operable at step 810 to compare the order completion time stored in the OCT field with a time value, T. In some embodiments, the time value T is an estimated or measured, typical or average, time that it takes a typical customer to travel from the store entrance, i.e., the location at or near which the wireless signal broadcasting device is located which was detected by the customer's mobile communication device 16 at step 704 of the process 700 illustrate in FIG. 7, to the product/service department 26 at which the identified customer has a pending order. In some alternative embodiments, the time value T may be an estimated or measured, typical or average, time spent by the identified customer shopping at the identified brick-and-mortar outlet of the retail enterprise 11. In such embodiments, the amounts of time spent by the identified customer shopping at the identified brick-and-mortar store in previous shopping trips may be stored in the customer's purchase history 508, and in some embodiments the time value T may be estimated or computed based on such information. In other embodiments, the amount of time spent by the identified customer shopping at the identified brick-and-mortar outlet of the retail enterprise 11 may be estimated or computed based on that of a typical or average customer of the retail enterprise 11. In any case, if the processor 50 determines at step 810 that OCT is less than or equal to the time value T, this means that the order completion time, OCT, is less than the travel time, T, of the identified customer from the store entrance to the product/service department 16 at which the identified customer has an order pending or is less than the average shopping time, T, of the identified customer in the identified brick-and-mortar store. In either case, the process 800 illustratively advances to step 812 where the processor 50 is operable to generate or retrieve from the message generation/management module 552 or other message database one or more messages, e.g., PSD message 2, to be transmitted to the electronic system or device 405 located in or associated with the product/service department which produced the identified item. The PSD message 2 generated or retrieved from a message database at step 812 by the processor 50 illustratively identifies, in one embodiment, the product/service department $26_1$-$26_N$ identified by the PSDID field of the PSD order record. In some alternative embodiments, identification of the product/service department $26_1$-$26_N$ from which the item identified at step 804 was ordered and by which the identified item was, or is to be, produced takes place at step 728 of the process 700 which will be described in greater detail hereinafter. In any case, the message "PSD message 2" illustratively includes information notifying the identified product/service department 26 that the identified customer, i.e., CUSTID, has just entered the store and has an incomplete item order that is overdue, and illustratively further includes instructions to complete the pending order immediately. In some embodiments, information relating to the OCT value and/or the time value, T, may also be included in the PSD message 2. Upon subsequent transmission of PSD message 2 to the electronic system or device 405 located in or otherwise associated with the identified product/service department 26, one or more attendants or other employee(s) working in the identified product/service department are thus notified in advance, e.g., from a few seconds to several minutes or more, of the identified customer's arrival at the identified product/service department 26. In some implementations, this advance notification may, for example, provide sufficient time for one or more attendants or other employees of the identified product/service department 26 to prepare the ordered item or complete the ordered item prior to an estimated time of arrival of the identified employee at the product/service department 26 or prior to an estimated departure by the identified customer from the brick-and-mortar store 26.

If, at step 810, the processor 50 determines that OCT is greater than or equal to the time value T, this means that the order completion time, OCT, is greater than travel time, T, of the identified customer from the store entrance to the product/service department 16 at which the identified customer has an order pending or is less than the average shopping time, T, of the identified customer in the identified brick-and-mortar store. The product/service department 26 therefore will not have sufficient time to complete the pending order prior to arrival of the identified customer at the product/service department 26, or prior to departure by the identified customer from the brick-and-mortar store, and the process 800 illustratively advances in some such embodiments to step 814 where the processor 50 is operable to generate or retrieve from the VDC module 550 a virtual discount coupon (VDC). In some embodiments, the processor 50 is illustratively operable to generate VDC, e.g., pursuant to instructions stored in the VDC module 550, by retrieving a virtual discount coupon from the virtual discount coupon database 510, and in other embodiments the processor 50 may be operable to generate VDC, e.g., pursuant to instructions stored in the VDC module 550, from or based on any of one or more different parameters, examples of which may include, but are not limited to, the customer's purchase history stored in the customer purchase history database 508, one or more products currently in inventory and identifiable as such in the product/service and pricing data 506, one or more such products currently in excess, one or more seasonal products in inventory, one or more overstocked products, one or more products or services included in one or more promotions, and the like.

Following step 814, the process 800 illustratively advances to step 816 where the processor 50 is illustratively operable to generate or retrieve from the message generation/management module 552 or other message database one or more messages, e.g., customer message 2, to be transmitted to the mobile communication device 16 of the identified customer. The message "customer message 2" illustratively includes information notifying the identified customer that the customer's pending order has not been completed and further illustratively includes information relating to the virtual discount coupon, VDC, generated at step 814 or includes the VDC itself. In the former case, the processor 50 may be operable as part of step 814 to transfer the generated VDC to the identified customer's clipped virtual discount coupon repository 512, in embodiments in which the identified customer has such a clipped virtual discount coupon repository 512. In the latter case, the VDC may be sent directly to the identified customer, as will be described below with reference to the remainder of the process 700 illustrated in FIG. 7, and in such cases the identified customer may transfer the received VDC to the customer's clipped virtual coupon repository 512 if the identified customer has such a clipped virtual coupon repository 512 and otherwise the identified customer may store the received VDC in the memory 304 or data storage 306 of the customer's mobile communication device 16 for subsequent redemption at a the retail enterprise 11. In some embodiments, customer message 2 may further include information relating to the identity of and/or further details relating to the pending ordered item. Further in some embodiments, the processor 50 may be operable as part of step 816 to compute or estimate a revised completion date and/or time for the pending ordered item, e.g., based on an order completion time stored in the order completion time (OCT) field of the PSD order record in embodiments which include an OCT field, and customer message 2 may include in such embodiments information relating to such a revised completion date. Upon subsequent transmission of customer message 2 to the customer's mobile communication device 16, the customer is thus notified of the incomplete status of the customer's pending ordered item, and is illustratively further provided with, or notified of, a virtual discount coupon redeemable by the customer at the retail enterprise 11.

Following step 816, the process 800 illustratively advances to step 818 where the processor 50 is illustratively operable to generate or retrieve from the message generation/management module 552 or other message database one or more messages, e.g., PSD message 3, to be transmitted to the electronic system or device 405 located in or associated with the product/service department which produced the identified item. As part of step 810, the processor 50 may illustratively compute or estimate a revised pickup time and/or date (PTD) based on an estimated or computed order completion time, e.g., stored in the OCT field of the PSD order record in embodiments which include the OCT field, and in such embodiments the PSD message 3 generated or retrieved from a message database at step 818 by the processor 50 illustratively includes information notifying the identified product/service department 26 that the pending item ordered by the identified customer is overdue, and may further include instructions to complete the ordered item for subsequent pickup by the identified customer by the revised pickup time and/or date. Upon subsequent transmission of PSD message 3 to the electronic system or device 405 located in or otherwise associated with the identified product/service department 26, one or more attendants or other employee(s) working in the identified product/service department are thereby notified of the incomplete order and, in some embodiments, of instructions regarding the revised pickup time and/or date.

In some embodiments, the process 800 may include a step 824, and in other embodiments step 824 may be omitted. Accordingly, step 824 is depicted in FIG. 8 in dashed-line to represent that step 824 may be optional. In embodiments which include step 824, the process 800 advances to step 824 from step 818, from step 812 and also from step 822. Step 824 includes step 826 where the processor 50 is operable to determine one or more additional items, i.e., in addition to the one or more ordered item(s), to recommend to the customer. At step 826, information available to the processor 50 includes the present location of the identified customer, i.e., at or near a, or the, store entrance and, if the customer has one or more ordered items that is/are complete or that can be completed before the customer reaches the identified product/service department, as determined by the processor 50 at step 810, the destination of the customer, i.e., the one of the product/service departments $26_1$-$26_N$ which has the customer's completed or nearly completed order. In embodiments in which the customer has been provided with one or more virtual discount coupons, e.g., as part of steps 814 and 816, the processor 50 may be operable to predict the customer's destination as an area, or areas, of the store at which the item(s) corresponding to the one or more virtual discount coupons can be found.

In embodiments which include the customer shopping list database 518, for example, the processor 50 is illustratively operable at step 826 to access the database 518 to determine whether the identified customer has any items stored therein. If so, the processor 50 is illustratively operable at step 826 to compare the items in the customer's shopping list stored in the database 518 with product location information in the store location data 514 and determine one or more routes from the customer's present location to the customer's destination (or one or more customer destinations as determined or predicted by the processor 50) via which the customer may collect the items in the customer's shopping list. In some embodiments, the one or more such routes may include a most efficient route which is estimated by the processor 50 to minimize shopping time. Other route strategies may be alternatively or additionally determined by the processor 50. In some such embodiments and/or in embodiments which do not include the customer shopping list database 518, the processor 50 may be operable at step 826 to compare items in the customer's purchase history 508 with product location information in the store location data 514, to determine one or more recommended items located between the customer's present location and the customer's destination (or one or more customer destinations as determined or predicted by the processor 50) that the customer may need or find useful and determine one or more routes from the customer's present location to the customer's destination via which the customer may collect such one or more recommended items. The one or more recommended items may be or include, for example, but should not be limited to, one or more items that may be used or combined with one of the one or more ordered items, one or more items that may be used or combined with one or more items recently purchased by the customer, one or more items which the customer periodically purchases and is due to purchase soon, one or more items which the customer typically purchases which are currently discounted, and the like. Those skilled in the art will recognize other strategies for predicting or otherwise determining one or more items to recommend to the customer, and it will be understood that any such other strategies are contemplated by this disclosure. In any case, the process 800 advances from step 826 to step 828 where the processor 50 is operable to generate or retrieve from the message generation/management module 552 or other message database one or more messages, e.g., customer message 3, to be transmitted to the mobile communication device 16 of the identified customer. The message "customer message 3" illustratively includes information identifying the one or more items in the customer's shopping list and/or one or more recommended items, and information regarding the one or more routes through the store to collect such items. In some embodiments, the message may further include information relating to a virtual discount coupon, VDC, generated at step 826, or includes the VDC itself, for one or more such items.

Following step 828 in embodiments which include step 824, and following step 812, the "YES" branch of step 808, in embodiments of the process 800 which include any such steps, and step 822 in embodiments which do not include step 824, the process 800 advances to step 830 to determine whether the identified customer has any additional pending orders, e.g., using the same process(es) described above with respect to step 804. If so, the process 800 loops back to step 806, and otherwise the process 800 is complete, as it is following the "NO" branch of step 804, and the process 800 then returns to step 716 of the process 700 illustrated in FIG. 7.

PSD Monitoring Process

Referring now to FIG. 9, a simplified flow diagram is shown of an embodiment 900 of the PSD monitoring entrance process executed by the processor 50 of the main server 12 at step 720 of the process 700 (in embodiments of the process 700 that include step 720). In one embodiment, the process 900 is illustratively stored in the PSD monitoring module 548 of the ordered item processing module 542 in the form of instructions executable by the processor 50 of the main server 12, and the steps of the process 900 will be described below for purposes of this disclosure as being executed by the processor 50 of the main server. In some alternate embodiments, e.g., that may or may not include a main server 12, the process 900 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$ within one or more of the brick-and-mortar enterprise stores in the form of instructions executable by a processor 200 associated with any such point-of-sale system $24_1$-$24_M$, stored in the memory 402 (and/or data storage 406) of an electronic system or device 405 associated with one or more product/service departments $26_1$-$26_N$ in the form of instructions executable by a processor 400 associated with any such electronic systems or devices 405, and/or stored in a memory and executable by a processor of another system external to or supplemental to the system 10 illustrated FIG. 1. It will further be understood that the process 900 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 900 begins at step 902 where the processor 50 is illustratively operable to search product/service department (PSD) order records stored in the database 502 or other database and access any of one or more PSD order records associated in the database 502 or other database with the customer identifier CUSTID, i.e., to access one or more PSD order records associated with the identified customer. Illustratively, the processor 50 is operable to execute step 902 as described hereinabove with respect to step 802 of the process 800 illustrated in FIG. 8, and the one or more PSD order records stored in the database 502 or other database may illustratively have stored therein any one or combination of the items of information described above. Those skilled in the art will recognize, however, that other embodiments of the one or more PSD order records may alternatively include more, fewer and/or other information items, and it will be understood that any such alternative embodiments of the one or more PSD order records are contemplated by this disclosure.

The process 900 advances from step 902 to step 904 where the processor 50 is illustratively operable to determine whether the identified customer has any pending orders at the product/service department 26, PSDID, at or near which the identified customer is currently located. It should be noted that the process 900 is illustratively executed by the processor 50 in embodiments of the process 700 which include step 720, and step 720 is executed by the processor 50 if the wireless signal broadcasting device 424 whose wireless identification signal(s) was/were detected by the customer's mobile communication device 16 at step 704 is a PSD wireless signal broadcasting device as described above with respect to FIG. 7. As part of step 712 (as described above), or as part of step 920 and/or either of steps 904 or 906, the processor 50 is further illustratively operable to identify or determine a product/service area $26_1$-$26_N$ within the identified brick-and-mortar store at or near which the identified PSD wireless signal broadcasting device 424 is located. Illustratively, the processor 50 is operable to make such a determination by processing the wireless signal broadcasting device identity code, BID, associated in the ordered item processing module 542 or other database with the UID of the wireless signal broadcasting device 424 to determine therefrom the identity, PSDID, of the one of the various product/service areas $26_1$-$26_N$ within the identified brick-and-mortar store at or near which the identified customer is currently located.

The processor 50 is further illustratively operable at step 904 to determine whether the identified customer has any pending orders at the product/service department 26, PSDID, at or near which the identified customer is currently located, i.e., at the identified PSDID, by comparing identified PSDID with the PSDIDs stored in the PSDID fields of the one or more PSD order records found at step 902 to be associated with the identified customer. If, at step 904, the processor 50 determines that the identified PSDID matches a PSDID stored in the PSDID field of at least one of the PSD order records associated with the identified customer, this means that the identified customer is located at or near an identified product/service department 26 from and at which the customer has at least one order pending, and the process 900 advances from step 904 to step 906. Otherwise, the process 900 terminates and returns to step 720 of the process 700. Those skilled in the art will recognize other techniques for determining at step 904 whether a customer has a pending order at the product/service department 26, PSDID, at or near which the identified customer is currently located using more, fewer and/or different ones of any one or combination of the different data components of the PSD order records described above by example, or additionally or alternatively using one or more other data components not described above by example but which may relate to the identified customer, the identified brick-and-mortar store, one or more product/service departments within the identified brick-and-mortar store and/or one or more details relating to the item(s) ordered, and which therefore be included in one or more PSD order records, and it will be understood that any such other techniques using any such additional, alternative or other data components are contemplated by this disclosure.

Following a determination by the processor 50 at step 904 that the identified customer has at least one pending order at the product/service department 26, PSDID, at or near which the identified customer is currently located, the process 900 advances to step 906 where the processor 50 is illustratively operable to determine whether one or more of the customer's pending orders at the identified product/service department 26 within the identified brick-and-mortar store is Complete. The processor 50 is illustratively operable at step 906 to determine whether one or more of the customer's pending orders at the product/service department 26, PSDID, at or near which the identified customer is currently located is Complete by comparing the status indicator in the OS field with a list of possible status indicators, e.g., Complete (but not yet picked up) and Incomplete, as described above with respect to step 804 of the process 800.

If the processor 50 determines, at step 906, that the item order identified at step 904 is Complete, the process 900 advances to step 918 where the processor 50 is illustratively operable to generate or retrieve from the message generation/management module 552 or other message database one or more messages, e.g., customer message 4, to be transmitted to the mobile communication device 16 of the identified customer. The customer message 4 generated or retrieved from the message generation/management module 552 or other message database at step 918 by the processor 50 illustratively includes information notifying the identified customer that an order placed by the customer for one or more items from the identified product/service department 26 is complete and ready for pick up. In some embodiments, customer message 4 may further include one or more messages notifying the identified customer that an attendant or other employee at the identified product/service department 26 will assist the identified customer promptly or momentarily. In some embodiments, one or more data records may be stored in the database 502 which identify names and/or photographs and work schedules of attendants and/or other employees of the various product/service departments 26₁-26ₙ within the retail enterprise 11, and in such embodiments customer message 4 may further include information identifying the attendant or other employee at the identified product/service department 26, e.g., in the form of the attendant's name and/or photograph, which will assist the identified customer. In any case, upon subsequent transmission of customer message 4 to the customer's mobile communication device 16, the customer is thus notified upon arrival at the identified product/service department 26 of an order previously placed by the identified customer with the identified product/service department 26 that is now complete and ready for pick up.

Following step 918, the process 900 advances to step 920 where the processor 50 is illustratively operable to generate or retrieve from the message generation/management module 552 or other message database one or more messages, e.g., PSD message 4, to be transmitted to the electronic system or device 405 located in or associated with the product/service department which produced the identified item. The message "PSD message 4" illustratively includes information notifying personnel in the identified product/service department 26 that the identified customer, i.e., CUSTID, has arrived or is present at the identified product/service department 26 and has a completed order at the identified product/service department 26 that is ready for pick up. Upon subsequent transmission of PSD message 4 to the electronic system or device 405 located in or otherwise associated with the identified product/service department 26, one or more attendants or other employee(s) working in the identified product/service department are thereby notified of the identified customer's arrival at the identified product/service department 26. In some implementations, this notification may, for example, may alert one or more attendants or other employees of the identified product/service department 26 to perform one or more operations to ready the ordered item(s) for pickup and/or to greet the identified customer in or at the identified product/service department 26. The process 900 advances from step 920, in some embodiments, to step 824.

If, at step 906, the processor 50 determines that the item order identified at step 904 is not Complete, the process 900 advances, in some embodiments in which not Complete means Incomplete, to step 908 where the processor 50 is illustratively operable to compare the current time and date, CTD, with a pick up time and/or date, PTD identifier stored in a PTD field of the PSD order record as described above with respect to step 808 of the process 800. If, at step 908, the processor 50 determines that CTD is less than PTD, then the scheduled date and/or time of customer pick up, or scheduled data and/or time beyond which the customer may pick up, the ordered item(s) has not yet arrived, and the process 900 follows the "YES" branch of step 908 and advances to step 922. Otherwise, the process 900 advances, in some embodiments, to step 910.

If the process 900 arrives at step 910, the processor 50 has determined that the identified product/service department 26 was unable to complete, i.e., fulfill, the identified order for the identified customer by the scheduled pick up date and/or time, and the processor 50 is illustratively operable at step 910 to determine whether the processor 50 has provided a virtual discount coupon, VDC, to the identified customer during the customer's current visit to the brick-and-mortar store, e.g., as part of the process 800 in embodiments which include both of the processes 800 and 900. If so, the process 900 advances, in some embodiments, to step 824. Otherwise, the process 900 illustratively advances in some such embodiments to step 912 where the processor 50 is operable to generate or retrieve from the VDC module 550 a virtual discount coupon (VDC). In some embodiments, the processor 50 is illustratively operable at step 912 to generate VDC, e.g., pursuant to instructions stored in the VDC module 550, by retrieving a virtual discount coupon from the virtual discount coupon database 510, and in other embodiments the processor 50 may be operable to generate VDC, e.g., pursuant to instructions stored in the VDC module 550, from or based on any of one or more different parameters, examples of which may include, but are not limited to, the customer's purchase history stored in the customer purchase history database 508, one or more products currently in inventory and identifiable as such in the product/service and pricing data 506, one or more such products currently in excess, one or more seasonal products in inventory, one or more overstocked products, one or more products or services included in one or more promotions, and the like.

Following step 912, the process 900 illustratively advances to step 914 where the processor 50 is illustratively operable to generate or retrieve from the message generation/management module 552 or other message database one or more messages, e.g., customer message 2 described above, to be transmitted to the mobile communication device 16 of the identified customer. Thereafter at step 916, the processor 50 is illustratively operable to generate or retrieve from the message generation/management module 552 or other message database one or more messages, e.g., PSD message 3 described above, to be transmitted to the electronic system or device 405 located in or associated with the product/service department which produced the identified item.

In some embodiments, the process 900 may include step 824 described above with respect to the process 800 illustrated in FIG. 8, and in other embodiments step 824 may be omitted from the process 900. Accordingly, step 824 is depicted in FIG. 9 in dashed-line to represent that step 824 may be optional. In embodiments which include step 824, the process 900 advances to step 824 from step 916, from step 920, and the "YES" branch of step 910. In such embodiments which include step 824, the processor 50 is illustratively operable to execute steps 826 and 828 as described above with respect to the process 800 illustrated in FIG. 8. Following step 828 in embodiments which include step 824, and following step 916 and the "YES" branch of step 908 in embodiments of the process 900 which do not include step 824, the process 900 advances to step 922 to determine whether the identified customer has any additional pending orders, e.g., using the same process(es) described above with respect to step 904. If so, the process 900 loops back to step 906, and otherwise the process 900 is complete, as it is following the "NO" branch of step 904, and the process 900 then returns to step 720 of the process 700 illustrated in FIG. 7.

System Components—Embodiment 2

Referring now to FIG. 10, an embodiment of the system 10 of FIG. 1 is shown in which one of the product/service departments 26₁-26ₙ illustrated in FIG. 1 is implemented in the form of a curb-side delivery service at one (or more) of the brick-and-mortar stores 25 of the retail enterprise 11. The embodiment illustrated in FIG. 10 includes some of the components illustrated in FIG. 1, and detailed descriptions of such components will be omitted here for brevity. For example, the embodiment shown in FIG. 10 illustratively includes one of the local hub servers 22 associated with one of the brick-and-mortar stores 25 communicatively coupled to one or more of the wireless signal broadcasting devices 28₁-28ₚ (a subset 28₁-28₄ of such wireless signal broadcasting devices 28₁-28ₚ is illustrated in FIG. 10), communicatively coupled to the private network 20 and communicatively coupled to one of the product/service departments implemented in the form of a curb-side delivery service department 26. In embodiments which include the main server 12, the private network 20 is communicatively coupled to the main server 12 as shown and described with respect to FIG. 1. In other embodiments which do not include the local hub server 22 as described above, the main server 12 may be communicatively coupled, via the private network 20, directly to the components illustrated in FIG. 10 as being coupled to the local hub server 22.

The curb-side delivery service department 26 may include any one or combination of the components illustrated and described above with respect to FIG. 4. As illustrated in FIG. 10, for example, the curb-side delivery service department illustratively includes one or more display monitors 420. The curb-side delivery service department 26 may further include one or more intercom systems 421, one or more telephones 423 and/or one or more point-of-sale systems 24. The one or more point-of-sale systems 24 may illustratively include one or any combination of the components illustrated and described above with respect to FIG. 2. The curb-side delivery service department 26 may alternatively or additionally include any additional one or more of the components illustrated and described above with respect to FIG. 4.

In the embodiment illustrated in FIG. 10, the brick-and-mortar store 25 includes at least one entrance/exit door 25A, e.g., adjacent to or near the curb-side delivery service department 26, to/from a drive-through, ordered item delivery area 1000 located outside of, and illustratively adjacent to, the brick-and-mortar store 25. The drive-through, ordered item delivery area 1000 illustratively includes a drive-through lane 1002 accessible by conventional motor vehicles 1004, and an associated item delivery area 1006 positioned between the drive-through lane 1002 and the brick-and-mortar store 25. At least one entrance/exit door 25A is positioned to provide access by store employees to and between the curb-side delivery service department 26 and the item delivery area 1006. It will be understood that the drive-through, ordered item delivery area 1000 may include any number of drive-through lanes and associated item delivery areas, and one additional such drive-through lane 1002' and associated item delivery area 1006' are illustrated in FIG. 10 by dashed-line representation as being positioned adjacent to the drive-through lane 1002 such that the drive-through lane 1002' and associated item delivery area 1006' are positioned in parallel with the drive-through lane 1002 and associated item delivery area 1006 and with the drive-through lane 1002 and associated item delivery area 1006 located between the brick-and-mortar store 25 and the drive-through lane 1002' and associated item delivery area 1006'. Other non-parallel configurations of multiple such drive-through lanes and associated item delivery areas will occur to those skilled in the art, and it will be understood that any such non-parallel configurations are contemplated by this disclosure.

One or more waiting areas 1018 may located adjacent to the brick-and-mortar store 25 and/or the drive-through, ordered item delivery area 1000. The one or more waiting areas 1018 illustratively include(s) at least one parking location sized to accommodate a motor vehicle 1004. Customers awaiting delivery of one or more ordered items may park their motor vehicle 1004 at any such parking location, and a curb-side delivery service department employee may deliver the customer's one or more ordered items to the customer's motor vehicle 1004 at the parking location of the waiting area 1018 when the customer's one or more ordered items are ready for delivery. In some embodiments, the waiting area 1018 may be used to divert customers having large and/or incomplete orders from the drive-through lane 1002 (and/or drive-through lane 1002') in order to free up the drive-through lane 1002 and associated item delivery area 1006 (and/or the drive-through lane 1002' and the associated item delivery area 1006') for the service of other customers in the drive-through lane 1002 queue, e.g., the customer in the motor vehicle 1004'. In other embodiments, the waiting area 1008 may be used for all deliveries of ordered items by the curb-side delivery service department 26 to customers waiting in their motor vehicles.

In any case, the drive-through lane(s) 1002 and associated item delivery area(s) 1006 may be sized to accommodate any number of curb-side item delivery locations, and in the embodiment illustrated in FIG. 10 the drive-through lanes 1002 and 1002' and associated item delivery areas 1006 and 1006' respectively are sized to accommodate two such item curb-side, item delivery locations CS1 and CS2. At least one of the curb-side item delivery locations in each of the one or more item delivery areas illustratively includes at least one conventional call-box that is communicatively coupled to the local hub server 22 (or to a processor 400 in the curb-side delivery service department 26 or directly to the main server 12. In the embodiment illustrated in FIG. 10, for example, one such call-box 1008 is located adjacent to, connected to or integral with the wireless signal broadcasting device $28_1$ at the curb-side item delivery location CS1, which is the first curb-side item delivery location in the item delivery location 1006 queue associated with the drive-through lane 1002. In embodiments which include the drive-through lane 1002', as shown by dashed-line representation in FIG. 10, a call-box 1008' may likewise be located adjacent to, connected to or integral with the wireless signal broadcasting device $28_3$ at the curb-side item delivery location CS3. It will be understood, however, that one or more such call-boxes may be alternatively or additionally located at or adjacent to any of the one or more curb-side delivery locations defined in any of the one or more item delivery locations.

In some embodiments which include one or more curb-side delivery service departments 26, the mobile communication devices 16 illustratively operate as described hereinabove with respect to FIGS. 1-9 to wirelessly detect/receive signals broadcast by one or more of the wireless signal broadcasting devices $28_1$-$28_P$, 424 and to communicate with the main server 12, local hub server 22 and/or product/server department 26. Alternatively or additionally, any motor vehicle 1004 used to transport a customer through a drive-through lane 1002, 1002' may include an on-board communication device 1010, and any such communication device 1010 may be configured to operate as the mobile communication devices 16 described hereinabove to wirelessly detect/receive signals broadcast by one or more of the wireless signal broadcasting devices $28_1$-$28_P$, 44 and to communicate with the main server 12, local hub server 22 and/or product/server department 26. For purposes of the curb-side delivery service department(s), the term "mobile communication device" may thus refer to a mobile communication device 16 carried by a customer and/or a mobile communication device 1010 carried by a motor vehicle 1004, and operation of such a mobile communication device as described herein may be accomplished with either or both of a mobile communication device 16 and a mobile communication device 1010.

In embodiments which include at least one call-box 1008, such a call-box illustratively includes conventional intercom components, e.g., microphone, speaker, etc., and is configured to provide for intercom communications with the intercom system 421 located in or at the curb-side delivery service department 26. Such intercom components may illustratively be manually actuatable, e.g., via a push-button or other such mechanism located on or adjacent to the call-box 1008, or may alternatively be automated such that the occupant of a vehicle 1010 may communicate directly with an employee of the curb-side delivery service department 26 via the call-box 1008 without actuating any mechanism associated with the call-box 1008. In other embodiments which include at least one call-box 1008, such a call-box may alternatively include more sophisticated communication and/or non-communication functions, examples of which may include, but are not limited to, any one or combination of a paging function, a payment transport function, e.g., to transport a credit card or cash to/from the curb-side delivery service department 26 for payment of curb-side delivered items purchased from the retail store 25, a payment interface, e.g., similar or identical to the payment interface 214 and/or 416 described above, local-area wireless communication capability for establishing wireless communications between the call-box 1008 and one of the mobile communication devices 16 and/or 1010, a display monitor to display items for purchase, payment transaction(s), images and/or real-time video-streaming of one or more curb-side delivery service department employees, and/or the like.

In the embodiment illustrated in FIG. 10, one or more of the brick-and-mortar store employees may have and carry an employee mobile communication device 1012 which may be used to communicate with customers having one or more ordered items, i.e., via the customer's mobile communication device 16 and/or 1010. In such embodiments, the employee mobile communication device(s) may be configured to access the public network 14 via a conventional local area network, e.g., WiFi network 1014. It will be understood that one or more such employee mobile communication devices 1012 may alternatively or additionally be used to communicate with customers having one or more ordered items via the customer's mobile communication device 16 in any of the embodiments illustrated and described with respect to FIGS. 1-9.

In one example embodiment, the drive-through lane 1002 and associated item delivery area 1006 (and/or the drive-through lane 1002' and associated item delivery area 1006') includes a single curb-side delivery location CS1 (and/or CS3), and in such embodiments the mobile communication device 16 and/or 1010 in the motor vehicle 1004, the wireless signal broadcasting device $28_1$ and the main server 12 are all operable as described hereinabove with respect to steps 702-722 of FIG. 7 to notify the main server 12 of the identity of the customer in the motor vehicle 1004 presently located at the curb-side delivery location CS1 (and/or CS3). In other embodiments, the drive-through lane 1002 and associated item delivery area 1006 (and/or the drive-through lane 1002' and associated item delivery area 1006') includes multiple curb-side delivery locations, e.g., CS1 and CS2 (and/or CS3 and CS4). In such embodiments, the mobile communication device 16 and/or 1010 in the motor vehicle 1004, the wireless signal broadcasting device $28_1$ and the main server 12 are all operable as described hereinabove with respect to steps 702-722 of FIG. 7 to notify the main server 12 of the identity of the customer in the motor vehicle 1004 presently located at the curb-side delivery location CS1 (and/or CS3) as well as the identities of customers in motor vehicles located at the other curb-side delivery locations, e.g., the identity of the customer in the motor vehicle 1004' presently located at the curb-side delivery location CS2. In some such embodiments, the curb-side delivery service department 26 may be configured and operable to simultaneously, i.e., in parallel, process and carry out delivery of ordered items to the motor vehicles of all such customers identified at any of the multiple curb-side delivery locations. In other embodiments, the curb-side delivery service department 26 may be configured and operable to process and carry out delivery of ordered items only to the customer in the motor vehicle identified at the first curb-side delivery location in the queue, e.g., CS1 and/or CS3. In such embodiments, identification of the customers at any of the remaining multiple curb-side delivery locations may be used by the curb-side delivery service department 26 to provide the curb-side delivery department 26 with some amount of time in which to prepare ordered items for subsequent delivery to such customers as they advance in the drive-through lane 1002 (and/or 1002') queue to the first curb-side delivery location, e.g., CS1 and/or CS3.

In some embodiments, the ordered item processing module 542 and/or the server database 502 may include geofence data which illustratively includes geographic coordinates defining (a) geofence(s) about one or more of the brick-and-mortar stores 25. An example of one such geofence 1016 is illustrated in FIG. 10 as surrounding the perimeter of the brick-and-mortar store 25. In some embodiments, such a geofence 1016 may define geographic coordinates surrounding, or at least partially surrounding, the perimeter of a combination of the brick-and-mortar store 25 and its co-located parking and/or vehicle entrance area(s). In other embodiments, the geofence 1016 may define geographic coordinates surrounding, or at least partially surrounding, only the perimeter of a combination of the brick-and-mortar store 25 and its co-located drive-through, ordered item delivery area 1000. In still other embodiments, the geofence 1016 may define geographic coordinates surrounding, or at least partially surrounding, only the perimeter of the drive-through, ordered item delivery area 1000. In any such embodiment(s), the ordered item (OI) application 310 and/or any other mobile application installed on a customer's mobile communication device 16 and/or 1010 for any other of multiple enterprise membership services hosted and managed by the main server 12, may include a location services feature which, if previously consented to by the user of the mobile communication device 16 and/If 1010, allows tracking of the geographic location of the mobile communication device 16 and/or 1010. In such embodiments, the main server 12 is illustratively operable to monitor the location of any such mobile communication device 16 and/or 1010, and determine when the mobile communication device 16 and/or 1010 has crossed the geofence 1016. An example process 1100 for identifying customers at brick-and-mortar stores 25 of the retail enterprise 11 that have crossed the geofence 1016 is illustrated in FIG. 11.

One or more additional position identification devices $28_F$-$28_G$ may be implemented in various additional areas 1020 about the store 25, e.g., in one or more customer parking areas, one or more lanes leading to the ordered item delivery area 1000, etc., as illustrated in FIG. 10. In some embodiments, in addition to or alternatively to one or more of the position identification devices $28_1$-$28_P$ implemented in the ordered item delivery area 1000 and/or one or more additional areas about the store 25, one or more cameras, e.g., 1022 and 1022', may be implemented in the ordered item delivery area 1000 and/or in one or more additional areas 1020, and such one or more cameras, e.g., 1022, 1022', is/are illustratively coupled to the local hub server 22, or coupled directly to the main server 12, for providing images and/or video of customer traffic in the ordered item delivery area 1000 and/or the one or more additional areas 1020. In some alternative embodiments, the one or more cameras, e.g., 1022, 1022', may not be coupled to the local hub server 22 or the main server 12, but may instead be configured to wirelessly transmit images and/or video to the local hub server 22 and/or to the main server 12.

Customer Identification Process—Embodiment 2

As indicated by the framework of the process 1100 illustrated in FIG. 11, a portion of the process 1100, i.e., the portion to the left of the central vertical line and centered under the heading "MCD," illustratively represents one or more software applications executed by the processor 300 of a customer's mobile communication device 16 (or 1010), i.e., one of the mobile communication devices $16_1$-$16_J$ (or 1010) associated with a customer which has one or more pending orders for one or more items in one or more of the product/service departments $26_1$-$26_N$ of one of the brick-and-mortar stores $25_1$-$25_L$ of the retail enterprise 11. In one embodiment, this portion of the process 1100 is or includes the ordered item (OI) application module 310 stored in the memory 304 (and/or data storage 306) of the customer's mobile communication device 16, 1010 (see FIG. 3A) in the form of instructions executable by the processor 300 of the customer's mobile communication device 16, 1010. The process steps of this portion of the process 1100 will be described below for purposes of this disclosure as being executed by the processor 300 of the customer's mobile communication device 16 1010.

Another portion of the process 1100, i.e., the portion to the right of the central vertical line in FIG. 11, and centered under the heading "Main Server," illustratively represents one or more software applications executed by the processor 50 of the main server 12. In one embodiment, this portion of the process 1100 is or includes one or more of the modules, e.g., the ordered item processing module 542, stored in the Ordered Item Notification Module 540 (see FIG. 5) in the form of instructions executable by the processor 50 of the main server 12. The process steps of this portion of the process 1100 will be described below for purposes of this disclosure as being executed by the processor 50 of the main server 12. In some alternate embodiments, e.g., that may or may not include a main server 12, this portion of the process 1100 may alternatively be stored in the memory 34 (and/or data storage 36) of one or more of the local servers $22_1$-$22_L$ in the form of instructions executable by the processor 30 of the one or more local servers $22_1$-$22_L$, stored in the memory 402 (and/or data storage 406) of one of the curb-side delivery service departments 26 within one or more of the brick-and-mortar enterprise stores or outlets $25_1$-$25_L$ in the form of instructions executable by a processor 400 associated with any such curb-side delivery service departments 26, and/or stored in a memory and executable by a processor of another system external to or supplemental to the system 10 illustrated FIG. 1. It will further be understood that portions of the process 1100 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the process 1100 illustrated in FIG. 11, the process 1100 begins at step 1102 where the processor 50 is illustratively operable to monitor the location(s) of the mobile communication device(s) $16_1$-$16_J$, 1010 which have the OI application 310 installed thereon and in which the location services feature thereof (and/or of any other mobile application installed on such a mobile communication device $16_1$-$16_J$, 1010 for any other of multiple enterprise membership services hosted and managed by the main server 12) has been activated, e.g., previously consented to, by the user of the mobile communication device $16_1$-$16_J$, 1010. Thereafter at step 1104, the processor 50 is operable to determine whether any such mobile communication device $16_1$-$16_J$, 1010 has crossed the geofence 1016 of any of the brick-and-mortar stores $25_1$-$25_L$ of the retail enterprise, e.g., by comparing the geolocation of any such mobile communication device $16_1$-$16_J$, 1010, e.g., based on geographic location coordinate data received by the global positioning system receiver 324 of the mobile communication device $16_1$-$16_J$, 1010 and transmitted to the main server 12 by the mobile communication device $16_1$-$16_J$, 1010, with the geofence data of the corresponding geofence 1016 stored in the main server 12. If not, the process 1100 loops back to step 1102, and if so the process 1100 advances to step 1106 where the processor 50 is illustratively operable to control the communication circuitry 58 to transmit a wake-up message to that mobile communication device $16_1$-$16_J$, 1010. Thereafter at step 1108, the communication circuitry 312 of the mobile communication device $16_1$-$16_J$, 1010 receives the wake-up message, and at step 1110 the processor 300 is responsive to the received wake-up message to activate the OI application 310. Thereafter at step 1112, the processor 300 is operable, e.g., pursuant to instructions executed as part of the activated OI application 310, to transmit one or more wireless signals to the main server 12, e.g., to control the communication circuitry 316 in the device $16_1$-$16_J$, 1010 to wirelessly transmit one or more signals to the main server 12 via the public network 14. The one or more wireless signals illustratively contain(s) an identification of the customer and/or of the customer's mobile communication device $16_1$-$16_J$, 1010. The identification of the customer may be, for example, the customer's EMSID and/or other customer identifier described above that is associated, e.g., in the customer account data 504, with the customer's mobile communication device 16 (or 1010). Alternatively or additionally, identification of the customer's mobile communication device $16_1$-$16_J$, 1010 may be, for example, the communication information (CI), e.g., cellular telephone number and/or other communication identifier, which identifies the customer's mobile communication device $16_1$-$16_J$, 1010 to the main server 12 for the purpose of communicating information from the main server 12 back to the customer's mobile communication device $16_1$-$16_J$, 1010.

Following step 1112, the main server 12 is operable at step 1114 to receive, e.g., via the communication circuitry 58, the one or more wireless signals transmitted by the customer's mobile communication device $16_1$-$16_J$, 1010 at step 1112, and the processor 50 of the main server 12 is thereafter operable at step 1114 to execute the curb-side delivery (CSD) process 724 described above with respect to FIG. 7.

In some embodiments, identification of customers having one or more ordered items deliverable via a curb-side delivery service department 26 of any of the brick-and-mortar stores $25_1$-$25_L$ is accomplished using only the wireless signal broadcasting devices, e.g., $28_1$-$28_4$ and/or $28_F$-$28_G$ illustrated in FIG. 10, e.g., as described hereinabove with respect to FIG. 7. In other embodiments, such customer identification may be accomplished using only geolocation data associated with customer mobile communication devices $16_1$-$16_J$, 1010, e.g., as described hereinabove with respect to FIG. 11. In still other embodiments, such customer identification may be accomplished using only images and/or video produced by the one or more cameras, e.g., 1022, 1022'. In still further embodiments, such customer identification may be accomplished using any combination of such devices, systems and/or techniques and/or any one or combination of devices, systems and/or techniques described hereinabove with respect to FIG. 7. It will be understood that identification of customers having one or more ordered items at any of the product/service departments $26_1$-$26_N$ may, for purposes of executing either of the processes illustrated and described with respect to FIGS. 8 and/or 9, be supplemented and/or alternatively accomplished using geolocation data associated with customer mobile communication devices $16_1$-$16_J$, 1010, e.g., as described hereinabove with respect to FIG. 11.

Curb-Side Delivery Process

Referring now to FIG. 12, a simplified flow diagram is shown of an embodiment 1200 of the curb-side delivery process 724 executed by the processor 50 of the main server 12 at step 724 of the process 700 (in embodiments that include the process 700 and that include step 724 of the process 700), and/or at step 724 of the process 1100 (in embodiments that include the process 1100). In one embodiment, the process 1200 is illustratively stored in the curb-side delivery processing module 554 of the ordered item notification module 540 in the form of instructions executable by the processor 50 of the main server 12, and the steps of the process 1200 will be described below for purposes of this disclosure as being executed by the processor 50 of the main server. In some alternate embodiments, e.g., that may or may not include a main server 12, the process 1200 may alternatively be stored in the memory 34 (and/or data storage 36) of one or more of the local servers $22_1$-$22_L$ in the form of instructions executable by the processor 30 of the one or more local servers $22_1$-$22_L$, stored in the memory 402 (and/or data storage 406) of an electronic system or device 405 associated with one or more one of the curb-side delivery service departments 26 within one or more of the brick-and-mortar enterprise stores $25_1$-$25_L$ in the form of instructions executable by a processor 400 associated with any such any such electronic system or device 405, and/or stored in a memory and executable by a processor of another system external to or supplemental to the system 10 illustrated FIG. 1. It will further be understood that the process 1200 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1200 begins at step 1202 where the processor 50 is illustratively operable to search product/service department (PSD) order records stored in the database 502 or other database to access any of one or more PSD order records associated in the database 502 or other database with the customer identifier CUSTID, i.e., to locate and access PSD records associated with the identified customer. Illustratively, the processor 50 is operable to execute step 1202 as described hereinabove with respect to step 802 of the process 800 illustrated in FIG. 8, and the one or more PSD order records stored in the database 502 or other database may illustratively have stored therein any one or combination of the items of information described above which relate to the customer and/or one or more items ordered by the customer for delivery thereto via the curb-side delivery service department 26. Those skilled in the art will recognize, however, that other embodiments of the one or more PSD order records may alternatively include more, fewer and/or other information items, and it will be understood that any such alternative embodiments of the one or more PSD records are contemplated by this disclosure.

The process 1200 advances from step 1202 to step 1204 where the processor 50 is illustratively operable to determine whether the identified customer has any pending orders at the curb-side delivery service department 26 of the brick-and-mortar store 25 at which the identified customer is currently located illustratively as described above with respect to steps 804 and 904 of the processes 800 and 900 respectively. In embodiments in which the process 1200 is executed because the processor 50 has previously determined that the wireless signal broadcasting device $28_1$-$28_P$ whose wireless identification signal(s) was/were detected by the customer's mobile communication device 16, 1010 at step 704 is a CSD wireless signal broadcasting device, for example, the processor 50 has previously also determined the identity and location of the corresponding wireless signal broadcasting device as well as the identity and location of the brick-and-mortar store 25 at which the customer is currently located and the identity and location of the curb-side delivery service department 26 at the identified store 25, as described above with respect to the process 700 of FIG. 7. In embodiments in which the process 1200 is executed because the processor 50 has previously determined that the identified customer's mobile communication device 16, 1010 crossed the geofence 1016, as another example, the processor 50 has likewise also determined from the geofence data the identity and location of the brick-and-mortar store 25 at which the customer is currently located and the identity and location of the curb-side delivery service department 26 at the identified store 25, as described above with respect to the process 1100 of FIG. 11. In one embodiment, the processor 50 is illustratively operable to execute step 1204 by first determining whether the identified customer has any orders that the customer has not already picked up, e.g., by checking the order status, OS, field of each accessed PSD record associated with CUSTID. If the processor 50 determines at step 1204 that the customer has at least one order pending that the customer has not already picked up, e.g., if order status field, OS, of at least one record is Incomplete or Complete (but not yet picked up), this indicates that the identified customer has at least one pending order at the identified curb-side delivery service department 26. Otherwise the process 1200 follows the "NO" branch of step 1204 and returns to step 724 of the process 700 illustrated in FIG. 7. Those skilled in the art will recognize other techniques for determining at step 1204 whether a customer has a pending order at the curb-side delivery service department 26 at or near which the identified customer is currently located using more, fewer and/or different ones of any one or combination of the different data components of the PSD order records described above by example, or additionally or alternatively using one or more other data components not described above by example but which may relate to the identified customer, the identified brick-and-mortar store, one or more product/service departments within the identified brick-and-mortar store and/or one or more details relating to the item(s) ordered, and which therefore be included in one or more PSD order records, and it will be understood that any such other techniques using any such additional, alternative or other data components are contemplated by this disclosure.

Following a determination by the processor 50 at step 1204 that the identified customer has at least one pending order at the curb-side delivery service department 26 of the identified brick-and-mortar store 25 at which the customer is currently located, the process 1200 advances to step 1206 where the processor 50 is illustratively operable to determine whether one or more of the customer's pending orders at the curb-side delivery service department 26 within the identified brick-and-mortar store 25 is Complete. In the example described above, the PSD order records may illustratively include an order status (OS) field which reflects the current status of a particular order. The processor 50 is illustratively operable at step 1206 to determine whether one or more of the customer's pending orders at the curb-side delivery service department 26 within the identified brick-and-mortar store 25 is Complete in such embodiments by comparing the status indicator in the OS field with a list of possible status indicators, e.g., Complete (but not yet picked up) and Incomplete.

If the processor 50 determines, at step 1206, that the item order identified at step 1204 is Complete, the process 1200 advances to step 1208 where the processor 50 is illustratively operable to generate or retrieve from the message generation/management module 552 or other message database one or more messages, e.g., PSD message 5, to be transmitted to the electronic system or device 405 located in or associated with the identified curb-side delivery service department 26. In embodiments in which the drive-through, ordered item delivery area 1000 includes a single wireless signal broadcasting device, e.g., $28_1$, and the process 1200 is executed because the processor 50 has previously determined that the wireless signal broadcasting device $28_1$ whose wireless identification signal(s) was/were detected by the customer's mobile communication device 16, 1010 at step 704 is a CSD wireless signal broadcasting device, the message "PSD message 5" illustratively includes information notifying the identified curb-side delivery service department 26 that the identified customer, i.e., CUSTID, has arrived at the curb-side, item delivery location CS1 and is awaiting delivery of a completed order. Upon subsequent transmission of PSD message 5 to the electronic system or device 405 located in or otherwise associated with the identified curb-side delivery service department 26, one or more attendants or other employee(s) working in the identified curb-side delivery service department 26 are thereby notified of the identified customer's arrival at the curb-side, item delivery location CS1, and respond by delivering to the customer at CS1 the one or more items ordered by the customer for curb-side delivery.

In other embodiments in which the drive-through, ordered item delivery area 1000 includes multiple wireless signal broadcasting devices, and the process 1200 is executed because the processor 50 has previously determined that the wireless signal broadcasting device $28_1$-$28_P$ whose wireless identification signal(s) was/were detected by the customer's mobile communication device 16, 1010 at step 704 is a CSD wireless signal broadcasting device, the message "PSD message 5" illustratively includes information notifying the identified curb-side delivery service department 26 that the identified customer, i.e., CUSTID, having a completed order has arrived at the curb-side, item delivery location CS1-CSN identified using information contained in the detected wireless identification signal(s). Upon subsequent transmission of PSD message 5 to the electronic system or device 405 located in or otherwise associated with the identified curb-side delivery service department 26, one or more attendants or other employee(s) working in the identified curb-side delivery service department 26 are thereby notified of the identified customer's arrival at the identified curb-side, item delivery location. In embodiments in which the identified curb-side, item delivery location is one to which the curb-side delivery service department 26 typically delivers ordered items, one or more attendants or other employee(s) working in the identified curb-side delivery service department 26 may then proceed to deliver the one or more items ordered by the identified customer to that customer presently located at the identified curb-side, item delivery location. In embodiments in which the identified curb-side, item delivery location is one to which the curb-side delivery service department 26 typically does not deliver ordered items but is rather provided for the purpose of identifying one or more customers presently located in the curb-side delivery queue but not yet advanced in the queue to a curb-side, item delivery location to which the curb-side delivery service department 26 delivers ordered items, one or more attendants or other employee(s) working in the identified product/service department are thereby notified in advance, e.g., from a few seconds to several minutes or more, of the identified customer's arrival at the identified curb-side, item delivery location. In some implementations, this advance notification may, for example, provide sufficient time for one or more attendants or other employees of the identified curb-side delivery service department 26 to perform one or more operations in preparation for subsequent delivery of the ordered item(s) to the identified customer.

In embodiments in which the drive-through, ordered item delivery area 1000 may or may not include one or more wireless signal broadcasting devices and in which the process 1200 is executed because the processor 50 has previously determined that the identified mobile communication device 16, 1010 has crossed an identified geofence 1016, the message "PSD message 5" illustratively includes information notifying the identified curb-side delivery service department 26 that the identified customer, i.e., CUSTID, having a completed order has arrived at the brick-and-mortar store 25 and/or at the drive-through, ordered item delivery area 1000, depending upon where the boundary of the geofence 1016 is defined. Upon subsequent transmission of PSD message 5 to the electronic system or device 405 located in or otherwise associated with the identified curb-side delivery service department 26, one or more attendants or other employee(s) working in the identified curb-side delivery service department 26 are thereby notified of the identified customer's arrival at the identified store 25 and/or its drive-through, ordered item delivery area 1000. In some implementations, suitable positioning of the geofence 1016 may provide advance notification of the identified customer's arrival at one or more of the curb-side, item delivery locations and, as described above, may provide sufficient time for one or more attendants or other employees of the identified curb-side delivery service department 26 to perform one or more operations in preparation for subsequent delivery of the ordered item(s) to the identified customer.

Figure 13:
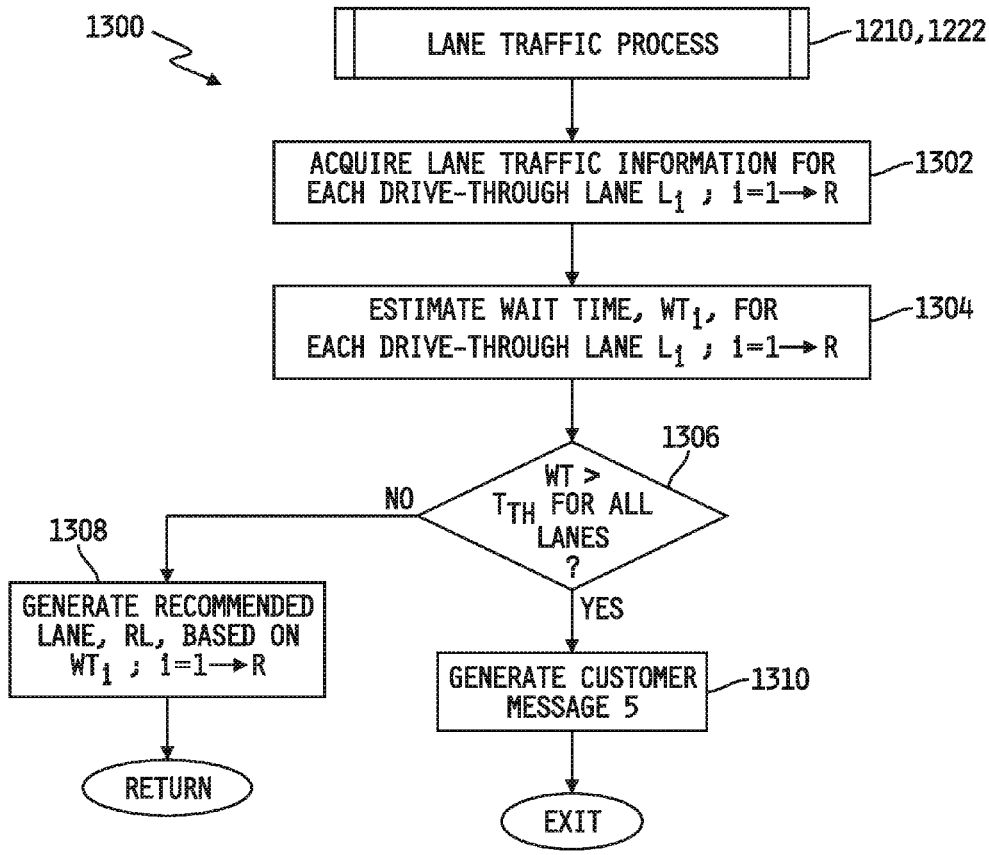
FIG. 13 is a simplified flow diagram of an embodiment of the lane traffic process executed as part of the process illustrated in FIG. 12.

In some embodiments, the process 1200 may include a step 1210, and in other embodiments step 1210 may be omitted. Accordingly, step 1210 is depicted in FIG. 12 in dashed-line to represent that step 1210 may be optional. In embodiments which include step 1210, the process 1200 advances to step 1210 from step 1208, and the processor 50 is illustratively operable at step 1210 to execute a lane traffic process. An example embodiment of the lane traffic process executed at step 1210 is illustrated in FIG. 13 and will be described in detail hereinafter. Following step 1210, or following step 1208 in embodiments which do not include step 1210, the process 1200 advances to step 1212 where the processor 50 is illustratively operable to generate or retrieve from the message generation/management module 552 or other message database or more messages, e.g., Customer message 6, to be transmitted to the mobile communication device 16, 1010 of the identified customer. In embodiments in which the drive-through, ordered item delivery area 1000 includes a single wireless signal broadcasting device, e.g., $28_1$, and the process 1200 is executed because the processor 50 has previously determined that the wireless signal broadcasting device $28_1$ whose wireless identification signal(s) was/were detected by the customer's mobile communication device 16, 1010 at step 704 is a CSD wireless signal broadcasting device, the message "Customer message 6" illustratively includes information notifying the identified customer that delivery to the customer of the one or more items ordered by the customer is underway. In other embodiments in which the drive-through, ordered item delivery area 1000 includes multiple wireless signal broadcasting devices, and the process 1200 is executed because the processor 50 has previously determined that the wireless signal broadcasting device $28_1$-$28_P$ whose wireless identification signal(s) was/were detected by the customer's mobile communication device 16, 1010 at step 704 is a CSD wireless signal broadcasting device, the message "customer message 6" illustratively includes information notifying the customer of a completed order that is ready for delivery to the customer at the identified curb-side delivery service department 26. If the identified curb-side, item delivery location is one to which the curb-side delivery service department 26 typically delivers ordered items, the message "customer message 6" further illustratively includes information notifying the identified customer that delivery to the customer of the one or more items ordered by the customer is underway. If the identified curb-side, item delivery location is one to which the curb-side delivery service department 26 typically does not deliver ordered items but is rather provided for the purpose of identifying one or more customers presently located in the curb-side delivery queue but not yet advanced in the queue to a curb-side, item delivery location to which the curb-side delivery service department 26 delivers ordered items, the message "customer message 6" further illustratively includes information notifying the identified customer that the one or more items ordered by the customer will be delivered to the customer when the customer advances in the drive-through queue to a curb-side, item delivery location to which the curb-side delivery service department delivers ordered items. In still other embodiments in which the drive-through, ordered item delivery area 1000 may or may not include one or more wireless signal broadcasting devices and in which the process 1200 is executed because the processor 50 has previously determined that the identified mobile communication device 16, 1010 has crossed an identified geofence 1016, the message "customer message 6" illustratively includes information notifying the identified customer of a completed order that is ready for delivery to the customer at the identified curb-side delivery service department 26. In some embodiments, the message "customer message 6" may further include information instructing the identified customer to proceed to the drive-through, ordered item delivery area 1000 and/or to a specified curb-side, item delivery location. In still further embodiments, the message "customer message 6" may further include lane recommendation information in embodiments which include step 1210. In any case, following step 1212 the process 12 returns to step 724 of the process 700 illustrated in FIG. 7.

If, at step 1206, the processor 50 determines that the item order identified at step 1204 is not Complete, the process 1200 advances, in some embodiments in which not Complete means Incomplete, to step 1214. In the example described above, the PSD order records may illustratively include a pickup time and/or date identifier (PTD) field which has stored therein a scheduled calendar date, and in some embodiments also a time of day, at which the identified customer is to pick up the ordered item(s) and/or at or after which the ordered item(s) are to be available for customer pick up. In some such embodiments, the customer may specify the PTD identifier and in other embodiments an attendant or other employee of the curb-side delivery service department 26 (or other employee of the brick-and-mortar store 25 or retail enterprise 11) may do so. In still other embodiments, the processor 50 may automatically populate the PTD field based on a typical, average or other predefined time required by the curb-side delivery service department 26 to fulfill the order from the time of the order, e.g., the OCT time described above. In any case, in some such embodiments in which the PSD order records include the PTD field, the process 1200 illustratively includes step 1214, and the processor 50 is operable at step 1214 to compare the current time and date, CTD, with the PTD identifier stored in the PTD field of the PSD order record. If the CTD is less than PTD, then the scheduled date and/or time of customer arrival at the drive-through, ordered item delivery area 100 to have the one or more items ordered by the customer delivered thereto has not yet arrived, and the process 1200 follows the "YES" branch of step 1214 returns to step 724 of the process 700 illustrated in FIG. 7. Otherwise, the process 1200 advances, in some such embodiments, to step 1216.

In the example described above, the PSD order records may illustratively include an order completion time (OCT) field which has stored therein a typical, average or other predefined time required by the curb-side delivery service department 26 to fulfill a customer order, e.g., by collecting and bagging or otherwise packaging the one or more ordered item(s) for subsequent delivery to the customer at the drive-through, ordered item delivery area 1000, from the time of the order. In some such embodiments, the OCT field may be populated by an attendant or other employee of the curb-side delivery service department 26 (or other employee of the brick-and-mortar store 25 or retail enterprise 11), and in other embodiments the OCT field may be automatically populated by the processor 50 based on stored OCT times for previously fulfilled orders of like item(s), total number of items ordered, type(s) of items ordered, category(s) of items ordered, or the like.

In any case, in some embodiments in which the PSD order records include the OCT field, the process 1200 may illustratively include step 1216 as shown by dashed-line representation in FIG. 12. Illustratively, step 1216 may be included in embodiments which include multiple wireless signal broadcasting devices 28$_1$-28$_P$ and in which the process 1200 is executed because the processor 50 has previously determined that the identified mobile communication device 16, 1010 is located at one or more of the associated curb-side, item delivery locations is/are one(s) to which the curb-side delivery service department 26 typically does not deliver ordered items as described above, and/or in embodiments in which the drive-through, ordered item delivery area 1000 may or may not include one or more wireless signal broadcasting devices and in which the process 1200 is executed because the processor 50 has previously determined that the identified mobile communication device 16, 1010 has crossed an identified geofence 1016. In other embodiments, step 1216 may be omitted.

In embodiments of the process 1200 which include step 1216, the processor 50 is operable at step 1218 to compare the order completion time stored in the OCT field with a time value, T. In some embodiments, the time value T is an estimated or measured, typical or average, time that it takes a typical customer to travel from the present location of the customer, e.g., the location at or near which a wireless signal broadcasting device is located which was detected by the customer's mobile communication device 16, 1010 at step 704 of the process 700 illustrate in FIG. 7 or the location at which the customer's mobile communication device 16, 1010 crosses the geofence 1016, to a, or the, curb-side, item delivery location to which the curb-side delivery service department 26 typically delivers ordered items. In any case, if the processor 50 determines at step 1218 that OCT is less than or equal to the time value T, this means that the order completion time, OCT, is less than the travel time, T, of the identified customer described above and the process 1200 illustratively advances to step 1220 where the processor 50 is operable to generate or retrieve from the message generation/management module 552 or other message database one or more messages, e.g., PSD message 6, to be transmitted to the electronic system or device 405 located in or associated with the curb-side delivery service department 26.

In embodiments in which the drive-through, ordered item delivery area 1000 includes multiple wireless signal broadcasting devices, and the process 1200 is executed because the processor 50 has previously determined that the wireless signal broadcasting device 28$_1$-28$_P$ whose wireless identification signal(s) was/were detected by the customer's mobile communication device 16, 1010 at step 704 is a CSD wireless signal broadcasting device and the identified curb-side, item delivery location is one to which the curb-side delivery service department 26 typically does not deliver ordered items, the message "PSD message 6" illustratively includes information notifying the identified curb-side delivery service department 26 that the identified customer, i.e., CUSTID, has arrived at the identified curb-side, item delivery location. In embodiments in which the drive-through, ordered item delivery area 1000 may or may not include one or more wireless signal broadcasting devices and in which the process 1200 is executed because the processor 50 has previously determined that the identified mobile communication device 16, 1010 has crossed an identified geofence 1016, the message "PSD message 6" illustratively includes information notifying the identified curb-side delivery service department 26 that the identified customer, i.e., CUSTID, has arrived at the brick-and-mortar store 25 and/or at the drive-through, ordered item delivery area 1000, depending upon where the boundary of the geofence 1016 is defined. In either case, upon subsequent transmission of PSD message 6 to the electronic system or device 405 located in or otherwise associated with the identified curb-side delivery service department 26, one or more attendants or other employee(s) working in the identified curb-side delivery service department 26 are thereby notified of the identified customer's arrival at the identified location in advance of the customer's arrival at a, or the, curb-side, item delivery location to which the curb-side delivery service department 26 delivers ordered items. In some implementations, this advance notification may provide sufficient time for one or more attendants or other employees of the identified curb-side delivery service department 26 to complete, i.e., fulfill, the identified customer's order before the identified customer reaches a, or the, curb-side, item delivery location to which the curb-side delivery service department 26 delivers ordered items.

In some embodiments, the process 1200 may include a step 1222, and in other embodiments step 1222 may be omitted. Accordingly, step 1222 is depicted in FIG. 12 in dashed-line to represent that step 1222 may be optional. In embodiments which include step 1222, the process 1200 advances to step 1222 from step 1220, and the processor 50 is illustratively operable at step 1222 to execute the lane traffic process, an example of which is illustrated in FIG. 13 and will be described in detail hereinafter. Following step 1222, or following step 1220 in embodiments which do not include step 1222, the process 1200 advances to step 1224 where the processor 50 is illustratively operable to generate or retrieve from the message generation/management module 552 or other message database one or more messages, e.g., customer message 7, to be transmitted to the customer's mobile communication device 16, 1010. In embodiments in which the drive-through, ordered item delivery area 1000 includes multiple wireless signal broadcasting devices, and the process 1200 is executed because the processor 50 has previously determined that the wireless signal broadcasting device $28_1$-$28_P$ whose wireless identification signal(s) was/were detected by the customer's mobile communication device 16, 1010 at step 704 is a CSD wireless signal broadcasting device and the identified curb-side, item delivery location is one to which the curb-side delivery service department 26 typically does not deliver ordered items, the message "customer message 7" illustratively includes information notifying the identified customer that the one or more items ordered by the customer will be delivered to the customer when the customer advances in the drive-through queue to a curb-side, item delivery location to which the curb-side delivery service department delivers ordered items. In other embodiments in which the drive-through, ordered item delivery area 1000 may or may not include one or more wireless signal broadcasting devices and in which the process 1200 is executed because the processor 50 has previously determined that the identified mobile communication device 16, 1010 has crossed an identified geofence 1016, the message "customer message 7" illustratively includes information notifying the identified customer that the one or more items ordered by the customer will be delivered to the customer when the customer advances to a curb-side, item delivery location to which the curb-side delivery service department 26 delivers ordered items. In some embodiments, the message "customer message 7" may further include information instructing the identified customer to proceed to the drive-through, ordered item delivery area 1000 and/or to a specified curb-side, item delivery location. In still further embodiments in which the process 1200 includes step 1222, the message "customer message 7" may further include recommended lane information. In any case, the process 1200 returns following step 1224 to step 724 of the process 700 illustrated in FIG. 7.

If, at step 1218, the processor 50 determines that OCT is greater than or equal to the time value T, this means that the order completion time, OCT, is greater than travel time, T described above, and the curb-side delivery service department 26 therefore will not have sufficient time to complete the pending order prior to arrival of the identified customer at a, or the, curb-side, item delivery location to which the curb-side delivery service department 26 delivers ordered items. In such cases, the process 1200 advances from the "NO" branch of step 1218, or from the "NO" branch of step 1214 in embodiments of the process 1200 that do not include step 1218, to step 1226 where the process 800 illustratively advances, in some such embodiments, where the processor 50 is operable to generate or retrieve from the VDC module 550 a virtual discount coupon (VDC). In some embodiments, the processor 50 is illustratively operable to generate VDC, e.g., pursuant to instructions stored in the VDC module 550, by retrieving a virtual discount coupon from the virtual discount coupon database 510, and in other embodiments the processor 50 may be operable to generate VDC, e.g., pursuant to instructions stored in the VDC module 550, from or based on any of one or more different parameters, examples of which may include, but are not limited to, the customer's purchase history stored in the customer purchase history database 508, one or more of the items in the customer' currently pending order, one or more products currently in inventory and identifiable as such in the product/service and pricing data 506, one or more such products currently in excess, one or more seasonal products in inventory, one or more overstocked products, one or more products or services included in one or more promotions, and the like.

Following step 1226, the process 1200 illustratively advances to step 1228 where the processor 50 is illustratively operable to generate or retrieve from the message generation/management module 552 or other message database one or more messages, e.g., "customer message 8", to be transmitted to the mobile communication device 16, 1010 of the identified customer, and thereafter at step 1230 the processor 50 is illustratively operable to generate or retrieve from the message generation/management module 552 or other message database one or more messages, e.g., "PSD message 7," to be transmitted to the electronic system or device 405 located in or associated with the curb-side delivery service department 26.

The message "customer message 8" illustratively includes information notifying the identified customer that the customer's pending order has not been completed and further illustratively includes information relating to the virtual discount coupon, VDC, generated at step 1226 or includes the VDC itself. In the former case, the processor 50 may be operable as part of step 1226 to transfer the generated VDC to the identified customer's clipped virtual discount coupon repository 512, in embodiments in which the identified customer has such a clipped virtual discount coupon repository 512. In the latter case, the VDC may be sent directly to the identified customer, as will be described below with reference to the remainder of the process 700 illustrated in FIG. 7, and in such cases the identified customer may transfer the received VDC to the customer's clipped virtual coupon repository 512 if the identified customer has such a clipped virtual coupon repository 512 and otherwise the identified customer may store the received VDC in the memory 304 or data storage 306 of the customer's mobile communication device 16 for subsequent redemption at a the retail enterprise 11.

If, at step 1228, the processor 50 has previously determined that the identified customer is presently located at a curb-side, item delivery location to which the curb-side delivery service department 26 delivers ordered items, e.g., CS1 (or CS3), the processor 50 has also determined at step 1206 that the identified customer's order is not complete and, in embodiments which include step 1216, has further determined at step 1218 that there is insufficient time to complete the order due to the customer's present location. In such cases, the message "customer message 8" may further illustratively include instructions to advance to the waiting area 1018 to await delivery of the customer's ordered item(s). Further in such cases, the message "PSD message 7" illustratively includes instructions to complete the identified customer's order and deliver the one or more items specified in the customer's order to the customer's motor vehicle at the waiting area 1018.

If, at step 1228, the processor 50 has previously determined that the identified customer is presently located at a curb-side, item delivery location to which the curb-side delivery service department 26 does not deliver ordered items, e.g., CS2 (or CS4), the processor 50 has determined at step 1206 that the identified customer's order is not complete and, in embodiments which include step 1216, has further determined at step 1218 that there is insufficient time to complete the order due to the customer's present location. In such cases, since the customer' motor vehicle is presently located in the drive-through lane 1002 (or 1002') and is therefore in the curb-side delivery queue, the message "customer message 8" may further illustratively include a notification that the curb-side delivery service department 26 is currently filling the customer's order and instructions to advance to a, or the, curb-side, item delivery location to which the curb-side delivery service department 26 delivers ordered items. In such cases, instructions to advance to the waiting area 1018 may be provided to the customer only upon advancement to a, or the, curb-side, item delivery location to which the curb-side delivery service department 26 delivers ordered items. In other embodiments, the message "customer message 8" may not include any such additional notification and/or instructions. In any such case, the message "PSD message 7" illustratively includes instructions to complete the identified customer's order as soon as possible.

If, at step 1228, the processor 50 has previously determined that the identified customer has crossed the geofence 1016 but has not yet entered the drive-through, ordered item delivery area 1000, the processor 50 has determined at step 1206 that the identified customer's order is not complete and, in embodiments which include step 1216, has further determined at step 1218 that there is insufficient time to complete the order due to the customer's present location. In such cases, since the customer' motor vehicle has not yet entered the drive-through lane 1002 (or 1002') and is therefore not yet located in the curb-side delivery queue, the message "customer message 8" may further illustratively include a notification that the customer's order is not yet ready for delivery at the drive-through, ordered item delivery area 1000. Such notification may further illustratively include notification of various options, examples of which include, but are not limited to, proceed to the drive-through, ordered item delivery area 1000 and await completion and delivery of the customer's order by the curb-side delivery service department 26, await completion of the customer's order in the parking lot of the store 25, enter the store 25 and shop (in which case the processor 50 may re-execute step 1226 one or more times to provide the customer with one or more additional virtual discount coupons for one or more products and/or services offered by the retail enterprise 11 at the identified brick-and-mortar store 25, enter the store 25 (or adjacent or co-located fueling/convenience outlet controlled by or affiliated with the retail enterprise 11) for one or more complementary, i.e., free, drinks and/or food items, leave and come back later to receive delivery by the curb-side delivery service department 26 of the one or more items previously ordered by the customer, or the like.

In any such case, the processor 50 is illustratively operable to thereafter monitor the location of the customer's mobile communication device 16, 1010, e.g., relative to the geofence 1016 and/or relative to the geolocation of the store 25 and/or relative to the geolocation(s) of one or more sub-areas within or near the geofence 1016, and to supplement the message "customer message 8" with additional notification(s), instructions and/or virtual discount coupons depending upon which option the customer chooses as determined by the processor 50 by tracking subsequent travel and positioning of the customer's mobile communication device 16, 1010. For example, if the customer chooses to wait in the parking lot of the store 25 or leave and return later to take delivery by the curb-side delivery service department 26 of the one or more items previously ordered by the customer, the processor 50 may illustratively determine an amount of time required by the curb-side delivery service department 26 to fulfill the customer's order, e.g., using one or more of the techniques described hereinabove, and supplement the message "customer message 8" with an estimate of the subsequent time of day, and/or subsequent day, at which the customer's order will be ready for delivery to the customer at the drive-through, ordered item delivery area 1000.

The message "PSD message 7" likewise illustratively includes one or more notifications and/or instructions depending upon which option the customer chooses as determined by the processor 50 by tracking travel and positioning of the customer's mobile communication device 16, 1010 subsequent to transmission of the message "customer message 8" to the identified customer's mobile communication device 16, 1010. For example, if the customer chooses to wait in the parking lot of the store 25 or leave and return later to take delivery by the curb-side delivery service department 26 of the one or more items previously ordered by the customer, the message "PSD message 7" may illustratively include a notification of the customer's decision. In embodiments in which the processor 50 determines a subsequent amount of time required by the curb-side delivery service department 26 to fulfill the customer's order as just described, the message "PSD message 7" may include and/or be supplemented with, an estimate of the subsequent time of day, and/or subsequent day, by which the customer's order should be ready for delivery to the customer at the drive-through, ordered item delivery area 1000. In any case, following step 1230, the process 1200 returns to step 724 of the process 700 illustrated in FIG. 7.

Lane Traffic Process

Referring now to FIG. 13, a simplified flow diagram is shown of an embodiment 1300 of the lane traffic process executed by the processor 50 of the main server 12 at steps 1210 and 1222 of the process 1200 (in embodiments of the process 1200 that include step 1210 and/or step 1222). In one embodiment, the process 1300 is illustratively stored in the curb-side delivery processing module 554 in the form of instructions executable by the processor 50 of the main server 12, and the steps of the process 1300 will be described below for purposes of this disclosure as being executed by the processor 50 of the main server. In some alternate embodiments, e.g., that may or may not include a main server 12, the process 1300 may alternatively be stored in the memory 34 (and/or data storage 36) of one or more of the local servers $22_1$-$22_L$ in the form of instructions executable by the processor 30 of the one or more local servers $22_1$-$22_L$, stored in the memory 402 (and/or data storage 406) of an electronic system or device 405 associated with one or more one of the curb-side delivery service departments 26 within one or more of the brick-and-mortar enterprise stores $25_1$-

$25_L$ in the form of instructions executable by a processor 400 associated with any such any such electronic system or device 405, and/or stored in a memory and executable by a processor of another system external to or supplemental to the system 10 illustrated FIG. 1. It will further be understood that the process 1300 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1300 begins at step 1302 where the processor 50 is operable to acquire lane traffic information for each of the drive through lanes, $L_1$-$L_R$, where R may be any positive integer. The processor 50 is illustratively operable to execute step 1302 by acquiring information relating to the traffic in any one or more of the lanes $L_1$-$L_R$ from any of the systems and/or devices described hereinabove, and/or using any technique described hereinabove for identifying one or more customer mobile communication devices 16, 1010 and/or one or more customer motor vehicles 1004. Examples include, but are not limited to, one or more of the wireless signal broadcasting devices $26_1$-$26_N$, one or more cameras, e.g., 1022, 1022', one or more customer mobile communication devices 16, 1010, and the like. In any case, following step 1302 the process 1300 advances to step 1304 where the processor 50 is operable to estimate a wait time, $WT_i$, for each drive-through lane, $L_i$, i=1, R. Each wait time, $WT_i$, illustratively corresponds to an expected time between arrival of a customer vehicle 1004 at one of the drive-through lanes and curb-side delivery/pick-up of that customer's ordered items. Illustratively, the processor 50 is operable to execute step 1304 using any one or more conventional prediction techniques.

Following step 1304, the process 1300 advances to step 1306 where the processor 50 is operable to determine whether the wait time, $WT_i$ for each lane, i.e., for all lanes, is greater than a threshold time period, $T_{TH}$, where $T_{TH}$ may be any desired time period. In some embodiments, $T_{TH}$ is set to a time period beyond which customers will not be expected to wait in a drive-through lane for delivery of one or more ordered items. In any case, if the processor 50 determines at step 1306 that the wait time for one or more drive-through lanes is less than (or equal to) $T_{TH}$, the process 1300 advances to step 1308 where the processor 50 is operable to generate one or more recommended drive-through lanes, RL, based on the estimated wait times $WT_i$. Illustratively, the one or more recommended drive-through lanes, RL, will include one or more lanes for which $WT_i < T_{TH}$, and in some embodiments the processor 50 may be operable to sort the one or more recommended drive-through lanes, RL, based on increasing wait time duration. In any case, the process 1300 returns from step 1308 to the process 1200 illustrated in FIG. 12. If, at step 1306, the processor 50 determines that all wait times $WT_i$ are greater than $T_{TH}$, the process 1300 advances to step 1310 where the processor 50 is illustratively operable to generate or retrieve from the message generation/management module 552 or other message database one or more messages, e.g., "customer message 5", to be transmitted to the mobile communication device 16, 1010 of the identified customer. Illustratively, "customer message 5" includes a notification or other message informing that the waiting time, $WT_i$ for all drive-through lanes is greater than $T_{TH}$. Thereafter, the process 1300 terminates and returns to the process 700 illustrated in FIG. 7 where the "customer message 5" is transmitted to, and received by, the customer's mobile communication device 16, 1010, in which case the customer may wish to return for the curb-side delivery/pickup of the customer's order at a later time. In some embodiments, the "customer message 5" may also include one or more virtual discount coupons, and in some embodiments one or more such virtual discount coupons may be selected, based on the customer's purchase history and/or ordered items and/or on other considerations, to entice the customer to enter the store.

Produce Scale Components

Figure 14:
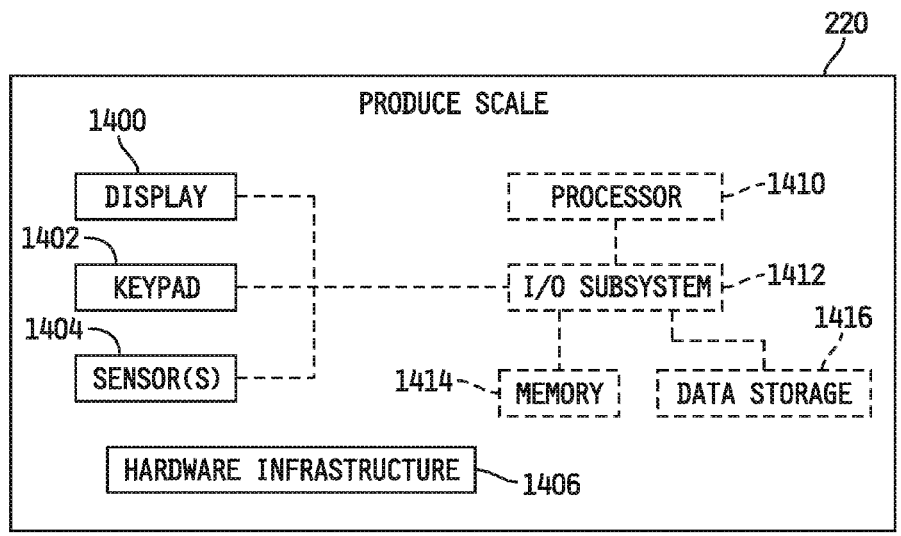
FIG. 14 is a simplified bock diagram of an embodiment of the produce scale illustrated in FIG. 2.

Referring now to FIG. 14, a simplified block diagram is shown of an embodiment of one of the one or more produce scales 220 illustrated in FIG. 2. In the embodiment illustrated in FIG. 14, a representative produce scale 220 illustratively includes at least a display 1400, e.g., in the form of a conventional display screen or monitor, one or more sensors 1404, e.g., including one or more conventional weight sensors, and conventional hardware infrastructure 1406, e.g., including a housing and at least one weight-bearing plate, table, tray or platform upon which produce items to be weighed are placed. In some embodiments, the display 1400 is a touch-screen display capable of receiving manual selection of one or more displayed graphical elements such as graphical keypad elements, one or more selectable graphical icons or the like. In embodiments in which the display 1400 is not a touch-screen display, the produce scale 220 may further include a conventional hardware keypad.

In some embodiments, the produce scale 220 is controlled entirely by the main server 12 and/or one of the local hub servers $22_1$-$22_L$ to which the produce scale 220 may be coupled and/or one of the point-of-sale systems $24_1$-$24_M$ to which the produce scale 220 may be coupled. In some such embodiments, the processor 50 of the main server 12, the processor 30 of a corresponding local hub server 22 and/or the processor 200 of a corresponding point-of-sale system 24 is/are operable to control the entirety of the operation of the produce scale 220. In some alternate embodiments, the produce scale 220 may include components similar to the main server 12 and also to the one or more local hub servers $22_1$-$22_L$ and the one or more POS systems $24_1$-$24_M$ such as a processor 1410, an I/O subsystem 1412, a memory 1414 and a data storage device 1416 as shown in dashed-line representation in FIG. 14. In some embodiments, each of the foregoing components may be identical to corresponding components of the local hub server $22_1$ and/or POS system 24 described above, and a detailed explanation of such components will not be repeated here for brevity. In other embodiments, the produce scale 220 may be configured differently than the local hub server $22_1$ and/or POS system 24 described above.

As will be described in detail hereinafter, a produce menu graphic user interface (GUI) is illustratively displayed on the display 1400 of the produce scale 220. In some embodiments, the processor 50 of the main server 12 is illustratively operable to control display of the produce menu GUIs displayed on the produce scale 220. In some alternate embodiments, one or more of a processor 30 of a corresponding one of the local hub servers 22, a processor 200 of a corresponding one of the point-of-sale systems 24 and/or the processor 1410 of the produce scale 26, 220, in embodiments which include the processor 1410, may control, in whole or in part, display of the produce menu GUIs displayed on the produce scale 220 and/or operation of the produce scale 220 generally.

Ordered Item Fulfillment Process—Weighable Items

Figure 15:
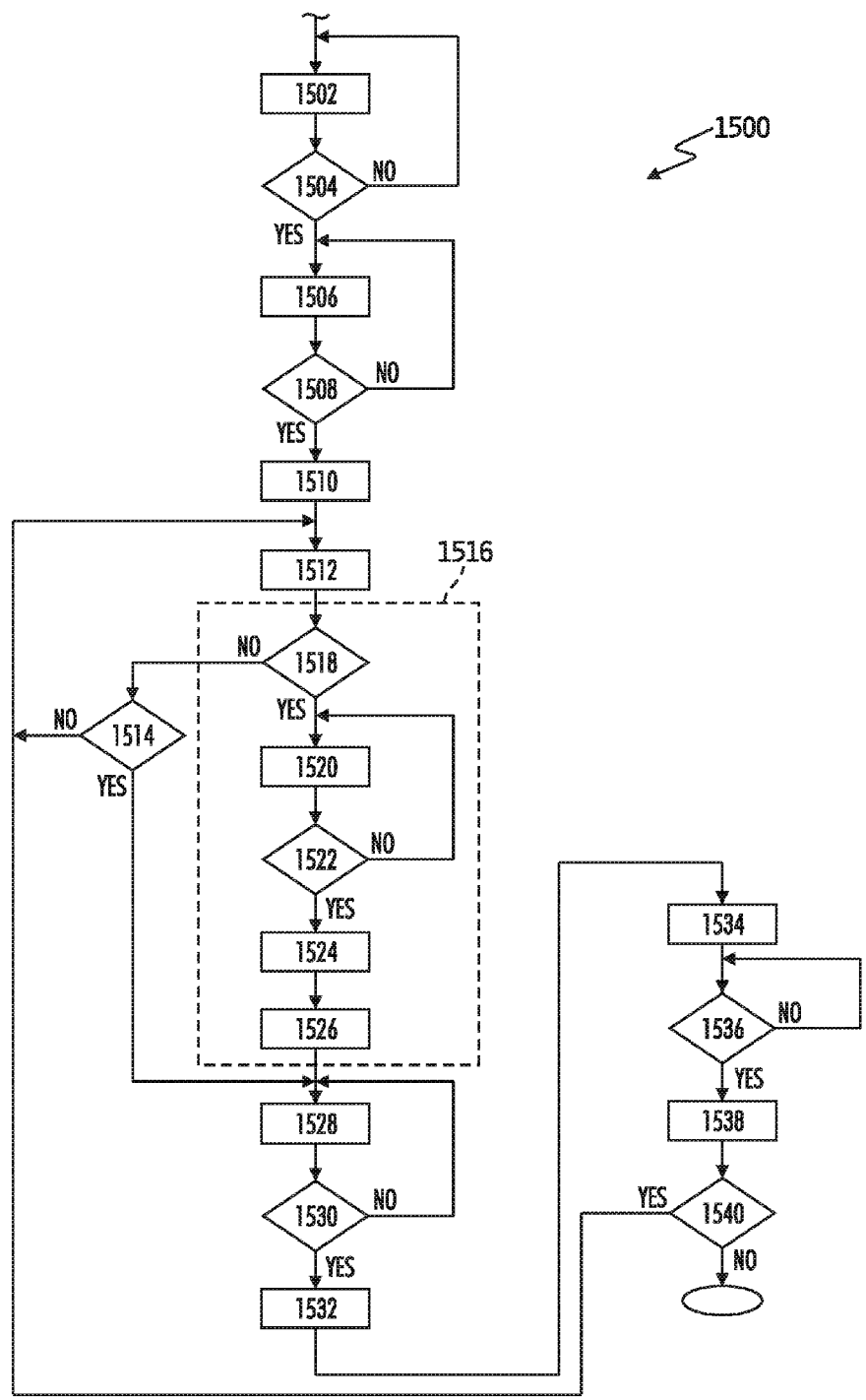
FIG. 15 is a simplified flow diagram of an embodiment of an aspect of a product fulfillment process.

Referring now to FIG. 15, a simplified flow diagram is shown of an embodiment of an ordered item fulfillment process 1500 executed by the processor 50 of the main server 12. In one embodiment, the process 1500 is illustratively stored in the curb-side delivery processing module 554 of the ordered item notification module 540 in the form of instructions executable by the processor 50 of the main server 12, and the steps of the process 1500 will be described below for purposes of this disclosure as being executed by the processor 50 of the main server. In some alternate embodiments, e.g., that may or may not include a main server 12, the process 1500 may alternatively be stored in the memory 34 (and/or data storage 36) of one or more of the local servers 22$_1$-22$_L$ in the form of instructions executable by the processor 30 of the one or more local servers 22$_1$-22$_L$, stored in the memory 402 (and/or data storage 406) of an electronic system or device 405 associated with one or more one of the curb-side delivery service departments 26 within one or more of the brick-and-mortar enterprise stores 25$_1$-25$_L$ in the form of instructions executable by a processor 400 associated with any such any such electronic system or device 405, and/or stored in a memory and executable by a processor of another system external to or supplemental to the system 10 illustrated FIG. 1. It will further be understood that the process 1500 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

Illustratively, ordered items will generally be fulfilled, i.e., collected and pre-processed through a POS system 24, by one or more store employees. When the customer thereafter arrives, the customer need only complete the purchase, which in some embodiments may be accomplished by the customer prior to arrival at the store at which the order is processed, and in other embodiments may be accomplished by the customer upon arrival for pickup of the ordered items. In any case, the process 1500 illustrated in FIG. 15 relates specifically to a process for fulfilling produce items in embodiments in which a customer's ordered item(s) includes one or more produce items.

The process 1500 begins at step 1502 where the processor 50 is operable to monitor the keypad 1402, sensor 1404 or other device via which a store employee can be identified to a produce scale 220. Thereafter at step 1504, the processor 50 is operable to determine whether an employee ID has been detected, and the process 1500 loops back to step 1502 until such detection occurs. Following detection of an employee ID at step 1504, the process 1500 advances to step 1506 where the processor 50 is operable to control the display 1400 of the produce scale 220 to display one or more GUI elements or fields for entering a customer order number. Upon successful detection of such a customer order number at step 1508, the process 1500 advances to step 15010 where the processor 50 is operable to control the display 1400 to display selectable GUI elements only for weighable items, e.g., produce items, associated with the customer's order number entered at step 1506. Thereafter at step 1512, the processor 50 is operable to monitor the displayed GUI elements.

In some embodiments of the process 1500, the processor 50 may be operable to access the product/service and pricing data 506 to determine whether one or more of the weighable items associated with the customer's order number is currently in inventory, i.e., in stock, in the store 25. If not the processor 50 may be illustratively operable to process the in-stock inventory data to determine whether any one or more in-stock items may be substitutable for one or more of the weighable items associated with the customer's order number that is/are not currently in stock. In such embodiments, the process 1500 may include step 1516.

In some embodiments of the process 1500 which include step 1516, the processor 50 is illustratively operable at step at steps 1520-1526 to control the display 1400 to display one or more selectable GUI elements for the one or more substitute items determined by the processor 50 as just described, to monitor the displayed GUI elements for selection by the employee, and to thereafter advance to step 1528. In other embodiments in which the processor 50 is not operable to pre-determine one or more substitute items but which still may include step 1516, the processor 50 is illustratively operable at step 1518 to control the display 1400 to display a selectable GUI element which may be selected by the employee to substitute one or more of the weighable items associated with the customer's order number with one or more substitute items of the employee's choosing. If the processor 50 determines at step 1518 that such a selectable GUI element is selected, the process 1500 advances to step 1520 where the processor 50 is operable to control the display 1400 to display one or more GUI field in which the employee enters the UPC code or other identifier code which identifies the substitute item. In some alternative embodiments, the display 1400 at step 1520 may be or include a selectable menu GUI. In any case, upon detection at step 1522 of an employee-identified substitute item, the processor 50 is operable at step 1524 to control the display to display information about the substitute item including, for example, item description, image thereof, price per unit weight, and/or other information. Thereafter at step 1526, the processor 50 is operable to add the identified substitute item to the items associated with the customer's order number. In some embodiments, the processor 50 may be operable at step 1526 to transmit a message to the customer's mobile communication device 16, to the customer's email account and/or other information medium informing of the substitution and requesting confirmation/rejection thereof.

In embodiments which include step 1516, the process 500 advances from step 1526 to step 1528. In embodiments of the process 1500 which do not include step 1516, the process 1500 advances from step 1512 to step 1514 where the processor 50 is operable to determine whether one of the displayed GUI elements, each corresponding to one of the weighable items associated with the customer's order number, has been selected. If not, the process loops back to step 1512, and if so the process 1500 advances to step 1528.

At step 1528, the processor 50 is operable to monitor weight applied to the item tray or platform of the identified produce scale 220, and thereafter at step 1530 the processor 50 is operable to determine whether the weight is greater than a threshold weight, $W_{TH}$. Illustratively, the threshold weight, $W_{TH}$, is a so-called tare weight, such that when the weight applied to the identified produce scale 220 exceeds $W_{TH}$, this indicates that the weighable item corresponding to the selected GUI element has been placed on the item or platform of the identified produce scale 220. If the processor 50 determines at step 1530 that the weight applied to the identified produce scale 220 is greater than $W_{TH}$, the process 1500 advances to step 1532, and otherwise the process 1500 loops back to the beginning of step 1528.

At step 1532, after the weight has stabilized, the processor 50 is operable to access the product/service pricing data 506 to determine the unit price of the weighed item corresponding to the selected GUI element, and to then calculate the price of the item presently being weighed as a function of the weight of the item determined at steps 1528/1530 and the unit price of the item determined from the product/service pricing data 506. Thereafter at step 1534, the processor 50 is operable to associate the weighed item and its calculated price with the customer's order number in the customer order portion of the customer's account data 504, and to mark the item in the order portion of the customer's account data 504 as weighed and priced.

At step 1536, the processor 50 is operable to determine whether the weighing process is complete, e.g., by monitoring the weight on the produce scale 220 or by generating and displaying a selectable GUI element which the employee selects when finished weighing the item. If not the process 1500 loops back to the beginning of step 1536, and if so the process 1500 advances to step 1538 where the processor 50 deletes the weighed and priced item from the displayed GUI. Thereafter at step 1540, the processor 50 is operable to determine whether the employee is finished weighing all weighable items associated with the customer's order number, e.g., by generating and displaying a selectable GUI element which the employee selects when finished weighing all items. If not finished, the process 1500 loops back to step 1512 for weighing of the next item associated with the customer's order number. If finished, the process 1500 terminates with the one or more items associated with the customer's order pre-processed such that all such items are marked as weighed and priced and all such items are linked to a corresponding weighed price.

Ordered Item Fulfillment Process—Price Scanning

Figure 16:
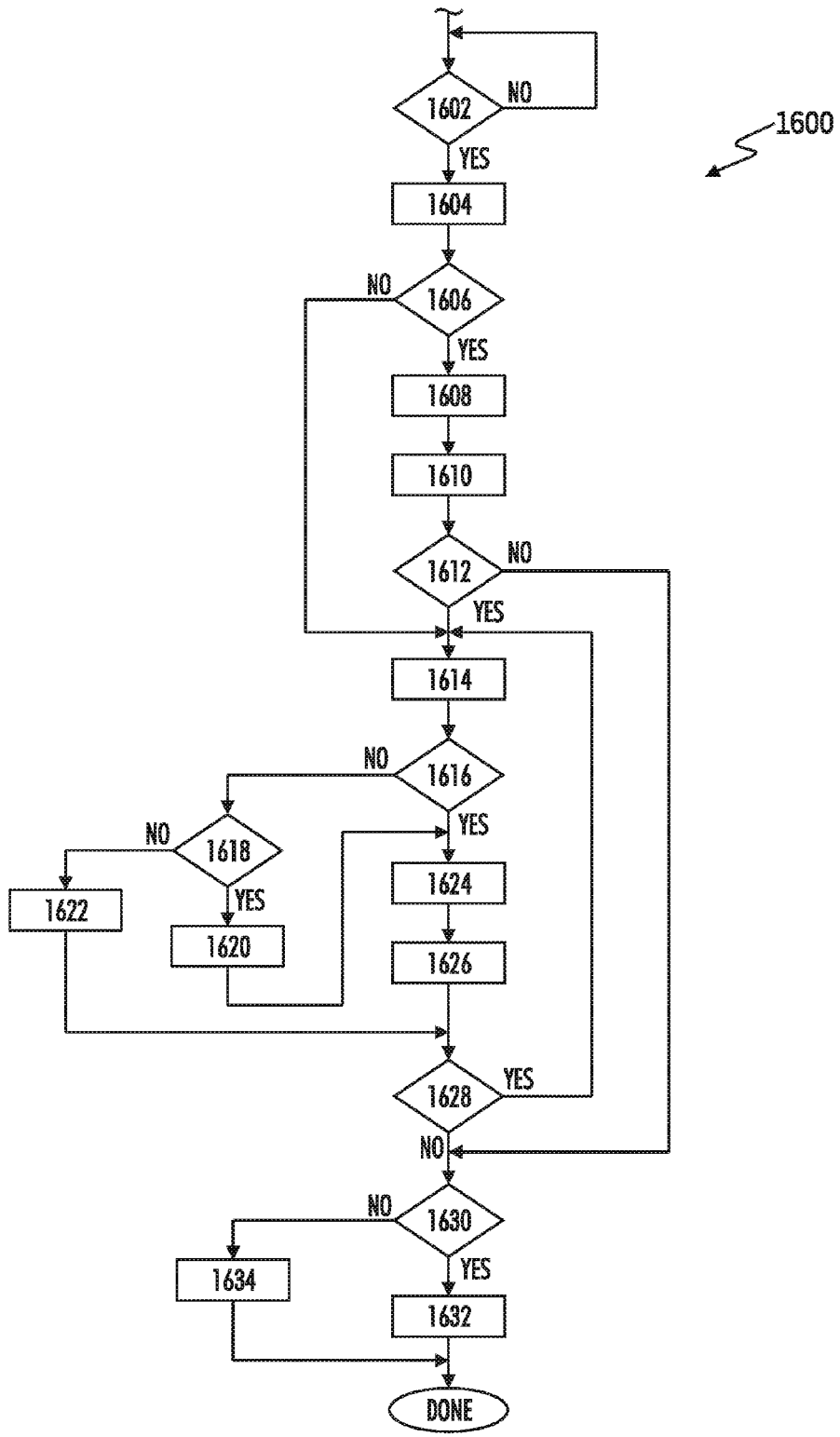
FIG. 16 is a simplified flow diagram of an embodiment of another aspect of the product fulfillment process.

Referring now to FIG. 16, a simplified flow diagram is shown of an embodiment of another ordered item fulfillment process 1600 executed by the processor 50 of the main server 12. In one embodiment, the process 1600 is illustratively stored in the curb-side delivery processing module 554 of the ordered item notification module 540 in the form of instructions executable by the processor 50 of the main server 12, and the steps of the process 1600 will be described below for purposes of this disclosure as being executed by the processor 50 of the main server. In some alternate embodiments, e.g., that may or may not include a main server 12, the process 1600 may alternatively be stored in the memory 34 (and/or data storage 36) of one or more of the local servers $22_1$-$22_L$ in the form of instructions executable by the processor 30 of the one or more local servers $22_1$-$22_L$, stored in the memory 402 (and/or data storage 406) of an electronic system or device 405 associated with one or more one of the curb-side delivery service departments 26 within one or more of the brick-and-mortar enterprise stores $25_1$-$25_L$ in the form of instructions executable by a processor 400 associated with any such any such electronic system or device 405, and/or stored in a memory and executable by a processor of another system external to or supplemental to the system 10 illustrated FIG. 1. It will further be understood that the process 1600 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

Illustratively, after an employee collects items associated with a customer order, which may include pre-processing one or more weighable items, e.g., in accordance with the process 1500 illustrated in FIG. 15, the collected items will generally be price-scanned and packaged, e.g., bagged, for subsequent curb-side delivery to, and pickup, by the associated customer. The process 1600 illustrated in FIG. 16 relates to such a price scanning process which will generally be conducted at one of the point-of-sale systems $24_1$-$24_M$ which may be located in the curb-side delivery service department 26 or located elsewhere within the store 25 ("the POS system").

The process 1600 begins at step 1602 where the processor 50 is operable to determine whether an employee, e.g., a POS system attendant or operator, has entered the customer's order number into a keypad, touch-screen or other data entry mechanism at or otherwise associated with the POS system 24. If not, the process 1600 loops back to step 1602 until such a customer order number is detected, after which the process 1600 advances to step 1604 where the processor 50 is operable to access the list of ordered items associated in the customer account data 404 or other such database with the customer's order number. Thereafter at step 1606, the processor 50 is operable to determine from the list whether any items have been pre-processed, e.g., according to the weighable item process illustrated in FIG. 15. If so, the process 1600 advances to steps 1608 and 1610 where the processor 50 is operable to add such pre-processed items and prices to the transaction record and price total and to then mark such items as complete.

Following step 1610, the process 1600 advances to step 1612 where the processor 50 is operable to determine whether additional, i.e., uncompleted, items remain on the list of ordered items associated with the customer's order number. If not, the process 1600 advances to step 1630. If, at step 1612 the processor 50 determines that additional items to be processed remained on the list of ordered items associated with the customer's order number, or if at step 1606 the processor 50 determined that the list did not contain any pre-processed items, the process 1600 advances to step 1614 where the processor 50 is operable to price scan one of the uncompleted items on the list. Thereafter at step 1616, the processor 50 is operable to determine whether the price-scanned item matches one on the list of uncompleted items associated with the customer's order number. If not, the process 1600 advances to step 1618 where the processor 50 is operable to determine whether the non-matching item is a substitute item. In some instances, employees collecting ordered items from within the store 25 may substitute one or more employee-selected items for items on the list of ordered items which are missing, i.e., currently out-of-stock, and/or which are in stock but not in a quantity sufficient to satisfy the order. In such cases, execution of step 1618 may illustratively proceed with the processor 50 controlling the POS display 218 to display a message or notification relating to the non-matching item and also displaying a number of selectable GUI elements via which the POS attendant or operator may select to mark the item as a substitute item or reject the item as one that was inadvertently collected during collection of the customer's ordered items. In the former case, the process 1600 advances to step 1620 where the processor 50 is operable to add the substitute item to a substitute item list and to associate the substitute item list in the customer account data 404 or other database with the customer's order number, and thereafter at step 1624 the processor 50 is operable to add the item and its price to the order and then, at step 1626, to remove the item from the list of items in the order to be processed. In the latter case, the process 1600 advances to step 1622 where the processor 50 is operable to omit the item and to not include the item/price in the transaction.

Following step 1620 and step 1626, the process 1600 advances to step 1628 where the processor 50 is operable to determine whether any items remain in the list of items associated with the customer's order number and, if so, the process 1600 loops back to step 1614. Otherwise, the process 1600 advances to step 1630 where the processor 50 is operable to determine whether a substitute item list is associated in the customer account data 404 or other such database with the customer's order number, and/or whether any such substitute list includes any items relating to the customer's order number entered at step 1602. If so, the process 1600 advances to step 1632 where the processor 50 is operable to automatically transmit a message to the customer's mobile communication device and/or other communication medium, e.g., the customer's one or more email addresses, etc., informing the customer of the one or more substitute items and requesting a response confirming or declining one or more each such substitute item. If the processor 50 instead determines at step 1630 that no such substitute list is associated with the customer's order number and/or that any such list does not include any outstanding, i.e., unconfirmed, substitute items, the process 1600 advances to step 1634 where the processor 50 is operable to mark the order in the customer account data 404 or other database as complete.

Ordered Item Fulfillment Process—Substitute Item Processing

Figure 17:
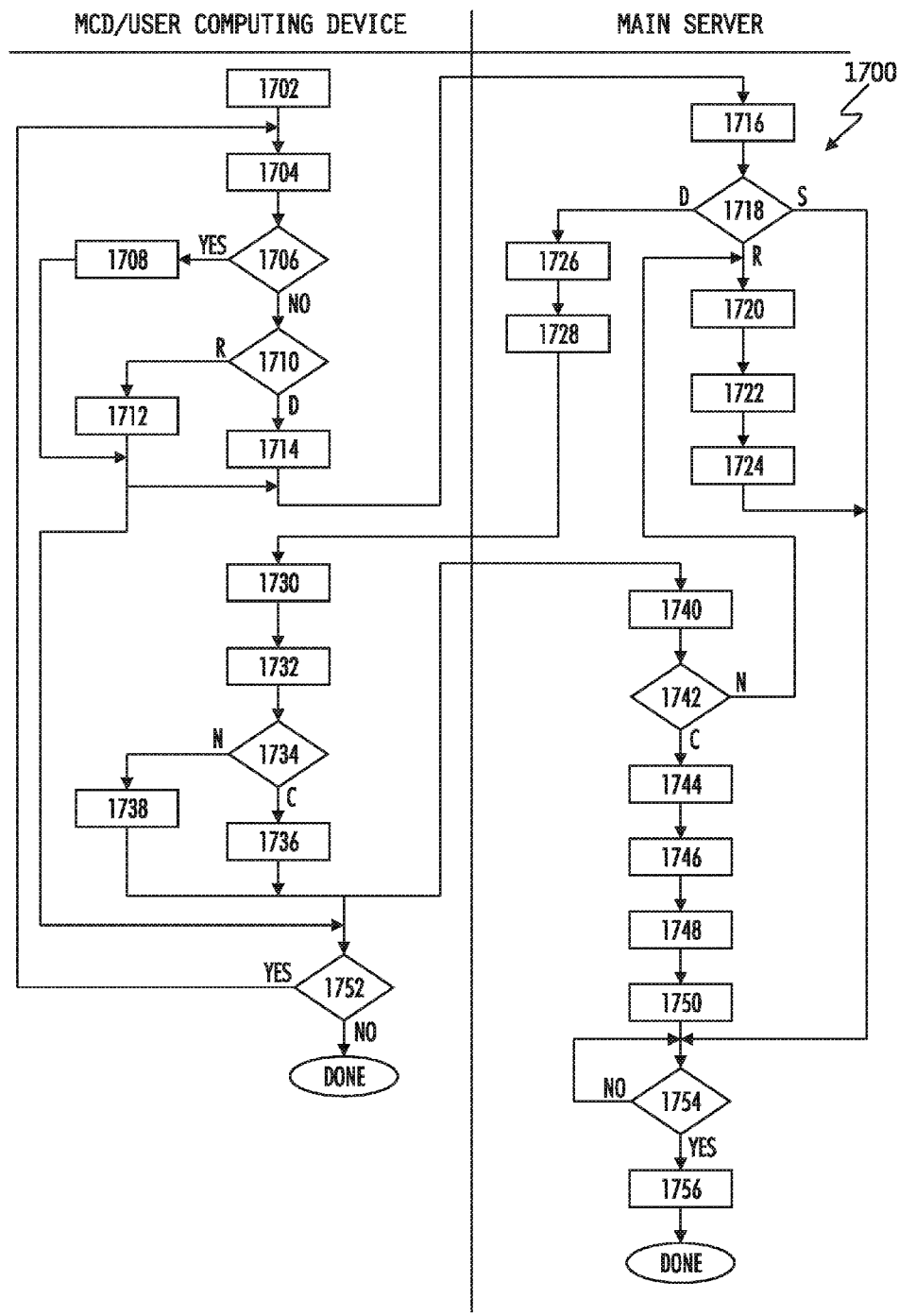
FIG. 17 is a simplified flow diagram of an embodiment of yet another aspect of the product fulfillment process.

Referring now to FIG. 17, a simplified flow diagram is shown of an embodiment of another ordered item fulfillment process 1700 executed by the processor 50 of the main server 12. Illustratively, the process 1700 has the same framework as the process 1100 illustrated in FIG. 11, and the process 1700 is illustratively executed in the same manner by the same one or more processors as described above with respect to the process 1100. In the embodiment illustrated in FIG. 17, the portion of the process 1700 to the right of the vertical line under the heading "main server" is illustratively stored in the curb-side delivery processing module 554 of the ordered item notification module 540 in the form of instructions executable by one or more processors as described above with respect to the process 1100 of FIG. 11, and the portion of the process 1700 to the left of the vertical line under the heading "MCD/user computing device" is illustratively stored in the OI App 310 and/o in the memory 354 of a user computing device 18 in the form of instructions executable by one or more processors as described above with respect to the process 1100 of FIG. 11.

In some embodiments, after collected items associated with a customer order have been price scanned, e.g., in accordance with the process 1600 illustrated in FIG. 16, the order may not be marked complete if the order includes one or more substitute items. In some such embodiments, the processor 50 is operable to notify the customer of such one or more substitute items and request confirmation or rejection thereof. The process 1700 illustrated in FIG. 17 relates to a customer-interactive process by which the customer may confirm one or more such substitute items, reject one or more such substitute items and/or select one or more different substitute items.

The process 1700 begins at step 1702 where the processor 300 and/or 350 of the customer's mobile communication device 16, 1010 and/or user computing device 18 respectively, ("the processor 300/350") is operable to receive the substitute item message transmitted by the main server 12 at step 1632, and thereafter at step 1704 the processor 300/350 is operable to control the display 322/366 to display one of the substitute items along with the item originally ordered by the customer and in place of which the substitute item was substituted, along with one or more selectable GUI elements via which the customer can selectively confirm or reject the substitution. Thereafter at step 1706, the processor 300/350 is operable to determine whether the customer has confirmed or rejected the substitute item. If confirmed, the process 1700 advances to step 708 where the processor 300/350 is operable to control the communication circuitry 312/360 to transmit a confirmation message to the server 12. If rejected, the process 1700 advances to step 1710 where the processor 300/350 is operable to control the display 322/366 to display one or more selectable GUI elements via which the customer can selectively remove the item from the list or request selection of another substitute item. If the former, the process 1700 advances to step 1712 where the processor 50 is operable to control the communication circuitry 312/366 to transmit a removal message to the server 12. If the latter, the processor 300/350 is operable at step 1714 to control the communication circuitry 312/366 to transmit a different substitution message to the server. Following any and each of steps 1708, 1712 and 1714, the portion of the process 1700 executed by the processor 300/350 advances to step 1752.

At step 1716, the main server receives the confirmation, removal or different substitution message transmitted at step 1708, 1712 or 1714 respectively, and thereafter at step 1718 the processor 50 of the main server 12 is operable to determine which of these messages was received. If the confirmation (substitution) message (S) is received, the process 1700 illustratively advances to step 1754. If the removal message (R) is received, the process 1700 advances to step 1720 where the processor 50 is operable to subtract the price of the substitute item from the transaction total associated with the customer's order number, and to remove the substitute item from the substitute item list and from the transaction. Thereafter at step 1722, the processor 50 is operable to generate a message requesting removal of the substitute item from the customer's order, i.e., removal from the bag or other packaging, and thereafter at step 1724 the processor 50 is operable to control the communication circuitry 58 to transmit the message generated at step 1724 to the store holding the order for the customer. The process 1700 then advances from step 1724 to step 1754. In some embodiments, the processor 50 may further control the communication circuitry 58 to transmit one or more messages to the customer to confirm the customer's instructions.

If, at step 1718, the processor 50 determines that the message received at step 1716 is a different substitution message (D), the process 1700 advances to step 1726 where the processor 50 is operable to generate a list of potential substitute items, e.g., as described above with respect to the process 1500 illustrated in FIG. 15, and thereafter at step 1728 the processor 50 is operable to control the communication circuitry 58 to transmit the list to the customer.

At step 1730, the processor 300/350 receives the substitute item list transmitted at step 1728, and thereafter at step 1732 the processor 300/350 is operable to control the display 312/366 to display the received list of substitute items along with one or more selectable GUI elements via which the customer may select one or more of the items on the list or none. If the former, the process 1700 advances to step 1736 where the processor 300/350 is operable to control the communication circuitry 312/360 to transmit a chosen substitute item message (C), and if the latter the process 1700 advances to step 1738 where the processor 300/350 is operable to control the communication circuitry 312/360 to transmit a "none" message (N). The portion of the process 1700 executed by the processor 300/350 also advances from steps 1736 and 1738 to step 1752 where the processor 300/350 is operable to determine whether the list of substitute items received at step 1702 include one or more additional substitute items to be processed by the customer. If so, the process 1700 loops back to step 1704, and otherwise the portion of the process 1700 executed by the processor 300/350 is complete.

At step 1740, the main server 12 receives the message transmitted at step 1736 or at step 1738. Thereafter at step 1742, the processor 50 of the server 12 determines which message was received, and if the "none" message (N), the process loops to step 1720. If the chosen substitute item message (C), the process 1700 advances to step 1744 where the processor 50 is operable to generate a message requesting substitution of the original substitute item in the customer's order with the chosen substitute item, i.e., that chosen by the customer at step 1734, and thereafter at step 1746 the processor 50 is operable to control the communication circuitry 58 to transmit the generated to the store holding the order for the customer. The process 1700 then advances from step 1746 to step 1748 where the processor 50 is operable to replace the substitute item in the customer's list of ordered items with that chosen by the customer, to update the price thereof in the list and in the purchase transaction total, and to remove the substitute item from the list of substitute items. Thereafter at step 1754 the processor 50 is operable to determine whether all substitute items have been process and to loop back to the beginning of step 1754 until all such substitute items are processed. Thereafter, the process 1700 advances to step 1756 where the processor 50 is operable to mark, e.g., in the customer's account data 404 or other such database, the customer's order as complete and ready for curb-side delivery and pickup by the customer. Thereafter the portion of the process 1700 executed by the processor 50 of the main server 12 is complete.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, it will be understood that while several process steps in various sequences have been illustrated and described herein with respect to the processes 700, 800, 900, 1100, 1200, 1300, 1500, 1600 and 1700, any one or more such processes 700, 800, 900, 1100, 1200, 1300, 1500, 1600 and/or 1700 may alternatively include more, fewer and/or different steps, and that any such steps may be executed in different sequences from those illustrated and described, without departing from the scope of the concepts and techniques described herein.

In the embodiments described herein, the position identification devices $28_1$-$28_P$ have been described as being implemented as wireless signal broadcasting devices, e.g., conventional radio frequency broadcasting beacons, configured to broadcast wireless signals each containing UID. In some alternate embodiments, one or more of the PIDs may be implemented as wireless signal transceivers configured to can broadcast and receive wireless signals and/or as wireless signal receivers configured to receive broadcast wireless signals, e.g., broadcast by a mobile communication device or other device and, in some cases, to communicate directly (wired and/or wirelessly) with the main server 12, one or more of the local hub servers 22 and/or one or more of the POS systems 24. In some such embodiments, one or more of the wireless signal transceivers and/or receivers may include one or more conventional processors and one or more memory devices having instructions stored therein executable by the one or more processors to execute one or more of steps for determining an identity of an individual carrying a mobile communication device within and/or near a store 25.

In other alternate embodiments, one or more PIDs 28 may be implemented in the form of a combination of conventional Global Positioning System (GPS) satellites and a GPS receiver on-board a mobile communication device.

In other alternate embodiments, one or more PIDs 28 may be implemented in the form of one or more in-store WiFi Access Points which establish one or more in-store or store-wide hotspot having a unique internet access ID (HotSpotID) accessible by a mobile communication device. In such embodiments, the server 12 may determine a location of a mobile communication device in accordance with the unique internet access ID used by the mobile communication device to communicate with the mobile communication device.

In other alternate embodiments, one or more PIDs 28 may be implemented in the form of a combination of the earth's Geomagnetic Field and a magnetometer on-board a mobile communication device. In such embodiments, the server 12 may determine the location of a mobile communication device in accordance with the unique magnetic field signature captured by the magnetometer and wirelessly transmitted to the server 12 by the mobile communication device. In such embodiments, the server database may have one or more maps, tables, lists or the like mapping magnetic signature profiles within one or more of the stores to locations or positions within one or more of the stores, and the server 12 may be operable in such embodiments to determine the in-store location or position of a mobile communication device by comparing the unique magnetic field signature wirelessly transmitted by the mobile communication device to the stored magnetic signature profiles.

In other alternate embodiments, one or more of the PIDs 28 may be implemented in the form of a combination of a camera on-board a mobile communication device and a product label affixed to product or product location within a store. In such embodiments, the camera may be operated to capture an image of the product label and wirelessly transmit the image to the server. The server may then compare the image to stored product data to determine the in-store location thereof.

In other alternate embodiments, one or more of the PIDs 28 may be implemented in the form of a combination of a mobile communication device with a keypad and a customer/employee application operating on the mobile communication device. In such embodiments, the customer/employee application may display one or more manually selectable GUI elements for manually entering the location of the mobile communication device, and the mobile communication device may then wirelessly transmit the location information to the server.

In other alternate embodiments, one or more of the PIDs 28 may be implemented in the form of a wireless signal transmission device, e.g., RFID Tag, NFC device, etc., attached to customer-selected product. In such embodiments, the wireless signal transmission device may be configured to wirelessly transmit product information (e.g., brand, size, etc.) and/or location (e.g., department, aisle, shelf position, etc.) to a mobile communication device which then wirelessly transmits the information to the server.

In other alternate embodiments, one or more of the PIDs 28 may be implemented in the form of a combination of one or more in-store Cameras and a server-based facial and/or product recognition application. In some such embodiments, the server may process camera images and/or video and compare facial images with stored customer images to identify customers. In other embodiments, the server may process the camera images and/or video and compare product images, e.g., in customer's possession (basket, hand-carried, etc.) with stored product images, and then predict the customer's identity based on information contained in customer shopping histories.

In other alternate embodiments, one or more PIDs 28 may be implemented in the form of a combination of one or more electromagnetic radiation (EMR) generators positioned within a store 25 and a mobile communication device with a camera and/or microphone. In such embodiments, the EMR may be generated in one or more spectral ranges, and be made to vary locally from store-to-store and throughout each store in one or more detectable EMR properties or characteristics, and/or EMR having different properties or characteristics may be generated in each store and in different areas of each store, such that in any case different stores, and different areas within each store, will be subject to different generated EMR properties or characteristics. The different EMR properties and/or characteristics generated in each store and in each area of each store may be stored in an EMR database, and local EMR properties/characteristics may be detected by a mobile communication device and wirelessly transmitted to the server which may then compare such received information to the EMR database to determine the location of the mobile communication device. Examples of such EMR generators and corresponding EMR detectors include, but are not limited to, one or more visible Light Generators and a camera on-board a mobile communication device, one or more audible frequency Generators and a microphone on-board a mobile communication device, one or more radio frequency generators and a radio frequency generator on board a mobile communication device, and the like.

In other alternate embodiments, one or more PIDs 28 may be implemented in the form of one or more mobile communication devices of one or more in-store customers or in-store Employees. In such embodiments, in-store mobile communication devices may be configured to periodically broadcast signals detected by a customer's mobile communication device and/or transmitted directly to the server. Such broadcast signals be or include "location information" signals based on one or more "hard events" such as a recently received unique identification signal transmitted by an in-store wireless signal broadcasting device, a recently scanned or imaged product code, detected product device data, recently received GPS data, recently used HotSpotID data, recently detected EMR data, and/or the like. Alternatively or additionally, the one or more broadcast signals may be or include location information signals based on one or more "soft events" such as locally detected sounds (generated or not), locally detected light (generated or not), locally detected RF signals, and/or the like.

In any of the foregoing embodiments, information may be transmitted, receive and/or processed by any one or combination of any system or device disclosed herein.

What is claimed is:

1. A method of processing items ordered from a retail enterprise, the method comprising:
    with a processor, storing in a database a plurality of brick-and-mortar store identification codes and associated geographic boundaries each identifying a different one of a plurality of brick-and-mortar stores of the retail enterprise and an associated geographic boundary defined at least partially thereabout,
    with the processor, storing in the database a plurality of department identification codes each identifying a different one of a plurality of departments within each of the plurality of brick-and-mortar stores of the retail enterprise,
    with the processor storing in the database a plurality of customer codes each identifying a different one of a plurality of customers of the retail enterprise,
    with the processor, associating in the database with at least one of the plurality of customer codes (a) an order status code identifying a status of an order placed for an associated item by a corresponding one of the plurality of customers, (b) one of the plurality of brick-and-mortar identification codes identifying the one of the plurality of brick-and-mortar stores from which the order for the item was placed by the corresponding one of the plurality of customers and (c) one of the plurality of department identification codes identifying the one of the plurality of departments, within the associated one of the plurality of brick-and-mortar stores, from which the order for the item was placed by the corresponding one of the plurality of customers,
    with the processor, determining that one of the plurality of customers associated in the database with a corresponding one of the plurality of customer codes has entered one of the plurality of geographic boundaries based on GPS tracking of a mobile communication device associated in the database with the corresponding one of the plurality of customer codes,
    in response to determining that one of the plurality of customers has entered one of the plurality of geographic boundaries, determining whether the one of the plurality of customer codes associated in the database with the entering one of the plurality of customers is also associated in the database with an order status code indicative of a pending order for an associated item,
    in response to determining that the one of the plurality of customer codes associated in the database with the entering one of the plurality of customers is also associated in the database with an order status code indicative of a pending order for an associated item, determining with the processor whether the one of the plurality of brick-and-mortar store identification codes associated in the database with the entered one of the plurality of geographic boundaries is also associated in the database with the order status code indicative of the pending order for the associated item,
    in response to determining that the one of the plurality of brick-and-mortar store identification codes associated in the database with the entered one of the plurality of geographic boundaries is also associated in the database with the order status code indicative of the pending order for the associated item and the determined order status code indicates that the pending order for the associated item is complete but not yet picked up,
(i) determining with the processor the one of the plurality of department codes also associated in the database with the determined order status code, and
(ii) controlling, at least in part with the processor, a display monitor located at the one of the plurality of departments identified by the determined one of the plurality of department codes to display a first notification message including information indicating that the one of the plurality of customers that placed the order for the item associated with the determined order status code has entered the one of the plurality of brick-and-mortar stores associated in the database with the determined one of the plurality of brick-and-mortar store codes and that the order identified by the determined order status code is complete and ready for pick up.

2. The method of claim 1, further comprising:
with the processor, associating in the database each of the plurality of customer codes with communication information identifying a mobile communication device associated with a respective one of the plurality of customers, and
if the determined order status code indicates that the pending order for the associated item is complete but not yet picked up, wirelessly transmitting to the mobile communication device identified by the communication information associated in the database with the one of the plurality of customer codes associated in the database with the entering one of the plurality of customers, under control of the processor, a first customer message for display on the identified mobile communication device, the first customer message including information indicating that a completed order for the item associated with the determined order status code is ready for pick up at the one of the plurality of departments identified by the one of the plurality of department codes associated in the database with the determined order status code.

3. The method of claim 1, further comprising:
with the processor, further associating in the database with the one of the plurality of customer codes (d) a scheduled pickup time corresponding to at least one of a calendar date and time of day of a calendar at which the order for the associated item is to be completed for pickup, and (e) an order completion time corresponding to an estimated time required by the one of the plurality of departments associated with the determined one of the plurality of department codes to complete the order for the associated item, and
in response to determining that the one of the plurality of brick-and-mortar store identification codes associated in the database with the entered one of the plurality of geographic boundaries is also associated in the database with the order status code indicative of the pending order for the associated item, the determined order status code indicates that the pending order for the associated item is not yet complete and a current calendar date or current time of day of a current calendar date is equal to or later than the scheduled pickup time,
(iii) comparing the order completion time associated in the database with the order status code identifying the status of the order placed for the associated item by the entering one of the plurality of customers to a predefined time, and
(iv) if the order completion time is less than or equal to the predefined time, controlling, at least in part with the processor, the display monitor located at the one of the plurality of departments identified by the determined one of the plurality of department codes to display a second notification message including information indicating that the one of the plurality of customers that placed the order for the item associated with the determined order status code has entered the one of the plurality of brick-and-mortar stores associated in the database with the determined one of the plurality of brick-and-mortar store codes and that the order identified by the determined order status code is incomplete and overdue.

4. The method of claim 3, wherein the second notification message further includes instructions to complete the order for the item associated with the determined order status code.

5. The method of claim 3, wherein the predefined time is an estimated amount of time required for the entering one of the plurality of customers to travel from a location at which the entering one of the plurality of customers entered the one of the plurality of geographic boundaries to the one of the plurality of departments identified by the determined one of the plurality of department codes associated in the database with the determined order status code.

6. The method of claim 3, wherein the predefined time is an estimated amount of time that the entering one of the plurality of customers will spend shopping in the one of the plurality of brick-and-mortar stores identified by the one of the plurality of brick-and-mortar store identification codes associated in the database with the entered one of the plurality of geographic boundaries.

7. The method of claim 3, wherein if the order completion time is greater than the predefined time,
(v) determining, with the processor, a revised order pickup time, and
(vi) controlling, at least in part with the processor, the display monitor located at the one of the plurality of departments identified by the determined one of the plurality of department codes to display a third notification message including information indicating that the order identified by the determined order status code is incomplete and overdue, the third notification message further including instructions to complete the order identified by the determined order status code by the revised order pickup time.

8. The method of claim 7, further comprising:
with the processor, associating in the database each of the plurality of customer codes with communication information identifying a mobile communication device associated with a respective one of the plurality of customers, and
if the order completion time is greater than the predetermined time, wirelessly transmitting to the mobile communication device identified by the communication information associated in the database with the one of the plurality of customer codes associated in the database with the entering one of the plurality of customers, under control of the processor, a second customer message for display on the identified mobile communication device, the second customer message including the revised order pickup time, and information indicating that the order for the item associated with the determined order status code is not complete but will be completed for pick up at the revised order pickup time at the one of the plurality of departments identified by the one of the plurality of department codes associated in the database with the determined order status code.

9. The method of claim 7, further comprising:

with the processor, associating in the database each of the plurality of customer codes with communication information identifying a mobile communication device associated with a respective one of the plurality of customers, and if the order completion time is greater than the predetermined time, wirelessly transmitting to the mobile communication device identified by the communication information associated in the database with the one of the plurality of customer codes associated in the database with the entering one of the plurality of customers, under control of the processor, a virtual discount coupon.

\* \* \* \* \*